US012646962B2

(12) United States Patent (10) Patent No.: US 12,646,962 B2
Xu et al. (45) Date of Patent: Jun. 2, 2026

(54) BATTERY CHARGING METHOD AND ELECTRONIC DEVICE

(71) Applicant: Honor Device Co., Ltd., Shenzhen (CN)

(72) Inventors: Xiaohua Xu, Shenzhen (CN); Haibin Zhou, Shenzhen (CN); Peng Li, Shenzhen (CN); Hua Zhu, Shenzhen (CN)

(73) Assignee: Honor Device Co., Ltd., Shenzen (CN)

( * ) Notice: Subject to any disclaimer, the term of this patent is extended or adjusted under 35 U.S.C. 154(b) by 526 days.

(21) Appl. No.: 18/044,176

(22) PCT Filed: Feb. 28, 2022

(86) PCT No.: PCT/CN2022/078511
§ 371 (c)(1),
(2) Date: Mar. 6, 2023

(87) PCT Pub. No.: WO2022/218046
PCT Pub. Date: Oct. 20, 2022

(65) Prior Publication Data
US 2023/0344259 A1 Oct. 26, 2023

(30) Foreign Application Priority Data
Apr. 15, 2021 (CN) .......................... 202110408822.3

(51) Int. Cl.
*H01M 10/44* (2006.01)
*H02J 7/00* (2006.01)
(52) U.S. Cl.
CPC ........ *H02J 7/00714* (2020.01); *H02J 7/0029* (2013.01); *H02J 7/0047* (2013.01); *H02J 7/007182* (2020.01)

(58) Field of Classification Search
CPC .... H02J 7/00714; H02J 7/0029; H02J 7/0047; H02J 7/007182; H02J 7/0069; H02J 7/0049; B60L 58/16; B60L 58/13; B60L 2240/545; B60L 2240/547; B60L 2240/549
USPC ....... 320/107, 134, 137, 149, 150, 153, 156, 320/157, 162, 164
See application file for complete search history.

(56) References Cited

U.S. PATENT DOCUMENTS

| | | | | |
|---|---|---|---|---|
| 8,350,531 B2 * | 1/2013 | Morimoto | ............... | B60L 58/15 320/155 |
| 2019/0305564 A1 * | 10/2019 | Yebka | ............... | H02J 7/007194 |
| 2020/0373774 A1 * | 11/2020 | Abe | .................... | H02J 7/00712 |

(Continued)

FOREIGN PATENT DOCUMENTS

| | | |
|---|---|---|
| CN | 106451640 A | 2/2017 |
| CN | 106685002 A | 5/2017 |
| CN | 110768345 A | 2/2020 |

(Continued)

*Primary Examiner* — Edward Tso
(74) *Attorney, Agent, or Firm* — Slater Matsil, LLP

(57) ABSTRACT

An electronic device may collect statistics on a quantity of recharging times of the battery in at least one single charging process, and/or obtain a temperature of the battery in recharging. Then, the electronic device may lower a full charge threshold and a recharge threshold based on the quantity of recharging times and/or the temperature, and control recharging by using a lowered full charge threshold and a lowered recharge threshold.

18 Claims, 23 Drawing Sheets

(56)        References Cited

U.S. PATENT DOCUMENTS

2021/0152004 A1 *   5/2021   Basehore  ..............   H02J 7/0071

FOREIGN PATENT DOCUMENTS

| | | | |
|---|---|---|---|
| CN | 111431226 | A | 7/2020 |
| CN | 110121812 | B | 3/2021 |
| CN | 113725937 | A | 11/2021 |
| EP | 2680392 | A1 | 1/2014 |
| WO | 2018120236 | A1 | 7/2018 |
| WO | WO-2021078034 | A1 * | 4/2021   ..............   B60L 58/15 |

* cited by examiner

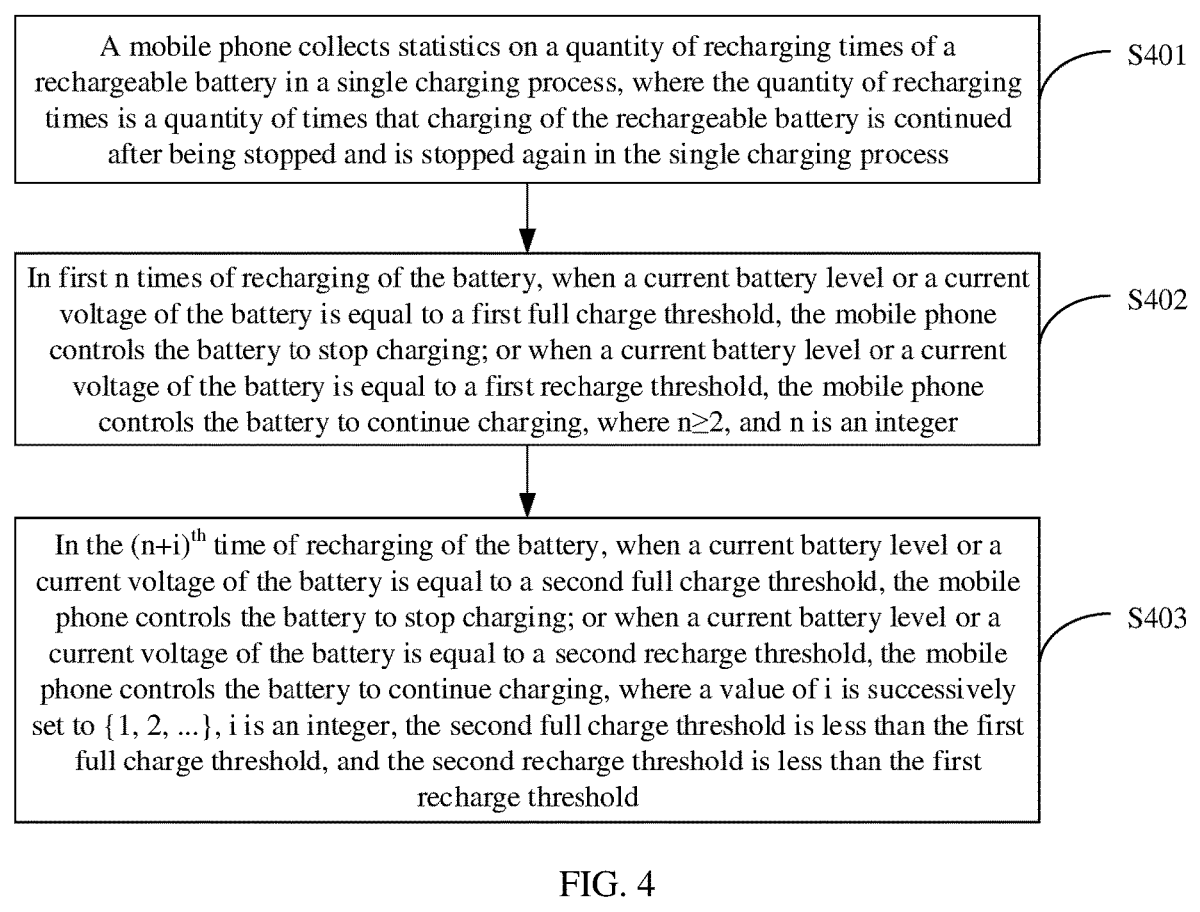

A mobile phone collects statistics on a quantity of recharging times of a rechargeable battery in a single charging process, where the quantity of recharging times is a quantity of times that charging of the rechargeable battery is continued after being stopped and is stopped again in the single charging process — S401

In first n times of recharging of the battery, when a current battery level or a current voltage of the battery is equal to a first full charge threshold, the mobile phone controls the battery to stop charging; or when a current battery level or a current voltage of the battery is equal to a first recharge threshold, the mobile phone controls the battery to continue charging, where n≥2, and n is an integer — S402

In the $(n+i)^{th}$ time of recharging of the battery, when a current battery level or a current voltage of the battery is equal to a second full charge threshold, the mobile phone controls the battery to stop charging; or when a current battery level or a current voltage of the battery is equal to a second recharge threshold, the mobile phone controls the battery to continue charging, where a value of i is successively set to { 1, 2, ... }, i is an integer, the second full charge threshold is less than the first full charge threshold, and the second recharge threshold is less than the first recharge threshold — S403

FIG. 4

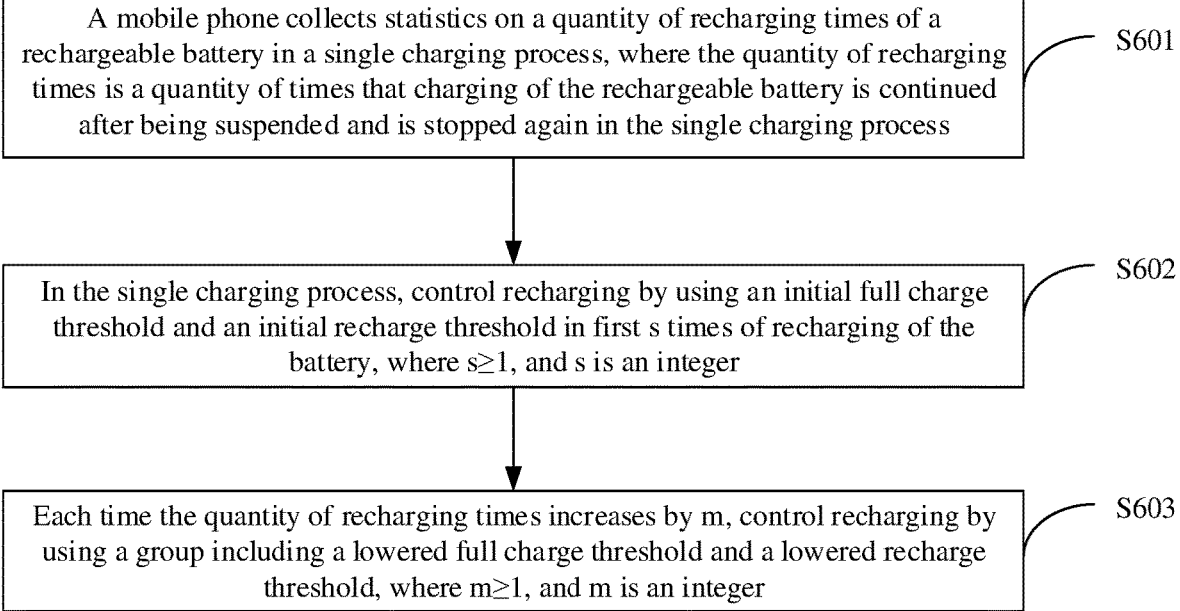

A mobile phone collects statistics on a quantity of recharging times of a rechargeable battery in a single charging process, where the quantity of recharging times is a quantity of times that charging of the rechargeable battery is continued after being suspended and is stopped again in the single charging process — S601

In the single charging process, control recharging by using an initial full charge threshold and an initial recharge threshold in first s times of recharging of the battery, where s≥1, and s is an integer — S602

Each time the quantity of recharging times increases by m, control recharging by using a group including a lowered full charge threshold and a lowered recharge threshold, where m≥1, and m is an integer — S603

FIG. 6

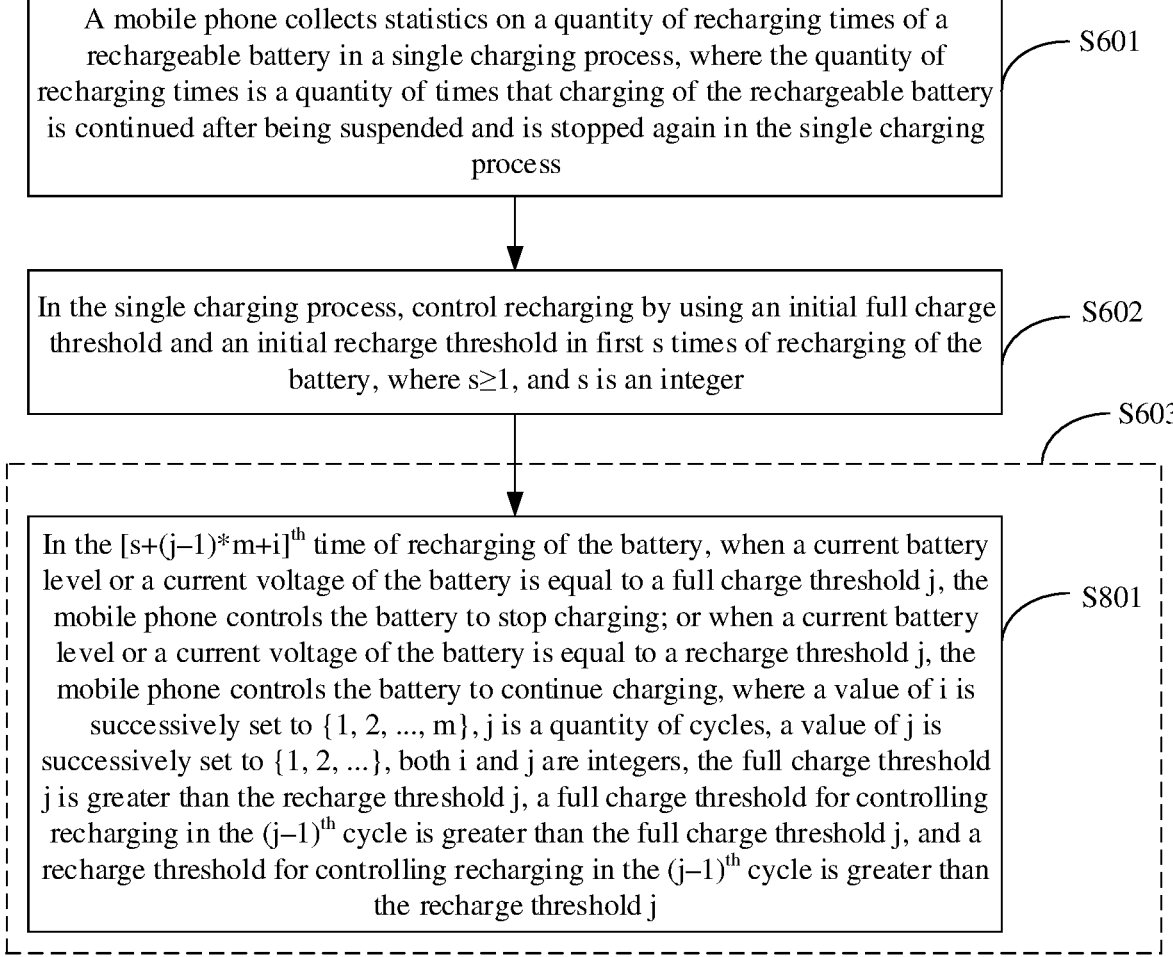

A mobile phone collects statistics on a quantity of recharging times of a rechargeable battery in a single charging process, where the quantity of recharging times is a quantity of times that charging of the rechargeable battery is continued after being suspended and is stopped again in the single charging process — S601

In the single charging process, control recharging by using an initial full charge threshold and an initial recharge threshold in first s times of recharging of the battery, where s≥1, and s is an integer — S602

S603

In the [s+(j−1)*m+i]$^{th}$ time of recharging of the battery, when a current battery level or a current voltage of the battery is equal to a full charge threshold j, the mobile phone controls the battery to stop charging; or when a current battery level or a current voltage of the battery is equal to a recharge threshold j, the mobile phone controls the battery to continue charging, where a value of i is successively set to {1, 2, ..., m}, j is a quantity of cycles, a value of j is successively set to {1, 2, ...}, both i and j are integers, the full charge threshold j is greater than the recharge threshold j, a full charge threshold for controlling recharging in the (j−1)$^{th}$ cycle is greater than the full charge threshold j, and a recharge threshold for controlling recharging in the (j−1)$^{th}$ cycle is greater than the recharge threshold j — S801

FIG. 8

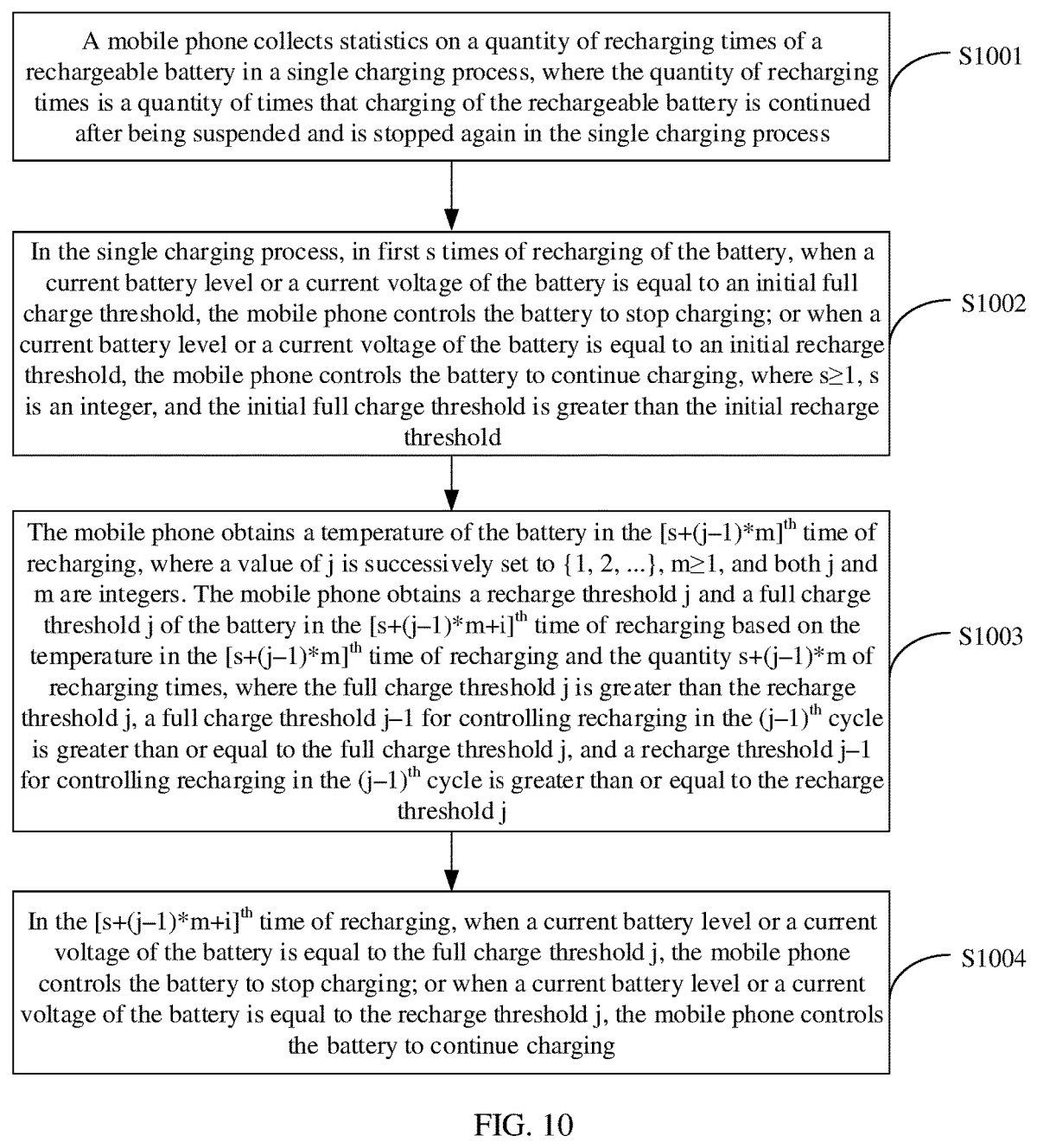

A mobile phone collects statistics on a quantity of recharging times of a rechargeable battery in a single charging process, where the quantity of recharging times is a quantity of times that charging of the rechargeable battery is continued after being suspended and is stopped again in the single charging process — S1001

In the single charging process, in first s times of recharging of the battery, when a current battery level or a current voltage of the battery is equal to an initial full charge threshold, the mobile phone controls the battery to stop charging; or when a current battery level or a current voltage of the battery is equal to an initial recharge threshold, the mobile phone controls the battery to continue charging, where $s \geq 1$, s is an integer, and the initial full charge threshold is greater than the initial recharge threshold — S1002

The mobile phone obtains a temperature of the battery in the $[s+(j-1)*m]^{th}$ time of recharging, where a value of j is successively set to $\{1, 2, ...\}$, $m \geq 1$, and both j and m are integers. The mobile phone obtains a recharge threshold j and a full charge threshold j of the battery in the $[s+(j-1)*m+i]^{th}$ time of recharging based on the temperature in the $[s+(j-1)*m]^{th}$ time of recharging and the quantity $s+(j-1)*m$ of recharging times, where the full charge threshold j is greater than the recharge threshold j, a full charge threshold j-1 for controlling recharging in the $(j-1)^{th}$ cycle is greater than or equal to the full charge threshold j, and a recharge threshold j-1 for controlling recharging in the $(j-1)^{th}$ cycle is greater than or equal to the recharge threshold j — S1003

In the $[s+(j-1)*m+i]^{th}$ time of recharging, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging — S1004

FIG. 10

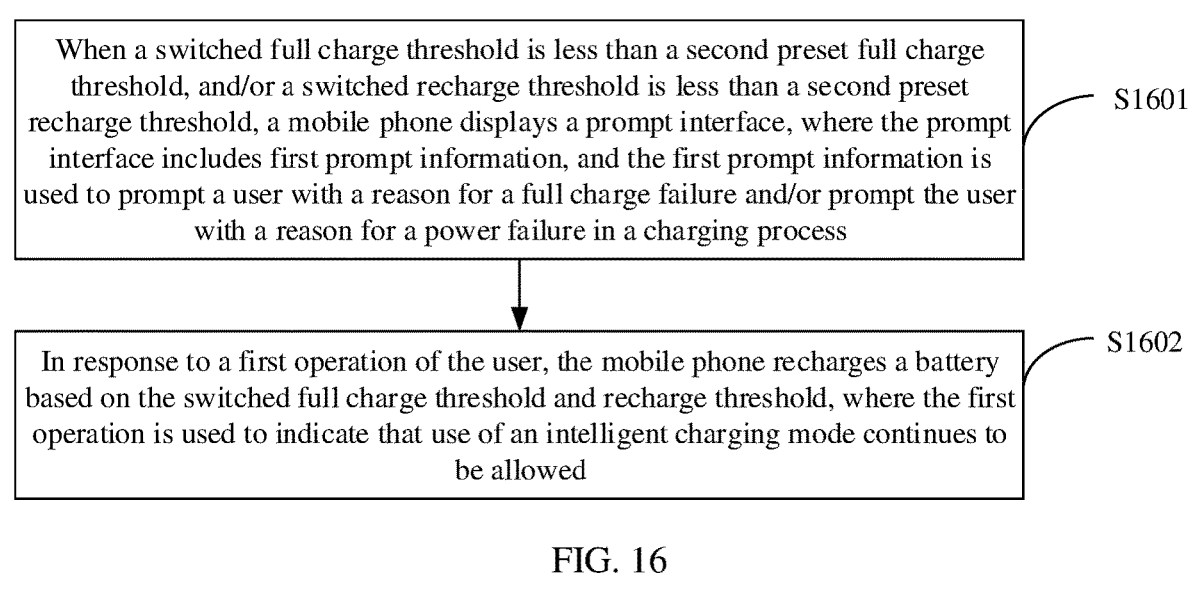

When a switched full charge threshold is less than a second preset full charge threshold, and/or a switched recharge threshold is less than a second preset recharge threshold, a mobile phone displays a prompt interface, where the prompt interface includes first prompt information, and the first prompt information is used to prompt a user with a reason for a full charge failure and/or prompt the user with a reason for a power failure in a charging process — S1601

In response to a first operation of the user, the mobile phone recharges a battery based on the switched full charge threshold and recharge threshold, where the first operation is used to indicate that use of an intelligent charging mode continues to be allowed — S1602

FIG. 16

BATTERY CHARGING METHOD AND ELECTRONIC DEVICE

CROSS-REFERENCE TO RELATED APPLICATIONS

This application is a national stage of International Application No. PCT/CN2022/078511, filed on Feb. 28, 2022, which claims priority to Chinese Patent Application No. 202110408822.3, filed on Apr. 15, 2021. The disclosures of both of the aforementioned applications are hereby incorporated by reference in their entireties.

TECHNICAL FIELD

This application relates to the field of battery charging technologies, and in particular, to a battery charging method and an electronic device.

BACKGROUND

As an important energy storage device, a battery (such as a lithium battery) is widely used in fields such as consumer electronics (such as a mobile phone and a computer) and electric vehicles. In addition, a battery life is mainly affected by a battery level status (or a voltage status) and a temperature. For example, if a battery is in a high battery level state or a high temperature state for a long time, aging and failure of the battery are prone to accelerate, resulting in a safety risk such as battery swelling.

In some actual scenarios, there may be a case in which an electronic device is charged for a long time. In one case, the electronic device may be powered on for a long time to ensure an endurance capability of the electronic device in a high power consumption scenario. For example, a mobile phone is charged while the mobile phone is used to play games. Another case is to reduce inconvenience caused by a charging plugging/unplugging operation. For example, a charger of an electric vehicle is plugged into a charging pile for a long time, and the charger is not unplugged until the vehicle is used next time.

In a current common power management technology, charging is stopped each time a battery is charged to a fixed full charge cut-off battery level (or a full charge cut-off voltage), and charging is continued each time a battery level decreases to a recharge battery level (or a battery voltage decreases to a recharge voltage). The recharge voltage is usually a fixed voltage value that is less than a rated full charge voltage 100 mV, and the recharge battery level is usually a fixed battery level value that is close to a full charge capacity (full charge capacity, FCC, where a unit is mAh).

In a scenario in which an electronic device is charged for a long time, especially in a scenario in which the electronic device needs to frequently obtain power from a battery because of high power consumption during running, if a recharge voltage is close to a rated full charge voltage or a recharge battery level is close to a full charge capacity, using the current common power management technology causes a result that a battery voltage or battery level quickly reaches a recharge threshold and recharging is performed frequently, and consequently the battery is still in a high battery level or high voltage state for a long time. In addition, heat is generated due to charging conversion efficiency in recharging, causing a temperature rise of the battery. Therefore, aging and failure of the battery accelerate, and a safety risk such as swelling occurs.

SUMMARY

This application provides a battery charging method and an electronic device, to dynamically and intelligently lower two charge thresholds, so as to improve charging conversion efficiency in recharging, and reduce battery heat. Therefore, a battery life can be effectively prolonged, and a safety risk such as battery swelling can be avoided.

According to a first aspect, an embodiment of this application provides a battery charging method, and the method may be applied to an electronic device. The electronic device collects statistics on a quantity of recharging times of a battery in at least one single charging process, where the quantity of recharging times is a quantity of times that charging of the battery is continued after being stopped and is stopped again in the at least one single charging process. In first n times of recharging of the battery, when a current battery level or a current voltage of the battery is equal to a first full charge threshold, the electronic device controls the battery to stop charging; or when a current battery level or a current voltage of the battery is equal to a first recharge threshold, the electronic device controls the battery to continue charging, where $n \geq 2$, n is an integer, and the first full charge threshold is greater than the first recharge threshold. In the $(n+i)^{th}$ time of recharging of the battery, when a current battery level or a current voltage of the battery is equal to a second full charge threshold, the electronic device controls the battery to stop charging; or when a battery level or a current voltage of the battery is equal to a second recharge threshold, the electronic device controls the battery to continue charging, where a value of i is successively set to $\{1, 2, \ldots \}$, i is an integer, and the second full charge threshold is greater than the second recharge threshold. The second full charge threshold is less than the first full charge threshold, and the second recharge threshold is less than the first recharge threshold.

In conclusion, according to the method in this embodiment of this application, in first n times of recharging and the $(n+i)^{th}$ time of recharging, a mobile phone separately controls recharging by using different full charge cut-off thresholds and recharge thresholds, so that two thresholds used for recharging match a quantity of recharging times, and then match comprehensive impact of charging duration and power consumption on a battery. This can improve reasonability of recharging control. In addition, in a single charging process, recharging is controlled by using only two different groups of thresholds, that is, recharging of the battery is controlled in a low voltage or battery level state, so that a control process of recharging control can be simplified. In addition, the second full charge threshold and the second recharge threshold in the $(n+i)^{th}$ time of recharging are respectively less than the first full charge cut-off threshold and the first recharge threshold in the first n times of recharging, that is, two thresholds for recharging are lowered after the quantity of recharge times reaches n, so that recharging of the battery can be implemented in a low voltage or battery level state. Compared with frequent recharging in a high voltage or high battery level state, recharging of the battery in a low voltage or battery level state can enable the battery to be in a lower battery level or voltage state. In addition, charging conversion efficiency in recharging is improved, and battery heat is reduced. Therefore, a battery life can be effectively prolonged, and a safety risk such as battery swelling can be avoided.

In a possible design manner of the first aspect, when the second full charge threshold is less than or equal to a second preset full charge threshold, the electronic device displays a prompt interface, where the prompt interface includes first prompt information, and the first prompt information is used to prompt a user with a reason for a full charge failure. When the second recharge threshold is less than or equal to a second preset recharge threshold, the electronic device displays a prompt interface, where the prompt interface includes first prompt information, and the first prompt information is used to prompt a user with a reason for a power failure in a single charging process.

In other words, according to the method in this embodiment of this application, the first prompt information may be displayed on an appropriate occasion, to prompt the user with the reason for the full charge failure and/or prompt the user with the reason for the power failure in the charging process. In this way, intelligent charging protection is implemented, a battery life is prolonged, and experience of human-computer interaction is improved.

In a possible design manner of the first aspect, the prompt interface further includes second prompt information, the second prompt information is used to prompt the user to select a charging mode, and the second prompt information includes a first charging mode selection control and a second charging mode selection control. That the electronic device controls the battery to stop charging when a current battery level or a current voltage of the battery is equal to a second full charge threshold; or the electronic device controls the battery to continue charging when a current battery level or a current voltage of the battery is equal to a second recharge threshold in the $(n+i)^{th}$ time of recharging of the battery includes: In response to a first operation performed by the user on the first charging mode selection control, in the $(n+i)^{th}$ time of recharging of the battery, when the current battery level or the current voltage of the battery is equal to the second full charge threshold, the electronic device controls the battery to stop charging; or when the current battery level or the current voltage of the battery is equal to the second recharge threshold, the electronic device controls the battery to continue charging, where the first operation is used to indicate that use of a first charging mode is allowed to be continued.

In other words, according to the method in this embodiment of this application, a requirement of the user may be accurately determined based on an operation performed by the user on the second prompt information.

In a possible design manner of the first aspect, the second full charge threshold is equal to a preset full charge threshold, and the preset full charge threshold is less than or equal to a product of 85% and a full charge capacity FCC of the electronic device.

In a possible design manner of the first aspect, the preset full charge threshold is a product of 80% and the full charge capacity FCC of the electronic device.

In other words, according to the method in this embodiment of this application, the second full charge threshold is less than or equal to 85% FCC, so that charging performed in a high battery level state when the quantity of recharging times is relatively large can be avoided. In this way, charging conversion efficiency in recharging can be improved, and battery heat can be reduced.

According to a second aspect, an embodiment of this application provides another battery charging method, applied to an electronic device. The electronic device collects statistics on a quantity of recharging times of a battery in at least one single charging process, where the quantity of recharging times is a quantity of times that charging of the battery is continued after being stopped and is stopped again in the at least one single charging process. In first s times of recharging of the battery, when a current battery level or a current voltage of the battery is equal to an initial full charge threshold, the electronic device controls the battery to stop charging; or when a current battery level or a current voltage of the battery is equal to an initial recharge threshold, the electronic device controls the battery to continue charging, where s≥1, s is a positive integer, and the initial full charge threshold is greater than the initial recharge threshold. In the $[s+(j-1)*m+i]^{th}$ time of recharging of the battery, when a current battery level or a current voltage of the battery is equal to a full charge threshold j, the electronic device controls the battery to stop charging; or when a current battery level or a current voltage of the battery is equal to a recharge threshold j, the electronic device controls the battery to continue charging, where m is a cycle length, m≥1, a value of i is successively set to {1, 2, . . . , m}, j is a quantity of cycles, a value of j is successively set to {1, 2, . . . }, m, i, and j are all integers, the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the $(j-1)^{th}$ cycle.

In conclusion, according to the method in this embodiment of this application, each time the quantity of recharging times increases by n, a group including a reduced full charge threshold and a reduced recharge threshold is switched to control recharging. A lowered full charge threshold and a lowered recharge threshold are periodically used to control recharging, that is, a plurality of groups of different thresholds may be used to control recharging in a single charging process, so that flexibility of recharging control is improved. In addition, two thresholds used for recharging match the quantity of recharging times, and then match comprehensive impact of charging duration and power consumption on the battery. This can improve reasonability of recharging control. In addition, the recharge threshold and the full charge threshold decrease periodically. In this case, recharging may be implemented in a lower voltage or battery level state when the quantity of recharging times is larger. Compared with frequent recharging in a high voltage or high battery level state, recharging of the battery in a low voltage or battery level state can enable the battery to be in a lower battery level or voltage state. In addition, charging conversion efficiency in recharging is improved, and battery heat is reduced. Therefore, a battery life can be effectively prolonged, and a safety risk such as battery swelling can be avoided.

In a possible design manner of the second aspect, if $s+(j-1)*m+i$ is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to {1, 2, . . . }, M>s, and both k and M are integers.

In a possible design manner of the second aspect, if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots\}$, and k is an integer. If the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots\}$.

In other words, according to the method in this embodiment of this application, after the quantity-of-recharging-times threshold M is reached, a full charge threshold and a recharge threshold are kept unchanged. Alternatively, when a full charge threshold is reduced to the first preset full charge threshold or less, and/or when a recharge threshold is reduced to the first preset recharge threshold or less, the full charge threshold and the recharge threshold may be kept unchanged. This can avoid a problem that endurance time of the battery is greatly reduced because the full charge threshold and/or the recharge threshold are/is too small. In this way, the full charge threshold and the recharge threshold can be finally stabilized in an appropriate range, to avoid that the full charge threshold and/or the recharge threshold are/is too small.

In a possible design manner of the second aspect, in a single charging process, m changes according to a preset rule.

In other words, according to the method in this embodiment of this application, a combination of a plurality of different cycles may be used to obtain a single charging process in which a smaller full charge threshold and a smaller recharge threshold are switched in any time of recharging, so that flexibility of recharging control is further improved.

In a possible design manner of the second aspect, when the full charge threshold j is less than or equal to a second preset full charge threshold, the electronic device displays a prompt interface, where the prompt interface includes first prompt information, and the first prompt information is used to prompt a user with a reason for a full charge failure. When the recharge threshold j is less than or equal to a second preset recharge threshold, the electronic device displays a prompt interface, where the prompt interface includes first prompt information, and the first prompt information is used to prompt a user with a reason for a power failure in a single charging process.

In other words, according to the method in this embodiment of this application, the first prompt information may be displayed on an appropriate occasion, to prompt the user with the reason for the full charge failure and/or prompt the user with the reason for the power failure in the charging process. In this way, intelligent charging protection is implemented, a battery life is prolonged, and experience of human-computer interaction is improved.

In a possible design manner of the second aspect, the prompt interface further includes second prompt information, the second prompt information is used to prompt the user to select a charging mode, and the second prompt information includes a first charging mode selection control and a second charging mode selection control. That the electronic device controls the battery to stop charging when a current battery level or a current voltage of the battery is equal to a full charge threshold j; or the electronic device controls the battery to continue charging when a current battery level or a current voltage of the battery is equal to a recharge threshold j in the $[s+(j-1)*m+i]^{th}$ time of recharging of the battery includes: In response to a first operation performed by the user on the first charging mode selection control, in the $[s+(j-1)*m+i]^{th}$ time of recharging of the battery, when the current battery level or the current voltage of the battery is equal to the full charge threshold j, the electronic device controls the battery to stop charging; or when the current battery level or the current voltage of the battery is equal to the recharge threshold j, the electronic device controls the battery to continue charging, where the first operation is used to indicate that use of a first charging mode is allowed to be continued.

In other words, according to the method in this embodiment of this application, a requirement of the user may be accurately determined based on an operation performed by the user on the second prompt information.

In a possible design manner of the second aspect, the electronic device includes a first preset AI model, and the first preset AI model has a function of determining a full charge threshold and a recharge threshold of the battery based on a quantity of recharging times of the battery. The electronic device runs the first preset AI model by using the quantity $s+(j-1)*m+i$ of recharging times as an input, to output the full charge threshold j and the recharge threshold j.

In other words, according to the method in this embodiment of this application, a full charge threshold and a recharge threshold are predicted by using a preset AI model. In this way, an intelligence degree of obtaining the full charge threshold and the recharge threshold can be improved.

According to a third aspect, an embodiment of this application provides another battery charging method, applied to an electronic device. The electronic device collects statistics on a quantity of recharging times of a battery in at least one single charging process, where the quantity of recharging times is a quantity of times that charging of the battery is continued after being stopped and is stopped again in the at least one single charging process. In a single charging process, in first s times of recharging of the battery, when a current battery level or a current voltage of the battery is equal to an initial full charge threshold, the electronic device controls the battery to stop charging; or when a current battery level or a current voltage of the battery is equal to an initial recharge threshold, the electronic device controls the battery to continue charging, where $s \geq 1$, s is an integer, and the initial full charge threshold is greater than the initial recharge threshold. The electronic device obtains a temperature of the battery in the $[s+(j-1)*m]^{th}$ time of recharging, where j is a quantity of cycles, a value of j is successively set to $\{1, 2, \ldots\}$, m is a cycle length, $m \geq 1$, and both j and m are integers. The electronic device obtains a recharge threshold j and a full charge threshold j of the battery in the $[s+(j-1)*m+i]^{th}$ time of recharging based on the temperature in the $[s+(j-1)*m]^{th}$ time of recharging and the quantity $s+(j-1)*m$ of recharging times, where the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the $(j-1)^{th}$ cycle. In the $[s+(j-1)*m+i]^{th}$ time of recharging, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging.

In conclusion, according to the method in this embodiment of this application, a full charge threshold and a recharge threshold for controlling recharging in the $j^{th}$ cycle are obtained with reference to the quantity $s+(j-1)*m$ of recharging times and the temperature in the $[s+(j-1)*m]^{th}$ time of recharging, so that two thresholds used in each cycle match a quantity of recharging times and a temperature, and then reasonability of recharging control can be further improved. In addition, a lowered full charge threshold and a lowered recharge threshold are periodically used to control recharging, that is, a plurality of groups of different thresholds may be used to control recharging in a single charging process, so that flexibility of recharging control is improved. In addition, the recharge threshold and the full charge threshold decrease periodically. In this case, recharging may be implemented in a lower voltage or battery level state when the quantity of recharging times is larger. Compared with frequent recharging in a high voltage or high battery level state, recharging of the battery in a low voltage or battery level state can improve charging conversion efficiency in recharging and reduce battery heat. Therefore, a battery life can be effectively prolonged, and a safety risk such as battery swelling can be avoided.

In a possible design manner of the third aspect, if $s+(j-1)*m+i$ is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots\}$, M>s, and both k and M are integers.

In a possible design manner of the third aspect, if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots\}$, and k is an integer. If the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots\}$.

In a possible design manner of the third aspect, in a single charging process, m changes according to a preset rule.

In a possible design manner of the third aspect, when the full charge threshold j is less than or equal to a second preset full charge threshold, the electronic device displays a prompt interface, where the prompt interface includes first prompt information, and the first prompt information is used to prompt a user with a reason for a full charge failure. When the recharge threshold j is less than or equal to a second preset recharge threshold, the electronic device displays a prompt interface, where the prompt interface includes first prompt information, and the first prompt information is used to prompt a user with a reason for a power failure in a single charging process.

In a possible design manner of the third aspect, the prompt interface further includes second prompt information, the second prompt information is used to prompt the user to select a charging mode, and the second prompt information includes a first charging mode selection control and a second charging mode selection control. That the electronic device controls the battery to stop charging when a current battery level or a current voltage of the battery is equal to the full charge threshold j; or the electronic device controls the battery to continue charging when a current battery level or a current voltage of the battery is equal to the recharge threshold j in the $[s+(j-1)*m+i]^{th}$ time of recharging of the battery includes: In response to a first operation performed by the user on the first charging mode selection control, in the $[s+(j-1)*m+i]^{th}$ time of recharging of the battery, when the current battery level or the current voltage of the battery is equal to the full charge threshold j, the electronic device controls the battery to stop charging; or when the current battery level or the current voltage of the battery is equal to the recharge threshold j, the electronic device controls the battery to continue charging, where the first operation is used to indicate that use of a first charging mode is allowed to be continued.

In a possible design manner of the third aspect, the electronic device includes a second preset AI model, and the second preset AI model has a function of determining a full charge threshold and a recharge threshold of the battery based on a quantity of recharging times and a temperature of the battery. That the electronic device obtains a recharge threshold j and a full charge threshold j of the battery in the $[s+(j-1)*m+i]^{th}$ time of recharging based on the temperature in the $[s+(j-1)*m]^{th}$ time of recharging and the quantity $s+(j-1)*m$ of recharging times includes: The electronic device runs the second preset AI model by using the temperature in the $[s+(j-1)*m]^{th}$ time of recharging and the quantity $s+(j-1)*m$ of recharging times as an input, to output the full charge threshold j and the recharge threshold j.

For effects of the foregoing possible design manners of the third aspect, refer to the effects of the corresponding design manners of the second aspect. Details are not described herein again.

According to a fourth aspect, an embodiment of this application provides an electronic device. The electronic device includes a battery, a display, a memory, and one or more processors. The display, the memory, and a processor are coupled to each other. The memory is configured to store computer program code. The computer program code includes computer instructions. When the computer instructions are executed by the processor, the electronic device is enabled to perform the following steps: The electronic device collects statistics on a quantity of recharging times of the battery in at least one single charging process, where the quantity of recharging times is a quantity of times that charging of the battery is continued after being stopped and is stopped again in the at least one single charging process. In first n times of recharging of the battery, when a current battery level or a current voltage of the battery is equal to a first full charge threshold, the electronic device controls the battery to stop charging; or when a current battery level or a current voltage of the battery is equal to a first recharge threshold, the electronic device controls the battery to continue charging, where n≥2, n is an integer, and the first full charge threshold is greater than the first recharge threshold. In the $(n+i)^{th}$ time of recharging of the battery, when a current battery level or a current voltage of the battery is equal to a second full charge threshold, the electronic device controls the battery to stop charging; or when a battery level or a current voltage of the battery is equal to a second recharge threshold, the electronic device controls the battery to continue charging, where a value of i is successively set to $\{1, 2, \ldots \}$, i is an integer, and the second full charge threshold is greater than the second recharge threshold. The second full charge threshold is less than the first full charge threshold, and the second recharge threshold is less than the first recharge threshold.

In a possible design manner of the fourth aspect, when the second full charge threshold is less than or equal to a second preset full charge threshold, the electronic device displays a prompt interface, where the prompt interface includes first prompt information, and the first prompt information is used to prompt a user with a reason for a full charge failure. When the second recharge threshold is less than or equal to a second preset recharge threshold, the electronic device displays a prompt interface, where the prompt interface includes first prompt information, and the first prompt information is used to prompt a user with a reason for a power failure in a single charging process.

In a possible design manner of the fourth aspect, the prompt interface further includes second prompt information, the second prompt information is used to prompt the user to select a charging mode, and the second prompt information includes a first charging mode selection control and a second charging mode selection control. That the electronic device controls the battery to stop charging when a current battery level or a current voltage of the battery is equal to a second full charge threshold; or the electronic device controls the battery to continue charging when a current battery level or a current voltage of the battery is equal to a second recharge threshold in the $(n+i)^{th}$ time of recharging of the battery includes: In response to a first operation performed by the user on the first charging mode selection control, in the $(n+i)^{th}$ time of recharging of the battery, when the current battery level or the current voltage of the battery is equal to the second full charge threshold, the electronic device controls the battery to stop charging; or when the current battery level or the current voltage of the battery is equal to the second recharge threshold, the electronic device controls the battery to continue charging.

In a possible design manner of the fourth aspect, the second full charge threshold is equal to a preset full charge threshold, and the preset full charge threshold is less than or equal to a product of 85% and a full charge capacity FCC of the electronic device.

In a possible design manner of the fourth aspect, the preset full charge threshold is a product of 80% and the full charge capacity FCC of the electronic device.

According to a fifth aspect, an embodiment of this application provides an electronic device. The electronic device includes a battery, a display, a memory, and one or more processors. The display, the memory, and a processor are coupled to each other. The memory is configured to store computer program code. The computer program code includes computer instructions. When the computer instructions are executed by the processor, the electronic device is enabled to perform the following steps: The electronic device collects statistics on a quantity of recharging times of the battery in at least one single charging process, where the quantity of recharging times is a quantity of times that charging of the battery is continued after being stopped and is stopped again in the at least one single charging process. In first s times of recharging of the battery, when a current battery level or a current voltage of the battery is equal to an initial full charge threshold, the electronic device controls the battery to stop charging; or when a current battery level or a current voltage of the battery is equal to an initial recharge threshold, the electronic device controls the battery to continue charging, where $s \geq 1$, s is a positive integer, and the initial full charge threshold is greater than the initial recharge threshold. In the $[s+(j-1)*m+i]^{th}$ time of recharging of the battery, when a current battery level or a current voltage of the battery is equal to a full charge threshold j, the electronic device controls the battery to stop charging; or when a current battery level or a current voltage of the battery is equal to a recharge threshold j, the electronic device controls the battery to continue charging, where m is a cycle length, $m \geq 1$, a value of i is successively set to $\{1, 2, \ldots, m\}$, j is a quantity of cycles, a value of j is successively set to $\{1, 2, \ldots \}$, m, i, and j are all integers, the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the (j−1) cycle.

In a possible design manner of the fifth aspect, if $s+(j-1)*m+i$ is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots \}$, $M>s$, and both k and M are integers.

In a possible design manner of the fifth aspect, if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots \}$, and k is an integer. If the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to $\{1, 2, \ldots \}$.

In a possible design manner of the fifth aspect, in a single charging process, m changes according to a preset rule.

In a possible design manner of the fifth aspect, when the full charge threshold j is less than or equal to a second preset full charge threshold, the electronic device displays a prompt interface, where the prompt interface includes first prompt information, and the first prompt information is used to prompt a user with a reason for a full charge failure. When the recharge threshold j is less than or equal to a second preset recharge threshold, the electronic device displays a prompt interface, where the prompt interface includes first prompt information, and the first prompt information is used to prompt a user with a reason for a power failure in a single charging process.

In a possible design manner of the fifth aspect, the prompt interface further includes second prompt information, and the second prompt information is used to prompt the user to select a charging mode. That the electronic device controls the battery to stop charging when a current battery level or a current voltage of the battery is equal to a full charge threshold j; or the electronic device controls the battery to continue charging when a current battery level or a current voltage of the battery is equal to a recharge threshold j in the $[s+(j-1)*m+i]^{th}$ time of recharging of the battery includes: In response to a first operation performed by the user on the second prompt information, in the $[s+(j-1)*m+i]^{th}$ time of recharging of the battery, when the current battery level or the current voltage of the battery is equal to the full charge threshold j, the electronic device controls the battery to stop charging; or when the current battery level or the current voltage of the battery is equal to the recharge threshold j, the electronic device controls the battery to continue charging.

In a possible design manner of the fifth aspect, the electronic device includes a first preset AI model, and the first preset AI model has a function of determining a full charge threshold and a recharge threshold of the battery based on a quantity of recharging times of the battery. The electronic device runs the first preset AI model by using the quantity $s+(j-1)*m+i$ of recharging times as an input, to output the full charge threshold j and the recharge threshold j.

According to a sixth aspect, an embodiment of this application provides an electronic device. The electronic device includes a battery, a display, a memory, and one or more processors. The display, the memory, and a processor are coupled to each other. The memory is configured to store computer program code. The computer program code includes computer instructions. When the computer instructions are executed by the processor, the electronic device is enabled to perform the following steps: The electronic device collects statistics on a quantity of recharging times of the battery in at least one single charging process, where the quantity of recharging times is a quantity of times that charging of the battery is continued after being stopped and is stopped again in the at least one single charging process. In a single charging process, in first s times of recharging of the battery, when a current battery level or a current voltage of the battery is equal to an initial full charge threshold, the electronic device controls the battery to stop charging; or when a current battery level or a current voltage of the battery is equal to an initial recharge threshold, the electronic device controls the battery to continue charging, where s≥1, s is an integer, and the initial full charge threshold is greater than the initial recharge threshold. The electronic device obtains a temperature of the battery in the $[s+j-1)*m]^{th}$ time of recharging, where j is a quantity of cycles, a value of j is successively set to {1, 2, . . . }, m is a cycle length, m 1, and both j and m are integers. The electronic device obtains a recharge threshold j and a full charge threshold j of the battery in the $[s+(j-1)*m+i]^{th}$ time of recharging based on the temperature in the $[s+(j-1)*m]^{th}$ time of recharging and the quantity $s+j-1)*m$ of recharging times, where the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the $(j-1)^{th}$ cycle. In the $[s+(j-1)*m+i]^{th}$ time of recharging, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging.

In a possible design manner of the sixth aspect, if $s+(j-1)*m+i$ is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to {1, 2, . . . }, M>s, and both k and M are integers.

In a possible design manner of the sixth aspect, if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to {1, 2, . . . }, and k is an integer. If the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, where a value of k is successively set to {1, 2, . . . }.

In a possible design manner of the sixth aspect, in a single charging process, m changes according to a preset rule.

In a possible design manner of the sixth aspect, when the full charge threshold j is less than or equal to a second preset full charge threshold, the electronic device displays a prompt interface, where the prompt interface includes first prompt information, and the first prompt information is used to prompt a user with a reason for a full charge failure. When the recharge threshold j is less than or equal to a second preset recharge threshold, the electronic device displays a prompt interface, where the prompt interface includes first prompt information, and the first prompt information is used to prompt a user with a reason for a power failure in a single charging process.

In a possible design manner of the sixth aspect, the prompt interface further includes second prompt information, and the second prompt information is used to prompt the user to select a charging mode. That the electronic device controls the battery to stop charging when a current battery level or a current voltage of the battery is equal to the full charge threshold j; or the electronic device controls the battery to continue charging when a current battery level or a current voltage of the battery is equal to the recharge threshold j in the $[s+(j-1)*m+i]^{th}$ time of recharging of the battery includes: In response to a first operation performed by the user on the second prompt information, in the $[s+(j-1)*m+i]^{th}$ time of recharging of the battery, when the current battery level or the current voltage of the battery is equal to the full charge threshold j, the electronic device controls the battery to stop charging; or when the current battery level or the current voltage of the battery is equal to the recharge threshold j, the electronic device controls the battery to continue charging.

In a possible design manner of the sixth aspect, the electronic device includes a second preset AI model, and the second preset AI model has a function of determining a full charge threshold and a recharge threshold of the battery based on a quantity of recharging times and a temperature of the battery. That the electronic device obtains a recharge threshold j and a full charge threshold j of the battery in the $[s+(j-1)*m+i]^{th}$ time of recharging based on the temperature in the $[s+(j-1)*m]^{th}$ time of recharging and the quantity $s+(j-1)*m$ of recharging times includes: The electronic device runs the second preset AI model by using the temperature in the $[s+(j-1)*m]^{th}$ time of recharging and the quantity $s+(j-1)*m$ of recharging times as an input, to output the full charge threshold j and the recharge threshold j.

According to a seventh aspect, an embodiment of this application provides a chip system. The chip system is applied to an electronic device including a display and a memory. The chip system includes one or more interface circuits and one or more processors. An interface circuit is interconnected to a processor by using a line. The interface circuit is configured to receive a signal from the memory of the electronic device, and send the signal to the processor. The signal includes computer instructions stored in the memory. When the processor executes the computer instructions, the electronic device performs the method according to any one of the first aspect to the third aspect and the possible design manners of the first aspect to the third aspect.

According to an eighth aspect, this application provides a computer storage medium. The computer storage medium includes computer instructions, and when the computer instructions are run on an electronic device, the electronic device is enabled to perform the method according to any one of the first aspect to the third aspect and the possible design manners of the first aspect to the third aspect.

According to a ninth aspect, this application provides a computer program product. When the computer program product runs on a computer, the computer is enabled to perform the method according to any one of the first aspect to the third aspect and the possible design manners of the first aspect to the third aspect.

It may be understood that for beneficial effects that can be achieved by the electronic devices according to the fourth aspect to the sixth aspect, the chip system according to the seventh aspect, the computer storage medium according to the eighth aspect, and the computer program product according to the ninth aspect, refer to the beneficial effects in the first aspect to the third aspect and any possible design manner of the first aspect to the third aspect. Details are not described herein again.

BRIEF DESCRIPTION OF THE DRAWINGS

FIG. 4 is a flowchart of a battery charging method according to an embodiment of this application;
FIG. 6 is a flowchart of another battery charging method according to an embodiment of this application;

FIG. 8 is a flowchart of another battery charging method according to an embodiment of this application;
FIG. 10 is a flowchart of another battery charging method according to an embodiment of this application;
FIG. 16 is a flowchart of an intelligent charging protection prompt method according to an embodiment of this application.

DETAILED DESCRIPTION OF ILLUSTRATIVE EMBODIMENTS

The following terms "first" and "second" are merely used for description, but should not be understood as indicating or implying relative importance or implying a quantity of indicated technical features. Therefore, a feature limited by "first" or "second" may explicitly or implicitly include one or more features. In descriptions of the embodiments, unless otherwise stated, "a plurality of" means two or more.

The following describes implementations of the embodiments in detail with reference to the accompanying drawings. For ease of understanding, embodiments of this application first describe in detail a technical problem existing in a conventional battery charging process.

In the conventional battery charging process, when a battery voltage drops to a recharge voltage (for example, lower than a rated full charge voltage 50~100 mV), a charging phase may be entered again. Alternatively, when a battery level drops to a recharge battery level (for example, 95% FCC), a charging phase is entered again.

Figure 1:
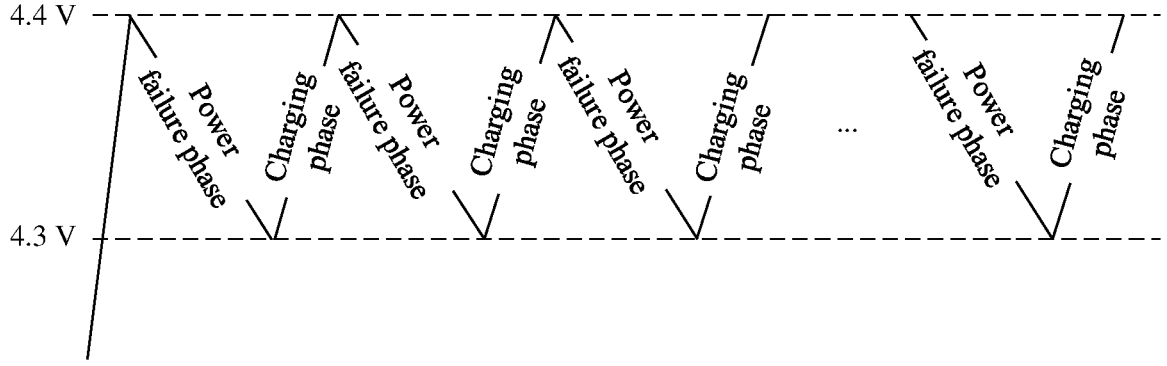
FIG. 1 is a schematic diagram of a battery charging process in the conventional technology.

For example, the conventional battery charging process is described by using an example in which a battery voltage is used as a determining basis for battery recharging. It is assumed that a rated full charge voltage of a battery is 4.4 V, a full charge cut-off voltage is 4.4 V, and a recharge voltage is 4.3 V. As shown in FIG. 1, after power-on, charging is stopped after the battery is charged to the rated full charge voltage 4.4 V for the first time. Then, each time a battery voltage drops from the full charge cut-off voltage 4.4 V to the fixed recharge voltage 4.3 V, a charging phase is entered again, so that the battery voltage is restored to the full charge cut-off voltage 4.4 V. In this charging manner, the battery can be prevented from being always in a fully charged state, and a battery life can be prolonged to some extent.

However, because a difference between 4.4 V and 4.3 V is relatively small, when running power consumption of an electronic device is relatively high, and power needs to be frequently obtained from the battery, the battery voltage rapidly drops from the full charge cut-off voltage 4.4 V to the recharge voltage 4.3 V, causing frequent recharging. In addition, because the difference between 4.4 V and 4.3 V is relatively small, in frequent recharging, although the battery is not always in a fully charged state, the battery is still always in a high voltage state. In the high voltage state, a charging manner of the battery is usually constant-voltage charging. During constant-voltage charging, charging conversion efficiency is low, and a large amount of heat is generated. Consequently, a temperature of the battery increases rapidly, aging and failure of the battery are accelerated, and a safety risk such as swelling occurs.

Similarly, a process in which a full charge cut-off battery level and a recharge battery level are used as an end point and a start point of a charging phase is the same as a principle of completing battery charging in the voltage-based manner shown in FIG. 1, and also has the foregoing technical problem. No repeated analysis is performed herein.

It should be explained herein that, usually, when a battery level is higher than 85% FCC, it is considered that the battery is in a high battery level state; and/or when a battery voltage is higher than a voltage corresponding to 85% FCC, it is considered that the battery is in a high voltage state. There is a correspondence between a battery voltage and a battery level. For example, if a rated full charge voltage is 4.4 V, 4.4 V corresponds to 100% FCC and 4.35 V corresponds to 95% FCC.

Herein, to avoid ambiguity, several concepts in embodiments of this application are described as follows:

(1) Single charging: A process from a moment at which an electronic device is connected to a charging power supply to a moment at which the electronic device is disconnected from the charging power supply is referred to as one time of charging.

Figure 2:
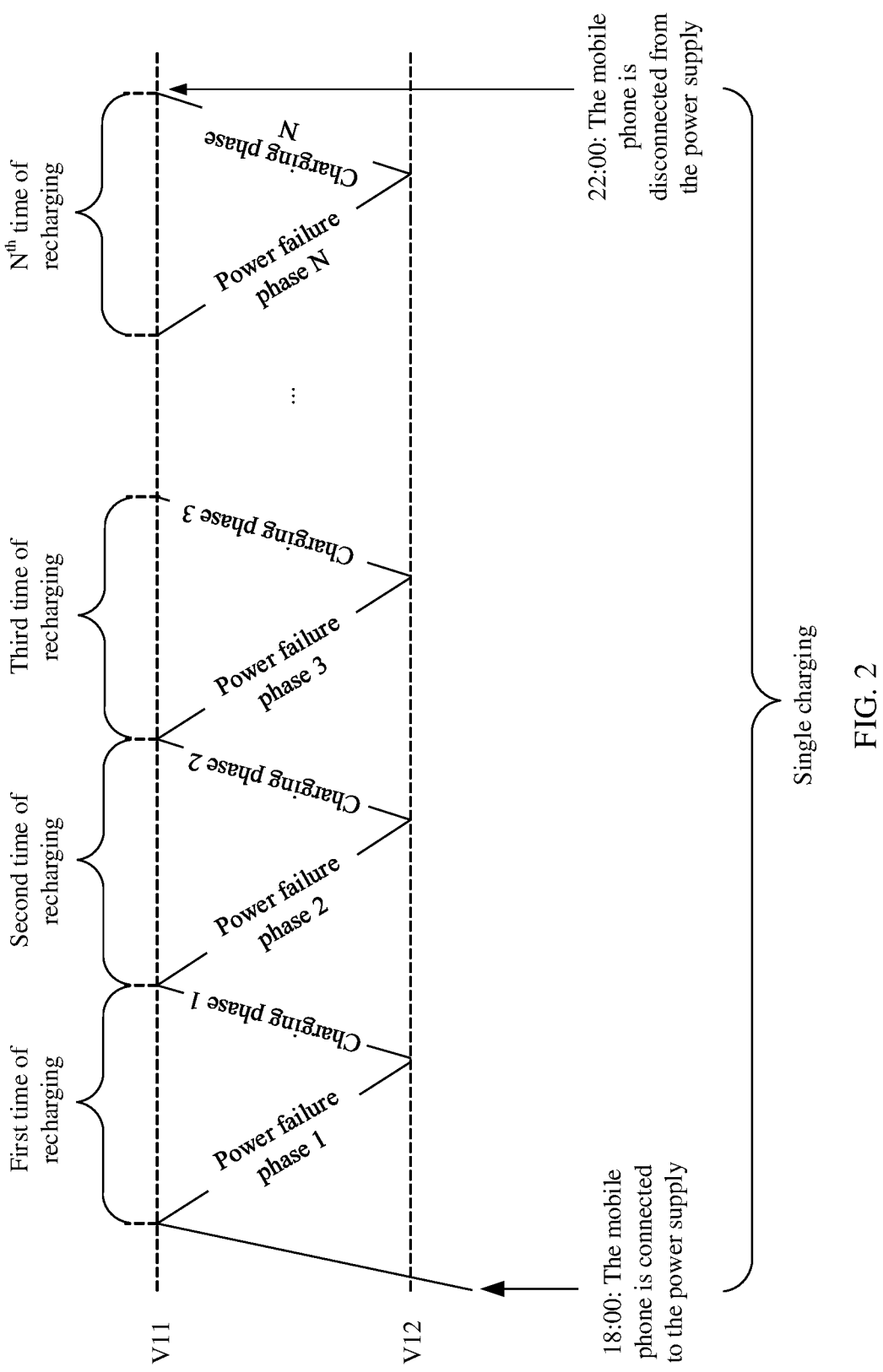
FIG. 2 is a schematic diagram of a battery charging process according to an embodiment of this application.

For example, as shown in FIG. 2, a mobile phone is connected to a power supply at 18:00, and the mobile phone is disconnected from the power supply at 22:00. Correspondingly, single charging refers to a process in which the mobile phone and the power supply are connected between 18:00 and 22:00.

It should be understood that the mobile phone and the power supply may be connected in a wired manner. For example, the mobile phone and the power supply are connected by using a power adapter and a data cable. Alternatively, the mobile phone and the power supply may be connected in a wireless manner. For example, the mobile phone and the power supply are connected by using a wireless charging coil.

(2) Recharging, also referred to as resuming charging: Recharging refers to a cycle in which a voltage of a battery decreases from a full charge cut-off voltage to a recharge voltage, and then increases from the recharge voltage to the full charge cut-off voltage, or a cycle in which a battery level of a battery decreases from a full charge cut-off battery level to a recharge battery level, and then increases from the recharge battery level to the full charge cut-off battery level. It should be noted that a single charging process may include one or more times of recharging.

For example, it is assumed that a mobile phone is charged while being used by a user. As shown in FIG. 2, the mobile phone is connected to the power supply at 18:00, and charging is stopped after the mobile phone is charged to V11. In a process in which the user uses the mobile phone, energy consumption is caused, and a battery voltage gradually decreases from V11 to V12. After the battery voltage decreases to V12, charging is continued. Charging is stopped when the battery is charged to V11 again. To be specific, the foregoing process in which the battery voltage decreases from V11 to V12 and then increases from V12 to V11 is one time of recharging (for example, the first time of recharging in FIG. 2).

One time of recharging may include two phases: a power failure phase and a charging phase (such as a power failure phase and a charging phase marked in FIG. 1). A voltage is used as an example. The power failure phase is a phase in which the voltage of the battery decreases from a full charge cut-off voltage to a recharge voltage, and the charging phase is a phase in which the voltage of the battery increases from the recharge voltage to the full charge cut-off voltage.

For example, as shown in FIG. 2, a single charging process includes N times of recharging, which are respectively the first time of recharging, the second time of recharging, the third time of recharging, . . . , and the $N^{th}$ time of recharging. The first time of recharging includes a power failure phase 1 and a charging phase 1 shown in FIG. 2. The power failure phase 1 is a phase in which the battery decreases from the full charge cut-off voltage V11 to the recharge voltage V12 for the first time. The charging phase 1 is a phase in which the battery increases from the recharge voltage V12 to the full charge cut-off voltage V11 after decreasing from the full charge cut-off voltage V11 to the recharge voltage V12 for the first time.

As shown in FIG. 2, the second time of recharging includes a power failure phase 2 and a charging phase 2. The power failure phase 2 is a phase in which the battery decreases from the full charge cut-off voltage V11 to the recharge voltage V12 for the second time. The charging phase 2 is a phase in which the battery increases from the recharge voltage V12 to the full charge cut-off voltage V11 after decreasing from the full charge cut-off voltage V11 to the recharge voltage V12 for the second time.

As shown in FIG. 2, the third time of recharging includes a power failure phase 3 and a charging phase 3. The power failure phase 3 is a phase in which the battery decreases from the full charge cut-off voltage V11 to the recharge voltage V12 for the third time. The charging phase 3 is a phase in which the battery increases from the recharge voltage V12 to the full charge cut-off voltage V11 after decreasing from the full charge cut-off voltage V11 to the recharge voltage V12 for the third time.

As shown in FIG. 2, the $N^{th}$ time of recharging includes a power failure phase N and a charging phase N. The power failure phase N is a phase in which the battery decreases from the full charge cut-off voltage V11 to the recharge voltage V12 for the $N^{th}$ time. The charging phase N is a phase in which the battery increases from the recharge voltage V12 to the full charge cut-off voltage V11 after decreasing from the full charge cut-off voltage V11 to the recharge voltage V12 for the $N^{th}$ time.

Embodiments of this application provide a battery charging method. The method may be applied to an electronic device including a battery (for example, a lithium battery). The battery provides electrical energy for operation of the electronic device. The electronic device may collect a quantity of recharging times of the battery by a current moment in a single charging process. Then, the electronic device may lower two charge thresholds (for example, a full charge threshold and a recharge threshold) based on the quantity of recharging times, and then control recharging by using two lowered charge thresholds. The full charge threshold may be a full charge cut-off voltage, and the recharge threshold may be a recharge voltage. Alternatively, the full charge threshold may be a full charge cut-off battery level, and the recharge threshold may be a recharge battery level.

In conclusion, according to the method in embodiments of this application, in a single charging process, the electronic device may lower the foregoing two charge thresholds according to the quantity of recharging times based on cumulative impact of the quantity of recharging times on the battery. Therefore, compared with a fixed recharge threshold in a conventional technology, in embodiments of this application, two charge thresholds may be dynamically and intelligently adjusted, to avoid frequent recharging of the battery in a high voltage or high battery level state.

It should be understood that, after recharging is controlled by using the two lowered charge thresholds, recharging of the battery can be implemented in a low voltage or battery level state. Compared with frequent recharging in a high voltage or high battery level state, recharging of the battery in a low voltage or battery level state can improve charging conversion efficiency in recharging and reduce battery heat. Therefore, a battery life can be effectively prolonged, and a safety risk such as battery swelling can be avoided.

For example, the electronic device in embodiments of this application may be a device such as a mobile phone, a vehicle, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not specifically limited in embodiments of this application.

Figure 3:
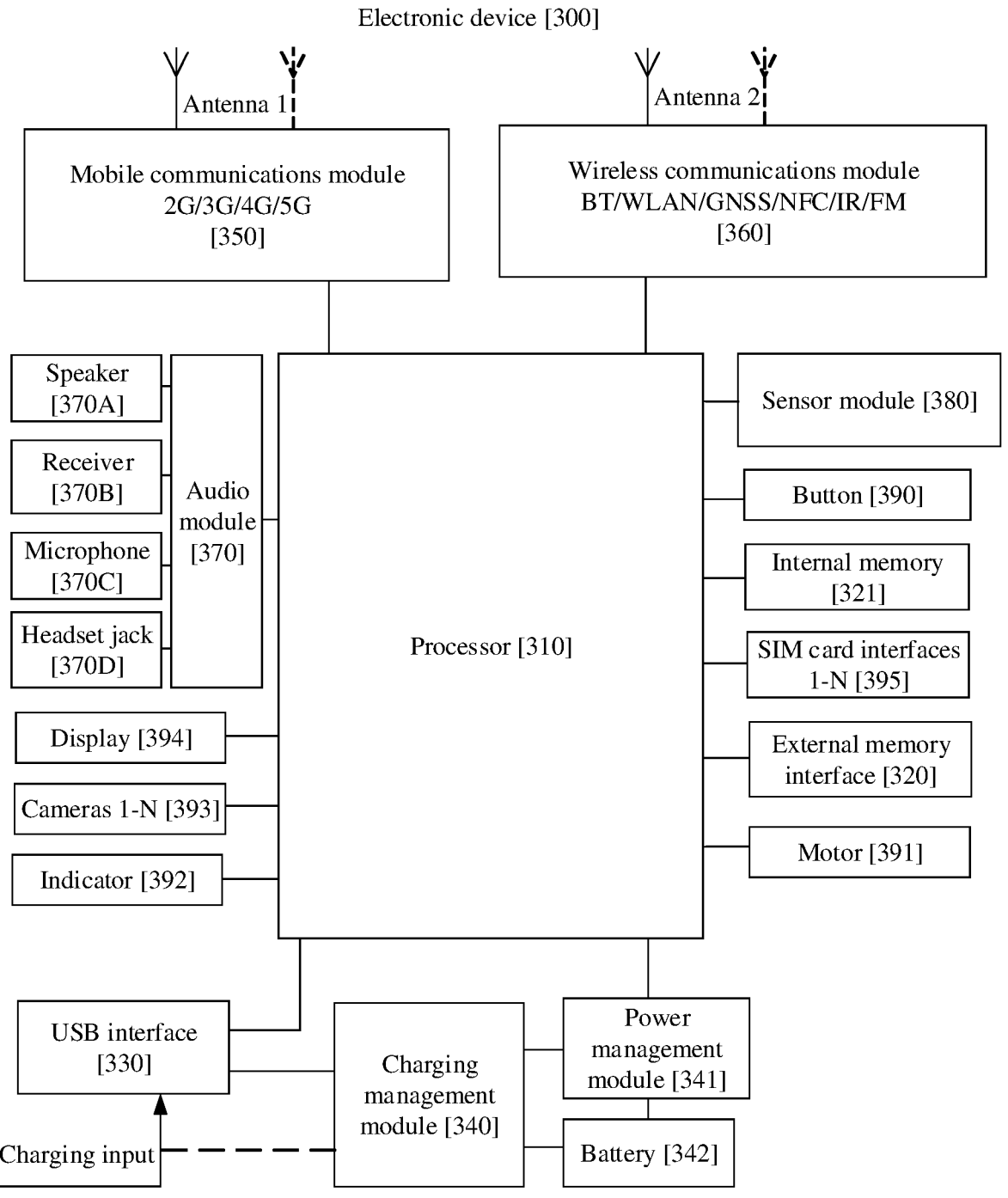
FIG. 3 is a schematic diagram of a hardware structure of a mobile phone according to an embodiment of this application.

The following describes implementations of embodiments of this application in detail with reference to the accompanying drawings. In embodiments of this application, that the electronic device is a mobile phone is used as an example to describe a hardware structure of the electronic device. As shown in FIG. 3, an electronic device 300 may include a processor 310, an external memory interface 320, an internal memory 321, a universal serial bus (universal serial bus, USB) interface 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like.

It may be understood that the structure illustrated in this embodiment does not constitute a specific limitation on the electronic device. In some other embodiments, the electronic device may include more or fewer components than those shown in the figure, or combine some components, or split some components, or have different component arrangements. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

It may be understood that the interface connection relationship between the modules shown in this embodiment is merely an example, and does not constitute a limitation on the structure of the electronic device. In some other embodiments, the electronic device may alternatively use an interface connection manner different from that in the foregoing embodiment, or a combination of a plurality of interface connection manners.

The charging management module 340 is configured to receive charging input from a charger. The charger may be a wireless charger, or may be a wired charger. In some wired charging embodiments, the charging management module 340 may receive charging input of a wired charger through the USB interface 330. In some wireless charging embodiments, the charging management module 340 may receive wireless charging input through a wireless charging coil of the electronic device 300. When charging the battery 342, the charging management module 340 may further supply power to the electronic device through the power management module 341.

The power management module 341 is configured to connect the battery 342, the charging management module 340, and the processor 310. The power management module 341 receives input of the battery 342 and/or the charging management module 340, and supplies power to the processor 310, the internal memory 321, the external memory, the display 394, the camera 393, the wireless communications module 360, and the like. The power management module 341 may be further configured to monitor parameters such as a battery capacity, a battery cycle count, and a battery health status (leakage or impedance). In some other embodiments, the power management module 341 may alternatively be disposed in the processor 310. In some other embodiments, the power management module 341 and the charging management module 340 may also be disposed in a same component.

In this embodiment of this application, the power management module 341 may monitor parameters such as a quantity of recharging times of the battery 342 in a single charging process, a temperature of the battery 342, and a voltage or a battery level of the battery 342. The power management module 341 may further report the monitored parameters to the processor 310, and the processor 310 adjusts two charge thresholds of the battery 342, and controls the charging management module 340 to charge the battery 342 based on adjusted thresholds.

A wireless communication function of the electronic device may be implemented by using the antenna 1, the antenna 2, the mobile communications module 350, the wireless communications module 360, the modem processor, the baseband processor, and the like.

The electronic device implements a display function by using the GPU, the display 394, the application processor, and the like. The GPU is a microprocessor for image processing, and is connected to the display 394 and the application processor. The GPU is configured to perform mathematical and geometric calculation and render graphics. The processor 310 may include one or more GPUs that execute program instructions to generate or change display information.

The electronic device may implement a photographing function by using the ISP, the camera 393, the video codec, the GPU, the display 394, the application processor, and the like. The ISP is configured to process data fed back by the camera 393. The camera 393 is configured to capture a still image or a video. An optical image of an object is generated by using a lens and projected onto a photosensitive element. In some embodiments, the electronic device may include one or N cameras 393, where N is a positive integer greater than 1.

The external memory interface 320 may be configured to connect to an external memory card, such as a micro SD card, to extend a storage capability of the electronic device. The external memory card communicates with the processor 310 through the external memory interface 320, to implement a data storage function. For example, files such as music or videos are stored in the external memory card.

The internal memory 321 may be configured to store computer executable program code, where the executable program code includes instructions. The processor 310 performs various function applications and data processing of the electronic device by running the instructions stored in the internal memory 321. For example, the processor 310 may display, by executing the instructions stored in the internal memory 321, different content on the display 384 in response to an operation performed by a user to unfold the display 394. The internal memory 321 may include a program storage area and a data storage area. The program storage area may store an operating system, an application program required by at least one function (for example, a sound play function or an image play function), and the like. The data storage area may store data (such as audio data or a phone book) created in a use process of the electronic device. In addition, the internal memory 321 may include a high-speed random access memory, and may further include a non-volatile memory, such as at least one magnetic disk storage component, a flash memory component, and a universal flash storage (universal flash storage, UFS).

The electronic device may implement an audio function, such as music playing and recording, by using the audio module 370, the speaker 370A, the receiver 370B, the microphone 370C, the headset jack 370D, the application processor, and the like.

The button 390 includes a power button, a volume button, and the like. The button 390 may be a mechanical button, or may be a touch button. The electronic device may receive button input, and generate button signal input related to user settings and function control of the electronic device. The motor 391 may generate a vibration prompt. The motor 391 may be used for an incoming call vibration prompt, or may be used for touch vibration feedback. The indicator 392 may be an indicator light, and may be used to indicate a charging status or a power change, or may be used to indicate a message, a missed call, a notification, or the like. The SIM card interface 395 is configured to connect to a SIM card. The SIM card may be inserted into the SIM card interface 395 or removed from the SIM card interface 395, to implement contact with or separation from the electronic device. The electronic device may support one or N SIM card interfaces, and N is a positive integer greater than 1.

Methods in the following embodiments may all be implemented in the electronic device 300 that has the foregoing hardware structure. The following describes the methods in embodiments of this application by using an example in which the electronic device 300 is a mobile phone.

In embodiments of this application, as a quantity of recharging times increases, the mobile phone may lower a full charge threshold and a recharge threshold. In subsequent recharging, a lowered full charge threshold and a lowered recharge threshold are used to control recharging. Therefore, compared with a fixed recharge threshold in a conventional technology, in embodiments of this application, two charge thresholds may be dynamically and intelligently adjusted, to avoid frequent recharging of the battery in a high voltage or high battery level state.

In a first scenario, only two different groups of charge thresholds are used to control recharging in a single charging process, that is, a full charge threshold and a recharge threshold are lowered only once in a single charging process. Specifically, when the quantity of recharging times is equal to n, the full charge threshold and the recharge threshold may be lowered once. In subsequent recharging, as the quantity of recharging times increases, neither of the full charge threshold and the recharge threshold is lowered.

In a second scenario, at least three different groups of charge thresholds are used to control recharging in a single charging process, that is, a full charge threshold and a recharge threshold may be lowered a plurality of times in a single charging process. As the quantity of recharging times increases, the foregoing two charge thresholds (for example, the full charge threshold and the recharge threshold) tend to decrease. Specifically, each time the quantity of recharging times increases by m, the foregoing two charge thresholds are lowered once. To be specific, the two charge thresholds are periodically lowered based on a cycle length m. For example, $m \geq 1$, and m is a positive integer. It should be noted that, in a single recharging process, m may be fixed or constantly changed. This is not specifically limited in the second scenario.

An embodiment of this application provides a battery charging method. The method may be applied to a mobile phone including a battery, and the battery may provide electrical energy for components of the mobile phone. The mobile phone is connected to a power supply, and the power supply is configured to charge the battery of the mobile phone.

In this embodiment, the mobile phone may control recharging by using only two different groups of charge thresholds in a single charging process (that is, the first scenario). Specifically, a full charge threshold and a recharge threshold are lowered only once after the $n^{th}$ time of recharging. In more details, as shown in FIG. 4, the battery charging method includes S401 to S403.

S401: The mobile phone collects statistics on a quantity of recharging times of the battery in a single charging process, where the quantity of recharging times is a quantity of times that charging of the battery is continued after being stopped and is stopped again in the single charging process.

It should be understood that when the mobile phone is connected to a power supply, single charging starts. When the mobile phone is disconnected from the power supply, the single charging ends.

The quantity of recharging times is a quantity of times of recharging that has been completed by a current moment in one single charging process. For example, if the third time of recharging ends by the current moment, the quantity of recharging times is 3.

Alternatively, the quantity of recharging times may be an accumulated quantity of times of recharging completed by a current moment in a plurality of single charging processes. In the plurality of single charging processes, a time interval between any two adjacent single charging processes in a time sequence is less than preset duration.

For example, the mobile phone is connected to the power supply at 18:00, and a user charges the mobile phone while using the mobile phone. The mobile phone receives an incoming call at 19:00, and the user disconnects the mobile phone from the power supply and starts to answer the call. Then, the call ends at 19:08, the user connects the mobile phone to the power supply again, and continues to charge the mobile phone while using the mobile phone. At 20:00, the user disconnects the mobile phone from the power supply again, and ends using the mobile phone. If the preset duration is 10 minutes, a single charging process from 18:00 to 19:00 is recorded as a first single charging process, and a single charging process from 19:08 to 20:00 is recorded as a second single charging process, a time interval between the first single charging process and the second single charging process is 8 minutes (that is, an interval between 19:00 and 19:08), and is less than the preset duration 10 minutes. If a quantity of recharging times is counted at any moment in the second single charging process, the quantity of recharging times is an accumulated value including a quantity of recharging times in the first single charging process and a quantity of times of recharging that has been completed by the any moment in the second single charging process, that is, an accumulated quantity of times of recharging completed by the current moment in the first charging process and the second charging process.

In a single charging process, a battery voltage or a battery level of the battery changes with charging. In addition, as the battery level or battery voltage decreases, start of a charging phase of recharging is triggered (which is also an end of a power failure phase). As the battery level or battery voltage increases, an end of the charging phase of recharging is triggered (which is also a start of a power failure phase of next time of recharging).

Based on this, the mobile phone may collect a battery level or battery voltage of the battery in a single charging process. Then, the mobile phone may obtain the quantity of recharging times through statistics collection based on a change of the battery level or the battery voltage. Specifically, each time the battery level or the battery voltage of the battery starts from a full charge threshold, successively passes through a power failure phase and a charging phase, and reach another full charge threshold, the quantity of recharging times increases by one. The full charge threshold and the another full charge threshold may be the same or different. After full charge threshold lowering, a case in which the full charge threshold is different from the another full charge threshold may occur.

The battery of the mobile phone needs to supply power to each component in the mobile phone. In a running process of the mobile phone, working of each component consumes power of the battery. A higher speed of consuming the power of the battery indicates higher power consumption of the mobile phone, a quicker power failure of the battery, and a larger quantity of recharging times. In addition, usually, longer charging time of the mobile phone indicates a larger quantity of recharging times. It can be learned that the quantity of recharging times collected by the mobile phone may comprehensively reflect impact of charging duration and power consumption on the battery, not only impact of the charging duration or the power consumption on the battery.

For example, in a single charging process (for example, a single charging process a), the mobile phone is charged for h1 hours, and power consumption of the mobile phone is q1. In another single charging process (for example, a single charging process b), the mobile phone is charged for h2 hours, and power consumption of the mobile phone is q2. If a quantity of recharging times in the single charging process a that is obtained through statistics collection is greater than a quantity of recharging times in the single charging process b, it may indicate that impact of charging duration and power consumption on the battery in the single charging process a is greater than impact of charging duration and power consumption on the battery in the single charging process b. Alternatively, if a quantity of recharging times in the single charging process a that is obtained through statistics collection is less than a quantity of recharging times in the single charging process b, it may indicate that impact of charging duration and power consumption on the battery in the single charging process a is less than impact of charging duration and power consumption on the battery in the single charging process b. Alternatively, if a quantity of recharging times in the single charging process a that is obtained through statistics collection is equal to a quantity of recharging times in the single charging process b, it may indicate that impact of charging duration and power consumption on the battery in the single charging process a is equal to impact of charging duration and power consumption on the battery in the single charging process b.

It should be noted that power consumption is generated when the mobile phone runs, and then power of the battery is consumed. As single charging progresses, recharging is repeated, that is, the quantity of recharging times changes. In this case, S401 needs to be continuously performed to obtain an updated quantity of recharging times through statistics collection. Therefore, there is no absolute sequence between execution of S401 and execution of S402 and S403. Actually, S401 may be performed in a process of performing S402 and S403 or after S402 and S403 are performed, to obtain a new quantity of recharging times through statistics collection.

S402: In first n times of recharging of the battery, when a current battery level or a current voltage of the battery is equal to a first full charge threshold, the mobile phone controls the battery to stop charging; or when a current battery level or a current voltage of the battery is equal to a first recharge threshold, the mobile phone controls the battery to continue charging, where $n \geq 2$, and n is an integer.

In this embodiment, n is a quantity-of-times threshold that defines a quantity of recharging times of the battery, and is also referred to as a preset quantity of recharging times. When the quantity of recharging times is less than or equal to the preset quantity of recharging times, it is considered that the quantity of recharging times is small. In this case, a first group of charge thresholds is used to control recharging, and the first group of charge thresholds includes the first full charge threshold and the first recharge threshold. On the contrary, when the quantity of recharging times is greater than the preset quantity of recharging times, it is considered that the quantity of recharging times is large. In this case, a second group of charge thresholds is used to control recharging, and the second group of charge thresholds includes a second full charge threshold and a second recharge threshold. Herein, n may be preset in the mobile phone.

During implementation, n may be set by a person skilled in the art according to experience, or may be obtained according to a result of big data analysis. This is not specifically limited in this embodiment of this application. For example, the result of the big data analysis is: A life of a battery whose quantity of recharging times is usually greater than 3 is generally shorter than that of a battery whose quantity of recharging times is usually less than or equal to 3. For this result, n is set to 3. Generally, if recharging is performed only once or twice, impact on battery performance is slight. For example, if recharging is performed only once, it indicates that the battery is not recharged frequently, and an amount of heat generated due to charging conversion efficiency is not large. Therefore, a temperature of the battery is not greatly increased, and impact on a battery life is relatively slight. Based on this, a value of n is within a range of integers greater than or equal to 2.

In each time of recharging, when a current battery level or a current voltage reaches a recharge threshold, a charging phase of recharging is entered. In this case, the mobile phone controls the battery to continue charging. When the current battery level or the current voltage reaches a full charge threshold, the charging phase of recharging is ended. In this case, the mobile phone controls the battery to stop charging.

In this embodiment of this application, in all of the first time of recharging to the $n^{th}$ time of recharging, the first full charge threshold is used to control the battery to stop charging, and the first recharge threshold is used to control the battery to continue charging. The first full charge threshold is greater than the first recharge threshold. It should be noted that the first time of recharging is controlled by an initial full charge threshold and an initial recharge threshold. Because the same first full charge threshold and the same first recharge threshold are used to control recharging in first n times of recharging, the first full charge threshold may be understood as the initial full charge threshold, and the first recharge threshold may be understood as the initial recharge threshold.

In some embodiments, the first full charge threshold is a first full charge cut-off battery level, the first recharge threshold is a first recharge battery level, and the first full charge cut-off battery level is greater than the first recharge battery level. In addition, the first full charge cut-off battery level may be 100% FCC, or may be approximately close to and less than 100% FCC. For example, the first full charge cut-off battery level is 98% FCC. In this way, when the quantity of recharging times is relatively small, recharging to a state close to full power may be performed, to ensure endurance time of the mobile phone. It may be understood that, when the quantity of recharging times is relatively small, recharging to a state close to full power does not cause great damage to performance of the battery. Therefore, endurance time of the mobile phone can be ensured while battery performance is not severely damaged.

Figure 5:
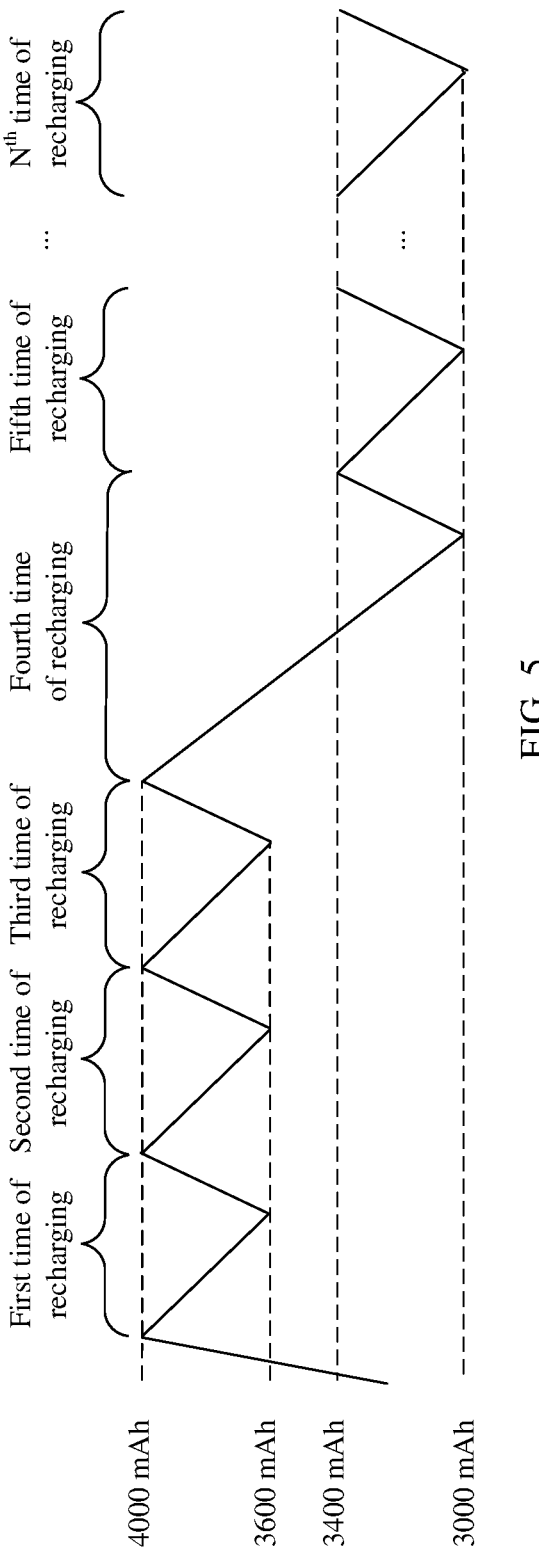
FIG. 5 is a schematic diagram of a process of controlling battery recharging by using two groups of charge thresholds according to an embodiment of this application.

For example, if n is 3 and FCC is 4000 mAh, the first full charge cut-off battery level may be 4000 mAh (that is, 100% FCC), and the first recharge battery level may be 3600 mAh (that is, less than the first full charge cut-off battery level 4000 mAh). As shown in FIG. 5, in a single charging process, charging is stopped after 4000 mAh is reached for the first time. In this case, the first time of recharging is performed.

In the first time of recharging, the battery level of the battery gradually decreases at first. When the battery level decreases to the first recharge battery level 3600 mAh, charging for the battery is continued. Then, the battery level gradually increases from the first recharge battery level 3600 mAh. When the battery level increases to the first full charge cut-off battery level 4000 mAh, charging for the battery is stopped. In this case, the first time of recharging is completed, and the second time of recharging is started.

In the second time of recharging, the battery level of the battery gradually decreases at first. When the battery level decreases to the first recharge battery level 3600 mAh, charging for the battery is continued. Then, the battery level gradually increases from the first recharge battery level 3600 mAh. When the battery level increases to the first full charge cut-off battery level 4000 mAh, charging for the battery is stopped. In this case, the second time of recharging is completed, and the third time of recharging is started.

In the third time of recharging, the battery level of the battery gradually decreases at first. When the battery level decreases to the first recharge battery level 3600 mAh, charging for the battery is continued. Then, the battery level gradually increases from the first recharge battery level 3600 mAh. When the battery level increases to the first full charge cut-off battery level 4000 mAh, charging for the battery is stopped. In this case, the third time of recharging is completed, and the fourth time of recharging is started.

In the foregoing example in FIG. 5, in the first to the third times of recharging, used full charge cut-off thresholds are all the first full charge cut-off battery level 4000 mAh, and used recharge thresholds are all the first recharge battery level 3600 mAh. In this way, the battery level can be filled up to 100% FCC in first three times of recharging, to ensure endurance time of the mobile phone without causing serious damage to battery performance.

In some other embodiments, the first full charge threshold is a first full charge cut-off voltage, the first recharge threshold is a first recharge voltage, and the first full charge cut-off voltage may be a rated full charge voltage, or is approximately close to and less than a rated full charge voltage. For example, the first full charge cut-off voltage is 98% of the rated full charge voltage. In this way, when the quantity of recharging times is relatively small, recharging to a state close to a full voltage may be performed, to ensure endurance time of the mobile phone. It may be understood that, when the quantity of recharging times is relatively small, recharging to a state close to a full voltage does not cause great damage to performance of the battery. Therefore, endurance time of the mobile phone can be ensured while battery performance is not severely damaged.

S403: In the $(n+i)^{th}$ time of recharging of the battery, when a current battery level or a current voltage of the battery is equal to a second full charge threshold, the mobile phone controls the battery to stop charging; or when a current battery level or a current voltage of the battery is equal to a second recharge threshold, the mobile phone controls the battery to continue charging, where a value of i is successively set to $\{1, 2, \ldots\}$, and i is an integer. In addition, the second full charge threshold is less than the first full charge threshold, and the second recharge threshold is less than the first recharge threshold.

In this embodiment of this application, in subsequent recharging after the $n^{th}$ time of recharging is completed, that is, in the $(n+i)^{th}$ time of recharging, the second full charge threshold is used to control the battery to stop charging, and the second recharge threshold is used to control the battery to continue charging. The second full charge threshold is greater than the second recharge threshold. In addition, the second full charge threshold is less than the first full charge threshold, and the second recharge threshold is less than the first recharge threshold. That is, before and after the $n^{th}$ time of recharging, not only different full charge thresholds are used, but also different recharge thresholds are used. In addition, compared with those in first n times of recharging, a full charge threshold used in the $(n+i)^{th}$ time of recharging is lowered, and a recharge threshold used in the $(n+i)^{th}$ time of recharging is also lowered. In this way, compared with the first n times of recharging, the $(n+i)^{th}$ time of recharging may be implemented in a low voltage or battery level state.

In some embodiments, the second full charge threshold is a second full charge cut-off battery level, the second recharge threshold is a second recharge battery level, and the second full charge cut-off battery level is greater than the second recharge battery level. In addition, the second full charge cut-off battery level is equal to a preset battery level, or is approximately close to and less than a preset battery level. Specifically, that the second full charge cut-off battery level is approximately close to and less than the preset battery level includes: A difference between the preset battery level and the second full charge cut-off battery level falls within a preset maximum difference range (for example, 10% FCC). The preset battery level is a lowest battery level for reaching a high battery level state. In other words, when the battery level is greater than or equal to the preset battery level, the battery reaches a high battery level state. When the battery level is less than the preset battery level, the battery does not reach a high battery level state.

For example, when the battery level is greater than or equal to 85% FCC, it is considered that the battery is in a high battery level state. In this case, the preset battery level is 85%. Correspondingly, the second full charge cut-off battery level may be any value in 75% FCC to 85% FCC. In a specific implementation, the second full charge cut-off battery level is 80% FCC.

In this embodiment, in the $(n+i)^t$ time of recharging, a used second full charge cut-off battery level is less than or equal to the preset battery level, and the preset battery level is a lowest battery level for meeting a high battery level condition, that is, the second full charge cut-off battery level does not exceed the preset battery level, so that charging in a high battery level state can be avoided when the quantity of recharging times is relatively large. In this way, charging conversion efficiency in recharging can be improved, and battery heat can be reduced. In addition, when the second full charge cut-off battery level is approximately close to the preset battery level, it can be ensured that a battery level at the end of the recharging is not too low, thereby avoiding greatly reducing endurance time of the battery.

For example, if n=3, when the battery level is greater than or equal to 85% FCC, it is considered that the battery level meets a high battery level condition. If FCC is 4000 mAh, the preset battery level is 3400 mAh (85% FCC), and the second full charge cut-off battery level may be any value in 3000 mAh (85% FCC-10% FCC) to 3400 mAh (85% FCC). Further, it is assumed that the second full charge cut-off battery level is 3400 mAh (85% FCC), and the second recharge battery level is 3000 mAh (less than the second full charge cut-off battery level 3400 mAh). As shown in FIG. 5, after the third time of recharging is completed, the fourth time of recharging is started.

In the fourth time of recharging (that is, when i=1), as the components of the mobile phone consume power of the battery, the battery level of the battery gradually decreases. When the battery level decreases to the second recharge battery level 3000 mAh, charging for the battery is continued. Then, the battery level increases from the second recharge battery level 3000 mAh to the second full charge cut-off battery level 3400 mAh. In this case, the fourth time of recharging is completed, and the fifth time of recharging is started.

In the fifth time of recharging (that is, when i=2), as the components of the mobile phone consume power of the battery, the battery level of the battery gradually decreases. When the battery level decreases to the second recharge battery level 3000 mAh, charging for the battery is continued. Then, the battery level increases from the second recharge battery level 3000 mAh to the second full charge cut-off battery level 3400 mAh. In this case, the fifth time of recharging is completed, and the sixth time of recharging is started . . . . This procedure is repeated, and the $N^{th}$ time of recharging is started.

In the $N^{th}$ time of recharging process (that is, when i=N–3), as the components of the mobile phone consume power of the battery, the battery level of the battery gradually decreases. When the battery level decreases to the second recharge battery level 3000 mAh, charging for the battery is continued. Then, the battery level increases from the second recharge battery level 3000 mAh to the second full charge cut-off battery level 3400 mAh. In this case, the $N^{th}$ time of recharging is completed, and the $(N+1)^t$ time of recharging is started.

In the foregoing example in FIG. 5, as single charging progresses, each component of the mobile phone continuously consumes the power of the battery. Consequently, recharging is continuously performed, that is, a value of i gradually increases. In addition, in recharging after the third time of recharging, used full charge cut-off thresholds are all the second full charge cut-off battery level 3400 mAh, and used recharge thresholds are all the second recharge battery level 3000 mAh. In this case, after the third time of recharging, the battery level may be charged to only 3400 mAh (that is, 85% FCC) each time. In this way, charging in a high battery level state can be avoided when there is a relatively large quantity of times of recharging. In addition, it can be ensured that the battery level at the end of the recharging is not too low, to avoid greatly shortening endurance time of the battery.

In some other embodiments, the second full charge threshold is a second full charge cut-off voltage, the second recharge threshold is a second recharge voltage, and the second full charge cut-off voltage is equal to a preset voltage, or is approximately close to and less than a preset voltage. The preset voltage is a lowest voltage for reaching a high voltage state. In addition, the second recharge voltage is less than the second full charge cut-off voltage. In this way, a maximum value of the second full charge cut-off voltage does not exceed the preset voltage, so that charging in a high voltage state can be avoided when the quantity of recharging times is relatively large, thereby improving charging conversion efficiency in recharging, and reducing battery heat. In addition, when the second full charge cut-off voltage is approximately close to the preset voltage, it can be ensured that a battery voltage at the end of the recharging is not too low, thereby avoiding greatly reducing endurance time of the battery.

Therefore, it should be noted that, usually, a power management module (such as the power management module 340 in FIG. 3) in the mobile phone may collect the battery level or the battery voltage of the battery. However, different hardware composition of the power management module may cause different precision of collecting the battery voltage and the battery level. Based on this, during actual implementation, whether the battery voltage is used as a charge threshold or the battery level is used as a charge threshold may be determined based on hardware composition of the power management module. The following embodiments are described mainly by using an example in which the battery level is used as a threshold, that is, a full charge threshold is a full charge cut-off battery level and a recharge threshold is a recharge battery level.

In embodiments of this application, the full charge threshold is greater than the recharge threshold. In addition, in a plurality of times of recharging, differences between full charge thresholds and recharge thresholds may be the same, or may be different. For example, a first full charge threshold is greater than a first recharge threshold, and a difference between the first full charge threshold and the second recharge threshold is a first difference. For example, a second full charge threshold is greater than a second recharge threshold, and a difference between the second full charge threshold and the second recharge threshold is a second difference. The first difference and the second difference may be the same, or may be different.

In a specific implementation, in a single charging process, differences between full charge thresholds and recharge thresholds are always the same, that is, a difference between a full charge threshold and a recharge threshold is fixed. In this way, calculation for determining a recharge threshold and a full charge threshold may be simplified. For example, the difference between the full charge threshold and the recharge threshold is fixed as 100 mV. In this case, for any time of recharging in a single charging process, 100 mV may be subtracted from a full charge cut-off voltage to obtain a recharge voltage. Alternatively, a full charge cut-off voltage may be obtained by adding 100 mV to a recharge voltage.

In conclusion, according to the battery charging method in this embodiment of this application, in first n times of recharging and the $(n+i)^{th}$ time of recharging, a mobile phone separately controls recharging by using different full charge cut-off thresholds and recharge thresholds, so that two thresholds used for recharging match a quantity of recharging times, and then match comprehensive impact of charging duration and power consumption on a battery. This can improve reasonability of recharging control.

In addition, in a single charging process, recharging is controlled by using only two different groups of thresholds, that is, recharging of the battery is controlled in a low voltage or battery level state, so that a control process of recharging control can be simplified.

In addition, the second full charge threshold and the second recharge threshold in the $(n+i)^{th}$ time of recharging are respectively less than the first full charge cut-off threshold and the first recharge threshold in the first n times of recharging, that is, two thresholds for recharging are lowered after the quantity of recharge times reaches n, so that recharging of the battery can be implemented in a low voltage or battery level state. Compared with frequent recharging in a high voltage or high battery level state, recharging of the battery in a low voltage or battery level state can enable the battery to be in a lower battery level or voltage state. In addition, charging conversion efficiency in recharging is improved, and battery heat is reduced. Therefore, a battery life can be effectively prolonged, and a safety risk such as battery swelling can be avoided.

In the second scenario, a full charge threshold and a recharge threshold in a single charging process may be lowered a plurality of times. Specifically, each time the quantity of recharging times increases by m, the foregoing two charge thresholds are lowered once. For example, m≥1, and m is a positive integer.

In an implementation, m may be a fixed cycle value. That is, the full charge threshold and the recharge threshold are lowered at a fixed cycle. For example, each time the quantity of recharging times increases by 2, the full charge threshold and the recharge threshold are lowered once.

In another implementation, m may be constantly changed. That is, the full charge threshold and the recharge threshold are lowered aperiodically. For example, lowering is successively performed at cycles 1, 2, 3 . . . .

For the foregoing two implementations, the following separately describes the battery charging method provided in embodiments of this application.

In an implementation of the second scenario, an embodiment of this application provides a battery charging method. The method may be applied to a mobile phone including a battery, and the battery may provide electrical energy for components of the mobile phone. The mobile phone is connected to a power supply, and the power supply is configured to charge the battery of the mobile phone.

In this embodiment of this application, a full charge threshold and a recharge threshold are lowered at a fixed cycle. Specifically, as shown in FIG. 6, the battery charging method includes S601 to S603.

S601: The mobile phone collects statistics on a quantity of recharging times of the battery in a single charging process, where the quantity of recharging times is a quantity of times that charging of the battery is continued after being suspended and is stopped again in the single charging process.

An implementation principle and a process of S601 are the same as an implementation principle and a process of S401. For details, refer to descriptions of S401. Details are not described herein again.

S602: In the single charging process, control recharging by using an initial full charge threshold and an initial recharge threshold in first s times of recharging of the battery. s≥1, and s is an integer.

In the single charging process of the battery, the first time of recharging is usually controlled by using the initial full charge threshold and the initial recharge threshold. In addition, when the quantity of recharging times is relatively small, a battery damage degree is relatively low. In this case, a requirement of lowering a full charge threshold and a recharge threshold does not exist. In addition, recharging may be usually controlled by using a same initial full charge threshold and a same initial recharge threshold. Based on this, in this embodiment, in all the first s times of recharging in the single charging process, recharging is controlled by using the initial full charge threshold and the initial recharge threshold.

Figure 7:
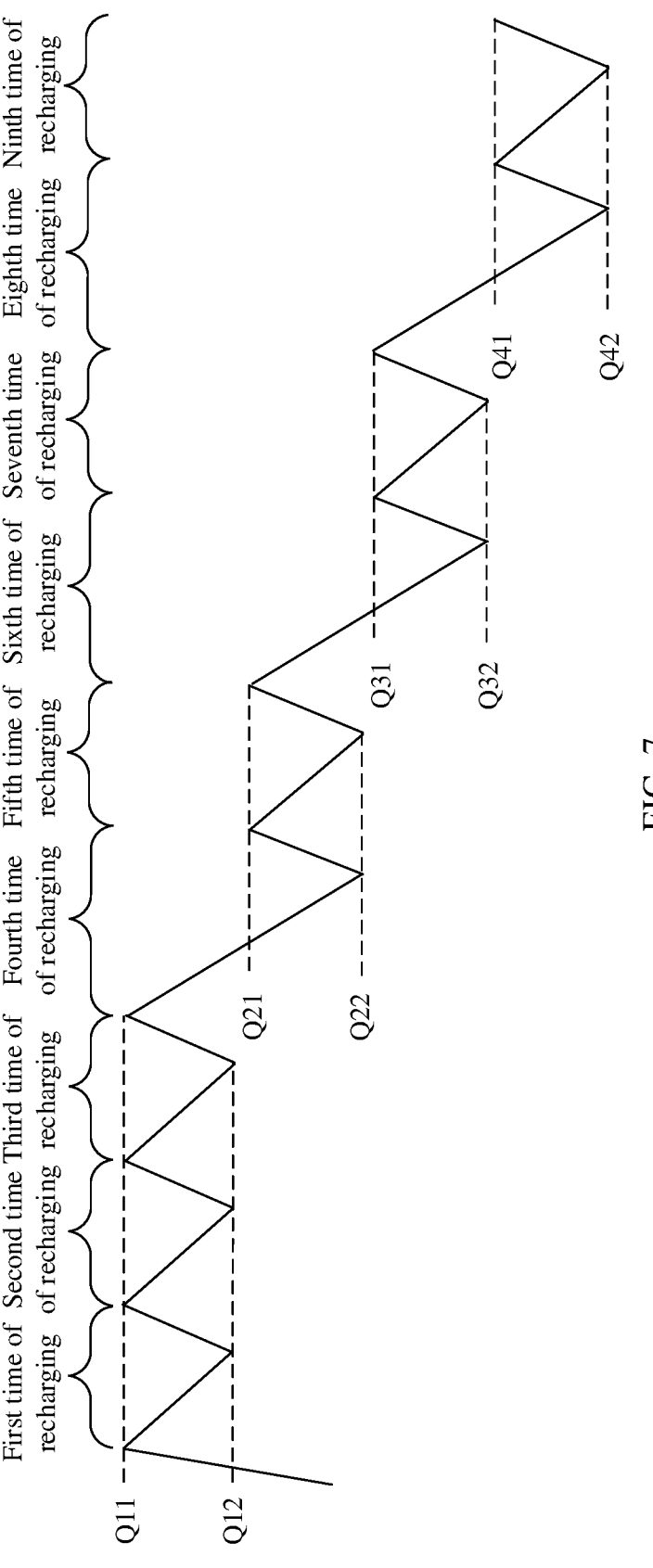
FIG. 7 is a schematic diagram of a process of reducing two charge thresholds at a fixed cycle according to an embodiment of this application.

For example, it is assumed that s=3. The initial full charge threshold is equal to Q11 shown in FIG. 7, and the initial recharge threshold is equal to Q12 shown in FIG. 7. As shown in FIG. 7, after the mobile phone is connected to the power supply, charging is stopped after a battery level is charged to Q11 for the first time, and the first time of recharging, the second time of recharging, and the third time of recharging are sequentially performed. As shown in FIG. 7, in the first to the third times of recharging, when the battery level decreases to Q12, the mobile phone controls the battery to continue charging, or when the battery level of the battery increases to Q11, the mobile phone controls the battery to stop charging.

S603: Each time the quantity of recharging times increases by m, control recharging by using a group including a lowered full charge threshold and a lowered recharge threshold. m≥1, and m is an integer.

After the first s times of recharging are completed, the first cycle is entered, that is, the $(s+i)^{th}$ time of recharging of the battery is started. In the $(s+i)^{th}$ time of recharging of the battery, when a current battery level or a current voltage of the battery is equal to a full charge threshold 1, the mobile phone controls the battery to stop charging; or when a current battery level or a current voltage of the battery is equal to a recharge threshold 1, the mobile phone controls the battery to continue charging. A value of i is successively set to $\{1, 2, \ldots, m\}$. The full charge threshold 1 is greater than the recharge threshold 1, the initial full charge threshold is greater than the full charge threshold 1, and the initial recharge threshold is greater than the recharge threshold 1. In other words, in the first cycle, compared with the initial full charge threshold, the smaller full charge threshold 1 is used to control an end of a charging phase of recharging. In the first cycle, compared with the initial recharge threshold, the smaller recharge threshold 1 is used to control a start of the charging phase of recharging. Therefore, compared with the first s times of recharging, recharging in the first cycle may be completed in a low voltage or battery level state.

For example, it is assumed that m=2. The full charge threshold 1 is equal to Q21 shown in FIG. 7, and the recharge threshold 1 is equal to Q22 shown in FIG. 7. In addition, because m=2, the value of i can be successively set to only 1 and 2. As shown in FIG. 7, in the first cycle, that is, in the fourth time (that is, i=1) of recharging and the fifth time (that is, i=2) of recharging, when the battery level decreases to Q22, the mobile phone controls to continue charging the battery. Then, when the battery level increases to Q21, the mobile phone controls to stop charging the battery.

After recharging in the first cycle is completed, the second cycle is entered, that is, the $(s+m+i)^{th}$ time of recharging of the battery is started. In the $(s+m+i)^{th}$ time of recharging of the battery, when a current battery level or a current voltage of the battery is equal to a full charge threshold 2, the mobile phone controls the battery to stop charging; or when a current battery level or a current voltage of the battery is equal to a recharge threshold 2, the mobile phone controls the battery to continue charging. A value of i is successively set to $\{1, 2, \ldots, m\}$. The full charge threshold 2 is greater than the recharge threshold 2, the full charge threshold 1 is greater than the full charge threshold 2, and the recharge threshold 1 is greater than the recharge threshold 2. In other words, in the second cycle, compared with the full charge threshold 1, the smaller full charge threshold 2 is used to control an end of a charging phase of recharging. In the second cycle, compared with the recharge threshold 1, the smaller recharge threshold 2 is used to control a start of the charging phase of recharging. Therefore, compared with recharging in the first cycle, recharging in the second cycle may be completed in a low voltage or battery level state.

For example, it is assumed that m=2. The full charge threshold 2 is equal to Q31 shown in FIG. 7, and the recharge threshold 2 is equal to Q32 shown in FIG. 7. In addition, because m=2, the value of i can be successively set to only 1 and 2. As shown in FIG. 7, in the second cycle, that is, in the sixth time (that is, i=1) of recharging and the seventh time (that is, i=2) of recharging, when the battery level decreases to Q32, charging for the battery is continued. Then, when the battery level increases to Q31, charging for the battery is stopped.

After recharging in the second cycle is completed, the third cycle is entered, that is, the $(s+2m+i)^{th}$ time of recharging of the battery is started. In the $(s+2m+i)^{th}$ time of recharging of the battery, when a current battery level or a current voltage of the battery is equal to a full charge threshold 3, the mobile phone controls the battery to stop charging; or when a current battery level or a current voltage of the battery is equal to a recharge threshold 3, the mobile phone controls the battery to continue charging. A value of i is successively set to $\{1, 2, \ldots, m\}$. The full charge threshold 3 is greater than the recharge threshold 3, the full charge threshold 2 is greater than the full charge threshold 3, and the recharge threshold 2 is greater than the recharge threshold 3. In other words, in the third cycle, compared with the full charge threshold 2, the smaller full charge threshold 3 is used to control an end of a charging phase of recharging. In the third cycle, compared with the recharge threshold 2, the smaller recharge threshold 3 is used to control a start of the charging phase of recharging. Therefore, compared with recharging in the second cycle, recharging in the third cycle may be completed in a low voltage or battery level state.

For example, it is assumed that m=2. The full charge threshold 2 is equal to Q41 shown in FIG. 7, and the recharge threshold 2 is equal to Q42 shown in FIG. 7. In addition, because m=2, the value of i can be successively set to only 1 and 2. As shown in FIG. 7, in the third cycle, that is, in the eighth time (that is, i=1) of recharging and the ninth time (that is, i=2) of recharging, when the battery level decreases to Q42, charging for the battery is continued. Then, when the battery level increases to Q41, charging for the battery is stopped.

By analogy, the $j^{th}$ cycle is entered, that is, the $[s+(j-1)m+i]^{th}$ time of recharging of the battery is started. A value of j is successively set to $\{1, 2, \ldots\}$, and j is an integer. Therefore, as shown in FIG. 8, S603 may be specifically S801.

S801: In the $[s+(j-1)*m+i]^{th}$ time of recharging of the battery, when a current battery level or a current voltage of the battery is equal to a full charge threshold j, the mobile phone controls the battery to stop charging; or when a current battery level or a current voltage of the battery is equal to a recharge threshold j, the mobile phone controls the battery to continue charging. A value of i is successively set to $\{1, 2, \ldots, m\}$, j is a quantity of cycles, a value of j is successively set to $\{1, 2, \ldots\}$. Both i and j are integers. The full charge threshold j is greater than the recharge threshold j, a full charge threshold for controlling recharging in the $(j-1)^{th}$ cycle is greater than the full charge threshold j, and a recharge threshold for controlling recharging in the $(j-1)^{th}$ cycle is greater than the recharge threshold j.

In other words, in the $j^{th}$ period, recharging is controlled by using the lower full charge threshold j and the lower recharge threshold j. Therefore, compared with recharging in the $(j-1)^{th}$ cycle, recharging in the $j^{th}$ cycle may be completed in a lower voltage or battery level state.

In this embodiment, after the first s times of recharging are completed, each time the quantity of recharging times increases by m, a group including a recharge threshold and a full charge threshold is switched to control recharging. It should be noted that, when s is equal to m, it is equivalent to that in an entire single recharging process, each time the quantity of recharging times increases by m, a group including a recharge threshold and a full charge threshold is switched to control recharging.

In practice, a typical case in which a full charge threshold and a recharge threshold are lowered based on a fixed cycle m is m=1. To be specific, after the first s times of recharging are completed, each time the quantity of recharging times increases by 1, a group including a smaller recharge threshold and a smaller full charge threshold is switched to control recharging.

The following describes a battery charging process by using an example for the case of m=1. When m=1, the value of i can be only 1.

Figure 9:
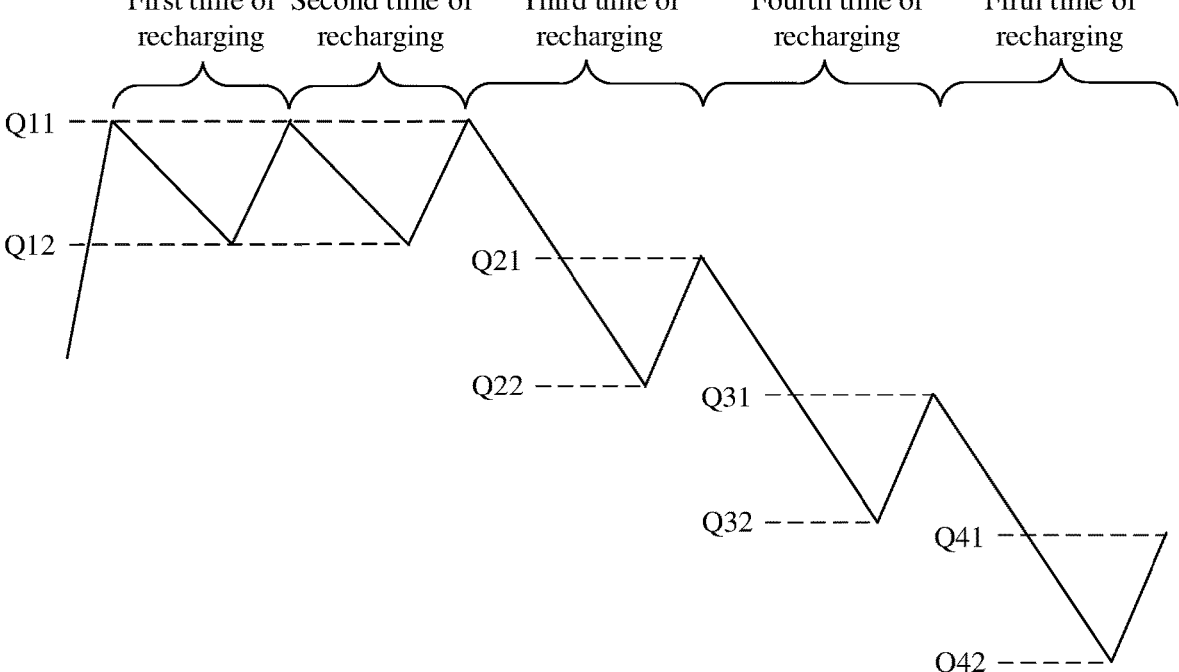
FIG. 9 is a schematic diagram of another process of reducing two charge thresholds at a fixed cycle according to an embodiment of this application.

It is assumed that s=2, the initial full charge threshold is equal to Q11 shown in FIG. 9, the initial recharge threshold is equal to Q12 shown in FIG. 9, the full charge threshold 1 is equal to Q21 shown in FIG. 9, the recharge threshold 1 is equal to Q22 shown in FIG. 9, the full charge threshold 2 is equal to Q31 shown in FIG. 9, the recharge threshold 2 is equal to Q32 shown in FIG. 9, the full charge threshold 3 is equal to Q41 shown in FIG. 9, and the recharge threshold 3 is equal to Q42 shown in FIG. 9. When m=1, the value of i can be only 1.

As shown in FIG. 9, after the battery level is charged to Q11 for the first time, charging is stopped, and the first time of recharging is started.

In first two times of recharging of the battery, when the battery level decreases to Q12, charging for the battery is continued. When the battery level increases to Q11, charging for the battery is stopped.

After the first two times of recharging of the battery are completed, each time the quantity of recharging times increases by 1, a group including a smaller recharge threshold and a smaller full charge threshold is switched to control recharging.

When j=1 and i=1, the third time (that is, 2+0*1+1) of recharging is started. In the third time of recharging of the battery, when the battery level decreases to Q22, charging for the battery is continued. When the battery level increases to Q21, charging for the battery is stopped. Q11 is greater than Q21 and Q12 is greater than Q22.

When j=2 and i=1, the fourth time (that is, 2+1*1+1) of recharging is started. In the fourth time of recharging of the battery, when the battery level decreases to Q32, charging for the battery is continued. When the battery level increases to Q31, charging for the battery is stopped. Q21 is greater than Q31 and Q22 is greater than Q32.

When j=3 and i=1, the fifth time (that is, 2+2*1+1) of recharging is started. In the fifth time of recharging of the battery, when the battery level decreases to Q42, charging for the battery is continued. When the battery level increases to Q41, charging for the battery is stopped. Q31 is greater than Q41 and Q32 is greater than Q42.

It can be learned that, in the case of m=1, after the first s times of recharging are completed, as the quantity of recharging times increases each time, a lowered full charge threshold and a lowered recharge threshold are gradually used to control recharging, to implement smooth lowering of the full charge threshold and the recharge threshold, thereby improving user experience. In addition, frequent recharging of the battery at a high battery level can be avoided, and charging conversion efficiency can be improved, so that battery heat is reduced.

In conclusion, according to the method in this embodiment of this application, each time the quantity of recharging times increases by n, a group including a reduced full charge threshold and a reduced recharge threshold is switched to control recharging. A lowered full charge threshold and a lowered recharge threshold are periodically used to control recharging, that is, a plurality of groups of different thresholds may be used to control recharging in a single charging process, so that flexibility of recharging control is improved.

In addition, two thresholds used for recharging match the quantity of recharging times, and then match comprehensive impact of charging duration and power consumption on the battery. This can improve reasonability of recharging control.

In addition, the recharge threshold and the full charge threshold decrease periodically. In this case, recharging may be implemented in a lower voltage or battery level state when the quantity of recharging times is larger. Compared with frequent recharging in a high voltage or high battery level state, recharging of the battery in a low voltage or battery level state can enable the battery to be in a lower battery level or voltage state. In addition, charging conversion efficiency in recharging is improved, and battery heat is reduced. Therefore, a battery life can be effectively prolonged, and a safety risk such as battery swelling can be avoided.

In the foregoing description of the second scenario, a full charge threshold and a recharge threshold are periodically lowered based on only a quantity of recharging times. To further improve reasonability of setting a full charge threshold and a recharge threshold in each time of recharging, an embodiment of this application further provides a battery charging method. Similarly, the method may be applied to a mobile phone including a battery, and the battery may provide electrical energy for components of the mobile phone. The mobile phone is connected to a power supply, and the power supply is configured to charge the battery of the mobile phone. In addition, in this method, a full charge threshold and a recharge threshold are also lowered based on a fixed cycle m.

A difference lies in that in this embodiment, the full charge threshold and the recharge threshold are lowered with reference to a quantity of recharge times and a temperature of the battery in recharging, instead of periodically lowering the full charge threshold and the recharge threshold based on only the quantity of recharging times.

There is a positive correlation between a temperature and a battery damage degree in a single charging process. A higher temperature indicates a higher battery damage degree and severer impact on a battery life in a single charging process. On the contrary, a lower temperature indicates a lower battery damage degree and slighter impact on a battery life in the charging process. Correspondingly, when the temperature changes from low to high, a gradually lowered full charge threshold and recharge threshold need to be used to control recharging, so that recharging can be completed in a lower battery level state or a lower voltage state when the temperature rises, thereby reducing heat generated due to charging conversion efficiency.

In other words, in this embodiment, the full charge threshold and the recharge threshold not only tend to decrease as the quantity of recharging times increases. In addition, the full charge threshold and the recharge threshold tend to decrease as the temperature increases, or tend to decrease as a temperature range to which the temperature belongs increases. The following uses Table 1 as an example to describe impact of a temperature on a full charge threshold in charge thresholds. In Table 1, the full charge threshold is a full charge cut-off battery level.

For example, Table 1 shows a correspondence between a plurality of full charge cut-off battery levels and both temperature ranges and quantities of recharging times.

TABLE 1

| Quantity of recharging times | Less than or equal to 30 degrees | Greater than 30 degrees and less than or equal to 35 degrees | Greater than 35 degrees and less than or equal to 40 degrees | Greater than 40 degrees |
|---|---|---|---|---|
| 1 | $SOC_0$ | $SOC_0$ | $SOC_0$ | $SOC_0*95\%$ |
| 2 | $SOC_0$ | $SOC_0$ | $SOC_0*95\%$ | $SOC_0*90\%$ |
| 3 | $SOC_0$ | $SOC_0*95\%$ | $SOC_0*90\%$ | $SOC_0*85\%$ |
| 4 | $SOC_0*95\%$ | $SOC_0*90\%$ | $SOC_0*85\%$ | $SOC_0*80\%$ |

SOCo is an initial full charge cut-off battery level. SOCo is less than or equal to FCC.

In Table 1, as a temperature range to which a temperature belongs increases, a full charge cut-off battery level generally tends to decrease. For example, when a quantity of recharging times is 2, if a temperature range to which a detected temperature belongs is greater than 30 degrees and less than or equal to 35 degrees, a full charge cut-off battery level is still the same as the initial full charge cut-off battery level, and is SOCo. If a temperature range to which a detected temperature belongs is greater than 35 degrees and less than or equal to 40 degrees, a full charge cut-off battery level is lowered to SOCo*95%. If a temperature range to which a detected temperature belongs is greater than 40 degrees, a full charge cut-off battery level is lowered to SOCo*90%.

In this embodiment, after first s times of recharging are completed, a full charge threshold and a recharge threshold are obtained with reference to a quantity of recharging times and a temperature, so that both the obtained full charge threshold and the obtained recharge threshold generally tend to decrease as the quantity of recharging times and the temperature increase. Specifically, a full charge threshold and a recharge threshold for controlling recharging in the first cycle are obtained with reference to a temperature in the $s^{th}$ time of recharging and the quantity s of recharging times. Starting from the second cycle, a full charge threshold and a recharge threshold for controlling recharging in the $j^{th}$ cycle are obtained with reference to a quantity of recharging times at the end of the $(j-1)^{th}$ cycle and a temperature in the last time of recharging in the $(j-1)^{th}$ cycle. A value of j is successively set to $\{2, 3, \ldots\}$, and j is an integer.

For example, it is assumed that m=2. In addition, it is assumed that s=0 (in practice, s is an integer greater than or equal to 1, and is not 0), to facilitate rule searching. Table 2 shows a correspondence between a cycle and both recharging and a quantity of recharging times.

TABLE 2

| Cycle | Recharging in a single charging process included in a cycle | Quantity of recharging times at the end of a cycle | Last time of recharging in a cycle |
|---|---|---|---|
| First cycle | First time of recharging and second time of recharging | 2 | Second time of recharging |
| Second cycle | Third time of recharging and fourth time of recharging | 4 | Fourth time of recharging |
| . . . | . . . | . . . | . . . |
| $j^{th}$ cycle | $[2(j-1)+1]^{th}$ time of recharging and $[2(j-1)+2]^{th}$ time of recharging | $2(j-1)+2 = 2j$ | $2j^{th}$ time of recharging |

Corresponding to Table 2, lowering a full charge threshold and a recharge threshold includes:

obtaining, with reference to a quantity 2 of recharging times and a temperature in the second time of recharging, a full charge threshold and a recharge threshold for controlling the third and the fourth times of recharging;

obtaining, with reference to a quantity 4 of recharging times and a temperature in the fourth time of recharging, a full charge threshold and a recharge threshold for controlling the fifth and the sixth times of recharging; and by analogy, obtaining, with reference to a quantity $(j-1)$ of recharging times and a temperature in the $[2(j-1)]^{th}$ time of recharging, a full charge threshold and a recharge threshold for controlling the $[2(j-1)+1]^{th}$ and the $[2(j-1)+2]^{th}$ times of recharging.

For another example, it is assumed that m=3. In addition, it is also assumed that s=0. Table 3 shows a correspondence between a cycle and both recharging and a quantity of recharging times.

TABLE 3

| Cycle | Recharging in a single charging process included in a cycle | Quantity of recharging times at the end of a cycle | Last time of recharging in a cycle |
|---|---|---|---|
| First cycle | First time of recharging, second time of recharging, and third time of recharging | 3 | Third time of recharging |
| Second cycle | Fourth time of recharging, fifth time of recharging, and sixth time of recharging | 6 | Sixth time of recharging |
| . . . | . . . | . . . | . . . |
| $j^{th}$ cycle | $[3(j-1)+1]^{th}$ time of recharging, $[3(j-1)2]^{th}$ time of recharging, and $[3(j-1)+3]^{th}$ time of recharging | $3(j-1)+3 = 3j$ | $3j^{th}$ time of recharging |

Corresponding to Table 3, lowering a full charge threshold and a recharge threshold includes:

obtaining, with reference to a quantity 3 of recharging times and a temperature in the third time of recharging, a full charge threshold and a recharge threshold for controlling the fourth, the fifth, and the sixth times of recharging;

obtaining, with reference to a quantity 6 of recharging times and a temperature in the sixth time of recharging, a full charge threshold and a recharge threshold for controlling the seventh, the eighth, and the ninth times of recharging; and by analogy, obtaining, with reference to a quantity $3(j-1)$ of recharging times and a temperature in the $[3(j-1)]^{th}$ time of recharging, a full charge threshold and a recharge threshold for controlling the $[3(j-1)+1]^{th}$, the $[3(j-1)+2]^{th}$, and the $[3(j-1)+3]^{th}$ times of recharging.

In this way, a correspondence between a cycle and both recharging and a quantity of recharging times described in the following Table 4 may be obtained for a case in which first s times of recharging are included and a cycle is m.

TABLE 4

| Cycle | Recharging in a single charging process included in a cycle | Quantity of recharging times at the end of a cycle | Last time of recharging in a cycle |
|---|---|---|---|
| First cycle | $(s+1)^{th}$ time of recharging, $(s+2)^{th}$ time of recharging, . . . , and $(s+m)^{th}$ time of recharging | $s+m$ | $(s+m)^{th}$ time of recharging |
| Second cycle | $(s+m+1)^{th}$ time of recharging, $(s+m+2)^{th}$ time of recharging, . . . , and $(s+m+m)^{th}$ time of recharging | $s+2m$ | $(s+2m)^{th}$ time of recharging |
| . . . | . . . | . . . | . . . |
| $j^{th}$ cycle | $[s+(j-1)m+1]^{th}$ time of recharging, $[s+(j-1)m+2]^{th}$ time of recharging, . . . , and $(s+j*m)^{th}$ time of recharging | $s+j*m$ | $(s+j*m)^{th}$ time of recharging |

Corresponding to the foregoing Table 4, it may be clear that, starting from the second (that is, j=2) cycle, that a full charge threshold and a recharge threshold for controlling recharging in the $j^{th}$ cycle are obtained with reference to a quantity of recharging times at the end of the $(j-1)^{th}$ cycle and a temperature in the last time of recharging in the $(j-1)^{th}$ cycle is specifically: A full charge threshold j and a recharge threshold j for controlling recharging (that is, the $[s+(j-1)*m+i]^{th}$ time of recharging) included in the je cycle are obtained with reference to a quantity $s+(j-1)*m$ of recharging times and a temperature in the $[s+(j-1)*m]^{th}$ time of recharging. A value of i is successively set to 1 to m.

With reference to a temperature obtaining process, the following completely describes a specific process of the battery charging method provided in this embodiment of this application.

In first s recharging processes, when a current battery level or a current voltage of the battery is equal to an initial full charge threshold, the mobile phone controls the battery to stop charging; or when a current battery level or a current voltage of the battery is equal to an initial recharge threshold, the mobile phone controls the battery to continue charging, where s≥1, s is a positive integer, and the initial full charge threshold is greater than the initial recharge threshold.

The mobile phone obtains a temperature of the battery in the $s^{th}$ time of recharging.

The mobile phone obtains a full charge threshold 1 and a recharge threshold 1 for the battery in the $(s+_1)^{th}$ (i=1) to the $(s+m)^{th}$ (i=m) times of recharging based on the temperature of the battery in the se time of recharging and the quantity s of recharging times. The full charge threshold 1 is greater than the initial full charge threshold, and the recharge threshold 1 is greater than the initial recharge threshold. In other words, a full charge threshold and a recharge threshold that are smaller than those in the $s^{th}$ time of recharging are obtained.

In the $(s+1)^{th}$ to the $(s+m)^{th}$ times of recharging, that is, in recharging included in the first (in this case, j=1) cycle, when a current battery level or a current voltage of the battery is equal to the recharge threshold 1, the mobile phone controls the battery to continue charging; or when a current battery level or a current voltage of the battery is equal to the full charge threshold 1, the mobile phone controls the battery to stop charging.

The mobile phone obtains a temperature of the battery in the $(s+m)^{th}$ time of recharging.

The mobile phone obtains a full charge threshold 2 and a recharge threshold 2 for the battery in the $(s+m+1)^{th}$ (i=1) to the $(s+2m)^{th}$ (that is, s+m+m, where i=m) times of recharging based on the temperature of the battery in the $(s+m)^{th}$ time of recharging and the quantity s+m of recharging times. The full charge threshold 1 is greater than the full charge threshold 2, and the recharge threshold 1 is greater than the recharge threshold 2. In other words, a full charge threshold and a recharge threshold that are smaller than those in the first cycle are obtained.

In the $(m+1)^{th}$ to the $(2m)^{th}$ times of recharging, that is, in recharging included in the second (in this case, j=2) cycle, when a current battery level or a current voltage of the battery is equal to the recharge threshold 2, the mobile phone controls the battery to continue charging; or when a current battery level or a current voltage of the battery is equal to the full charge threshold 2, the mobile phone controls the battery to stop charging.

The mobile phone obtains a temperature value of the battery in the $(s+2m)^{th}$ time of recharging.

The mobile phone obtains a full charge threshold 3 and a recharge threshold 3 for the battery in the $(s+2m+1)^{th}$ (i=1) to the $(s+3m)^{th}$ (that is, s+2m+m, where i=m) times of recharging based on the temperature value of the battery in the $(s+2m)^{th}$ time of recharging and the quantity s+2m of recharging times. The full charge threshold 2 is greater than the full charge threshold 3, and the recharge threshold 2 is greater than the recharge threshold 3. In other words, a full charge threshold and a recharge threshold that are smaller than those in the second cycle are obtained.

In the $(2m+1)^{th}$ to the $(3m)^{th}$ times of recharging, that is, in recharging included in the third (in this case, j=3) cycle, when a current battery level or a current voltage of the battery is equal to the recharge threshold 3, the mobile phone controls the battery to continue charging; or when a current battery level or a current voltage of the battery is equal to the full charge threshold 3, the mobile phone controls the battery to stop charging.

The mobile phone obtains a temperature value of the battery in the $(s+3m)^{th}$ time of recharging.

The mobile phone obtains a full charge threshold 4 and a recharge threshold 4 for the battery in the $(s+3m+1)^{th}$ (i=1) to the $(s+4m)^{th}$ (that is, s+3m+m, where i=m) times of recharging based on the temperature value of the battery in the $(s+3m)^{th}$ time of recharging and the quantity s+3m of recharging times. The full charge threshold 3 is greater than the full charge threshold 4, and the recharge threshold 3 is greater than the recharge threshold 4. In other words, a full charge threshold and a recharge threshold that are smaller than those in the third cycle are obtained.

In the $(s+3m+1)^{th}$ to the $(s+4m)^{th}$ times of recharging, that is, in recharging included in the fourth (in this case, j=4) cycle, when a current battery level or a current voltage of the battery is equal to the recharge threshold 4, the mobile phone controls the battery to continue charging; or when a current battery level or a current voltage of the battery is equal to the full charge threshold 4, the mobile phone controls the battery to stop charging.

By analogy, a flowchart of a battery charging method shown in FIG. 10 may be obtained. As shown in FIG. 10, the battery charging method includes S1001 to S1004.

S1001: A mobile phone collects statistics on a quantity of recharging times of a battery in a single charging process, where the quantity of recharging times is a quantity of times that charging of the battery is continued after being suspended and is stopped again in the single charging process.

An implementation principle and a process of S1001 are the same as an implementation principle and a process of S401. For details, refer to descriptions of S401. Details are not described herein again.

S1002: In the single charging process, in first s times of recharging of the battery, when a current battery level or a current voltage of the battery is equal to an initial full charge threshold, the mobile phone controls the battery to stop charging; or when a current battery level or a current voltage of the battery is equal to an initial recharge threshold, the mobile phone controls the battery to continue charging, where s≥1, s is an integer, and the initial full charge threshold is greater than the initial recharge threshold.

S1003: The mobile phone obtains a temperature of the battery in the $[s+(j-1)*m]^{th}$ time of recharging. A value of j is successively set to {1, 2, . . . }, m≥1, and both j and m are integers. The mobile phone obtains a recharge threshold j and a full charge threshold j of the battery in the $[s+(j-1)*m+i]^{th}$ time of recharging based on the temperature in the $[s+(j-1)*m]^{th}$ time of recharging and the quantity s+(j-1)*m of recharging times. The full charge threshold j is greater than the recharge threshold j, a full charge threshold j−1 for controlling recharging in the $(j-1)^{th}$ cycle is greater than or equal to the full charge threshold j, and a recharge threshold j−1 for controlling recharging in the $(j-1)^{th}$ cycle is greater than or equal to the recharge threshold j.

j represents a quantity of cycles. When j=1, the $[s+(j-1)*m]^{th}$ time of recharging is the $s^{th}$ time of recharging. When j≥2, the $[s+(j-1)*m]^{th}$ time of recharging is the last time of recharging in the $(j-1)^{th}$ cycle.

It should be noted that the full charge threshold j−1 for controlling recharging in the $(j-1)^{th}$ cycle may be equal to the full charge threshold j, and the full charge threshold j−1 for controlling recharging in the $(j-1)^{th}$ cycle may be equal to the recharge threshold j. That is, full charge thresholds and recharge thresholds in two adjacent cycles may be the same. It should be noted that, although full charge thresholds and recharge thresholds in two adjacent cycles may be the same, both a full charge threshold and a recharge threshold generally tend to decrease as a quantity of recharging times increases and/or a temperature rises. For example, each time the quantity of recharging times increases by m, the full charge threshold and the recharge threshold are lowered once. Each time the temperature increases by q degrees or each time a temperature range to which the temperature belongs rises by one range, the full charge threshold and the recharge threshold are lowered once.

S1004: In the $[s+(j-1)*m+i]^{th}$ time of recharging, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging.

It should be noted herein that, as a single charging process progresses, a value of i increases constantly. When the value of i is m, s+(j-1)*m+i=s+j*m. In this case, it is equivalent to that j=j+1. To be specific, a value of j increases by 1 each time the quantity of recharging times increases by m. Each time the value of j changes, S1003 to S1005 are repeatedly performed to obtain a full charge threshold and a recharge threshold in a next cycle, and complete recharging in the next cycle.

For ease of understanding, the following describes the process of S1001 to S1005 by using s=m=1 with reference to Table 1. When m=1, the value of i can be only 1.

It is assumed that the full charge threshold is a full charge cut-off battery level, the recharge threshold is a recharge battery level, and a difference between the full charge cut-off battery level and the recharge battery level is fixed as 5% SOCo.

In a single charging process, in the first time of recharging of the battery, when the battery level is equal to an initial full charge cut-off battery level SOCo, the mobile phone controls the battery to stop charging; or when the battery level is equal to an initial recharge battery level 95% SOCo (that is, SOCo-5% SOCo), the mobile phone controls the battery to continue charging.

After the first time of recharging is completed, the first cycle is entered. In this case, j=1, and the mobile phone learns that a temperature c1 of the battery in the $[1+(1-1)*i]^{th}$ time (that is, the first time) of recharging is 25 degrees. The mobile phone finds, from Table 1, a full charge cut-off battery level SOCo corresponding to a temperature range to which the temperature c1 in the first time of recharging belongs (c1 is less than or equal to 30 degrees) and the quantity 1 of recharging times. In addition, the mobile phone subtracts 5% SOCo from the full charge cut-off battery level SOCo to obtain the recharge battery level 95% SOCo. To be specific, the mobile phone obtains the full charge cut-off battery level SOCo and the recharge battery level 95% SOCo that are of the battery in the $[1+(1-1)*+i]^{th}$ time (that is, the $(1+i)^{th}$ time) of recharging.

When j=1 and i=1, that is, in the second time of recharging, when a battery level is equal to the full charge cut-off battery level SOCo, the mobile phone controls the battery to stop charging, or when a battery level is equal to the recharge battery level 95% SOCo, the mobile phone controls the battery to continue charging.

After the second time of recharging is completed, the second cycle is entered. In this case, j=2, and the mobile phone learns that a temperature c2 of the battery in the $[1+(2-1)*i]^{th}$ time (that is, the second time) of recharging is 32 degrees. The mobile phone finds, from Table 1, a full charge cut-off battery level SOCo corresponding to a temperature range to which the temperature c2 in the second time of recharging belongs (c2 is greater than 30 degrees and less than or equal to 35 degrees) and the quantity 2 of recharging times. In addition, the mobile phone subtracts 5% SOCo from the full charge cut-off battery level SOCo to obtain the recharge battery level 95% SOCo. To be specific, the mobile phone obtains the full charge cut-off battery level SOCo and the recharge battery level 95% SOCo that are of the battery in the $[1+(2-1)*1+i]^{th}$ time (that is, the $(2+i)^{th}$ time) of recharging.

When j=2 and i=1, that is, in the third time of recharging, when a battery level is equal to the full charge cut-off battery level SOCo, the mobile phone controls the battery to stop charging, or when a battery level is equal to the recharge battery level 95% SOCo, the mobile phone controls the battery to continue charging.

After the third time of recharging is completed, the third cycle is entered. In this case, j=3, and the mobile phone learns that a temperature c3 of the battery in the $[1+(3-1)*1]^{th}$ time (that is, the third time) of recharging is 38 degrees. The mobile phone finds, from Table 1, a full charge cut-off battery level SOCo*90% corresponding to a temperature range to which the temperature c3 in the third time of recharging belongs (c3 is greater than 35 degrees and less than or equal to 40 degrees) and the quantity 3 of recharging times. In addition, the mobile phone subtracts 5% SOCo from the full charge cut-off battery level SOCo*90% to obtain the recharge battery level 85% SOCo. To be specific, the mobile phone obtains the full charge cut-off battery level SOCo*90% and the recharge battery level 85% SOCo that are of the battery in the $[1+(3-1)*1+i]^{th}$ time (that is, the $(3+i)^{th}$ time) of recharging.

When j=3 and i=1, that is, in the fourth time of recharging, when a battery level is equal to the full charge cut-off battery level SOCo*90%, the mobile phone controls the battery to stop charging, or when a battery level is equal to the recharge battery level 85% SOCo, the mobile phone controls the battery to continue charging.

After the fourth time of recharging is completed, the fourth cycle is entered. In this case, j=4, and the mobile phone learns that a temperature c4 of the battery in the $[1+(4-1)*1]^{th}$ time (that is, the fourth time) of recharging is 39 degrees. The mobile phone finds, from Table 1, a full charge cut-off battery level SOCo*85% corresponding to a temperature range to which the temperature c4 in the fourth time of recharging belongs (c4 is greater than 35 degrees and less than or equal to 40 degrees) and the quantity 4 of recharging times. In addition, the mobile phone subtracts 5% SOCo from the full charge cut-off battery level SOCo*85% to obtain the recharge battery level 80% SOCo. To be specific, the mobile phone obtains the full charge cut-off battery level SOCo*85% and the recharge battery level 80% SOCo that are of the battery in the $[1+(4-1)*1+i]^{th}$ time (that is, the $(4+i)^{th}$ time) of recharging.

When j=4 and i=1, that is, in the fifth time of recharging, when a battery level is equal to the full charge cut-off battery level SOCo*85%, the mobile phone controls the battery to stop charging, or when a battery level is equal to the recharge battery level 80% SOCo, the mobile phone controls the battery to continue charging.

Figure 11:
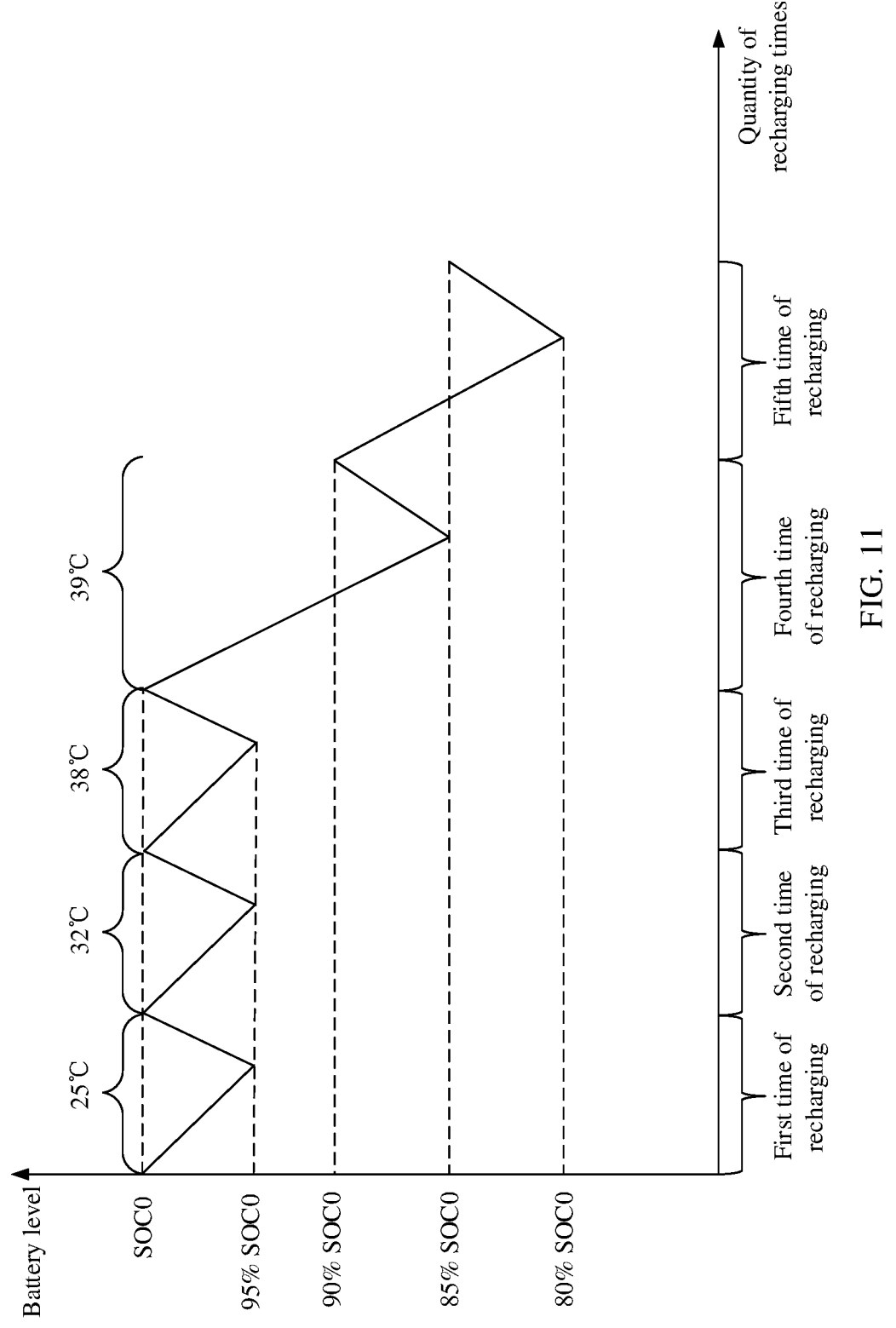
FIG. 11 is a schematic diagram of a process of reducing two charge thresholds based on a quantity of recharging times and a temperature according to an embodiment of this application.

In the example in which s=m=1, a schematic diagram of a charging process shown in FIG. 11 may be obtained.

In the foregoing example, it may also be verified that, after the first s times of recharging are completed, in an embodiment in which a full charge threshold and a recharge threshold are obtained with reference to a temperature and a quantity of recharging times each time the quantity of recharging times increases by m, a lowered full charge threshold and a lowered recharge threshold may not be obtained each time, provided that the full charge threshold and the recharge threshold generally tend to decrease as the quantity of recharging times increases and/or the temperature rises. For example, corresponding to FIG. 10, the full charge threshold and the recharge threshold in the first cycle and the full charge threshold and the recharge threshold in the second cycle that are obtained with reference to the quantity of recharging times and the temperature are the same as the full charge threshold and the recharge threshold in the first time of recharging. After the second cycle ends, the full charge threshold and the recharge threshold in the third cycle and the full charge threshold and the recharge threshold in the fourth cycle that are obtained in sequence gradually decrease. This also conforms to a general decreasing trend.

In addition, the temperature in the $[s+(j-1)*m]^{th}$ time of recharging may be a temperature statistical value such as a highest temperature, a lowest temperature, an average temperature, or a median temperature. This is not specifically limited in this embodiment of this application.

In a specific implementation, the temperature is an average temperature. The mobile phone may obtain the average temperature by averaging battery temperatures that are collected in the $[s+(j-1)*m]^{th}$ time of recharging and that correspond to a plurality of sampling moments. A sampling frequency may be flexibly set based on a requirement. This is not specifically limited in this embodiment of this application. For example, the sampling frequency is 1 time/second, 2 times/second, or the like.

The following Table 5 is used as an example. Table 5 shows a correspondence between each sampling moment and a battery temperature in the $[s+(j-1)*m]^{th}$ time of recharging.

TABLE 5

| Sampling moment | Battery temperature |
|---|---|
| t1 | T1 |
| t2 | T2 |
| t3 | T3 |
| . . . | . . . |
| tp | Tp |

It can be learned through calculation that the average temperature $T=(T1+T2+T3+ \ldots +Tp)/p$.

In this specific implementation, if the average temperature is used as the temperature in the $[s+(j-1)*m]^{th}$ time of recharging, the obtained temperature may reflect the average temperature in the $[s+(j-1)*m]^{th}$ time of recharging, so that the obtained temperature is more representative, and an accidental error is avoided. Then, based on the average temperature, the full charge threshold and the recharge threshold are obtained, thereby improving reasonability of the obtained full charge threshold and recharge threshold.

In conclusion, according to the method in this embodiment of this application, a full charge threshold and a recharge threshold for controlling recharging in the $j^{th}$ cycle are obtained with reference to the quantity $s+(j-1)*m$ of recharging times and the temperature in the $[s+(j-1)*m]^{th}$ time of recharging, so that two thresholds used in each cycle match a quantity of recharging times and a temperature, and then reasonability of recharging control can be further improved.

In addition, a lowered full charge threshold and a lowered recharge threshold are periodically used to control recharging, that is, a plurality of groups of different thresholds may be used to control recharging in a single charging process, so that flexibility of recharging control is improved.

In addition, the recharge threshold and the full charge threshold decrease periodically. In this case, recharging may be implemented in a lower voltage or battery level state when the quantity of recharging times is larger. Compared with frequent recharging in a high voltage or high battery level state, recharging of the battery in a low voltage or battery level state can improve charging conversion efficiency in recharging and reduce battery heat. Therefore, a battery life can be effectively prolonged, and a safety risk such as battery swelling can be avoided.

In another implementation of the second scenario, an embodiment of this application provides a battery charging method. The method may be applied to a mobile phone including a battery, and the battery may provide electrical energy for components of the mobile phone. The mobile phone is connected to a power supply, and the power supply is configured to charge the battery of the mobile phone.

In this embodiment, a full charge threshold and a recharge threshold are lowered aperiodically. To be specific, as a quantity of recharging times increases, a group including a lowered recharge threshold and a lowered full charge threshold is switched aperiodically to control recharging. In other words, a cycle m is variable. In this way, a full charge threshold and a recharge threshold can be flexibly lowered at any time of recharging.

m may change according to a preset rule. The preset rule may be that m gradually increases from an initial cycle r1. For example, m sequentially increases by a preset step h1. To be specific, after first s times of recharging are completed, the full charge threshold and the recharge threshold are successively lowered at intervals of r1, r1+h1, r1+2h1 . . . . Herein, r1≥1, h1≥1, and both r1 and h1 are integers.

Alternatively, the preset rule may be that m gradually decreases from an initial cycle r2. For example, m sequentially decreases by a preset step h2. To be specific, after first s times of recharging are completed, the full charge threshold and the recharge threshold are successively lowered at intervals of r2, r2-h2, r2-2h2 . . . . Herein, r2>1, h2>1, and both r2 and h2 are integers. r2−e*h2>1, e≥1, and e is an integer.

Alternatively, the preset rule may be that a random value is selected from positive integers. For example, m is sequentially 1, 2, 2, 4, 3, 3, and 1.

In actual implementation, a person skilled in the art may set a change rule of m according to an actual requirement. This is not specifically limited in this embodiment of this application.

To facilitate understanding of the battery charging method and effect provided in the another implementation of the second scenario, the following lists a plurality of examples for description. It should be noted that, in this implementation, s may be used as an initial cycle length, and it is no longer necessary to divide the first s times of recharging and periodically lower the full charge threshold and the recharge threshold subsequently. The following example 1 and example 2 are described in this manner.

Figure 12:
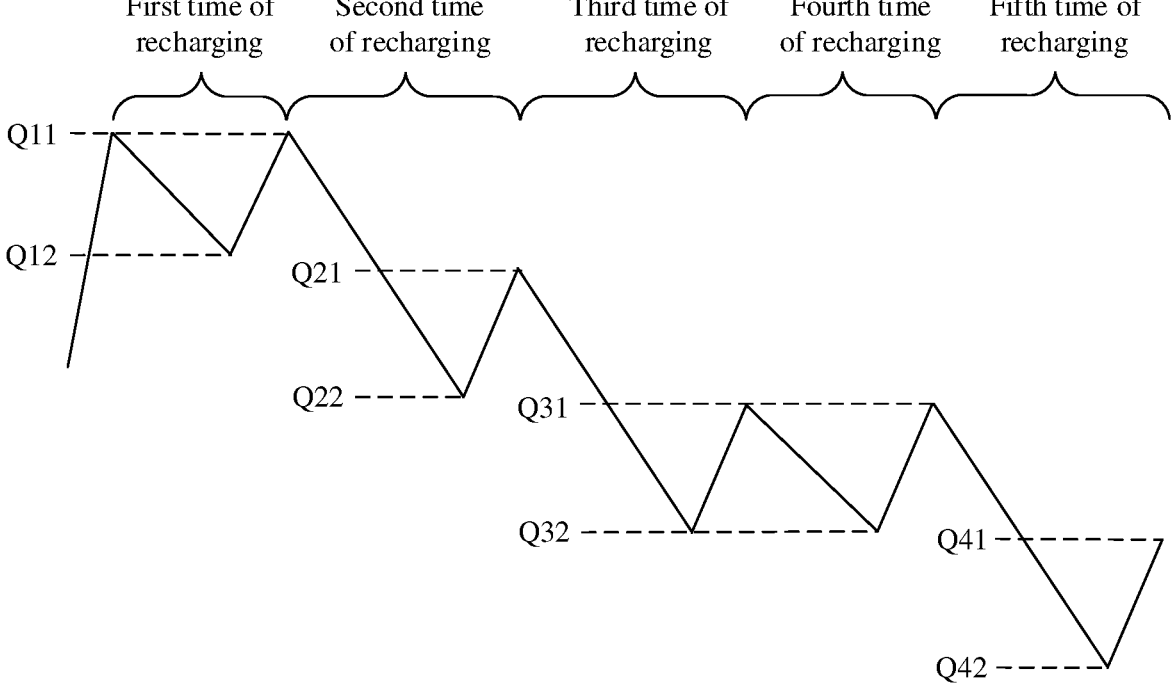
FIG. 12 is a schematic diagram of a process of reducing two charge thresholds at a variable cycle according to an embodiment of this application.

Example 1: As shown in FIG. 12, after the first time of recharging is completed, the full charge threshold is lowered to Q12 from initial Q11, and the recharge threshold is lowered to Q22 from initial Q21. After the second time of recharging is completed, the full charge threshold is lowered to Q31 from Q21, and the recharge threshold is lowered to Q32 from Q22. In other words, in this phase, each time the quantity of recharging times increases by 1, the full charge threshold and the recharge threshold are lowered once, that is, cycle m=1.

Starting from the third time of recharging, after the third time of recharging and the fourth time of recharging are completed in sequence, the full charge threshold is lowered to Q41 from Q31, and the recharge threshold is lowered to Q42 from Q32. In other words, in this phase, each time the quantity of recharging times increases by 2, the full charge threshold and the recharge threshold are lowered once, that is, cycle m=2.

Figure 13:
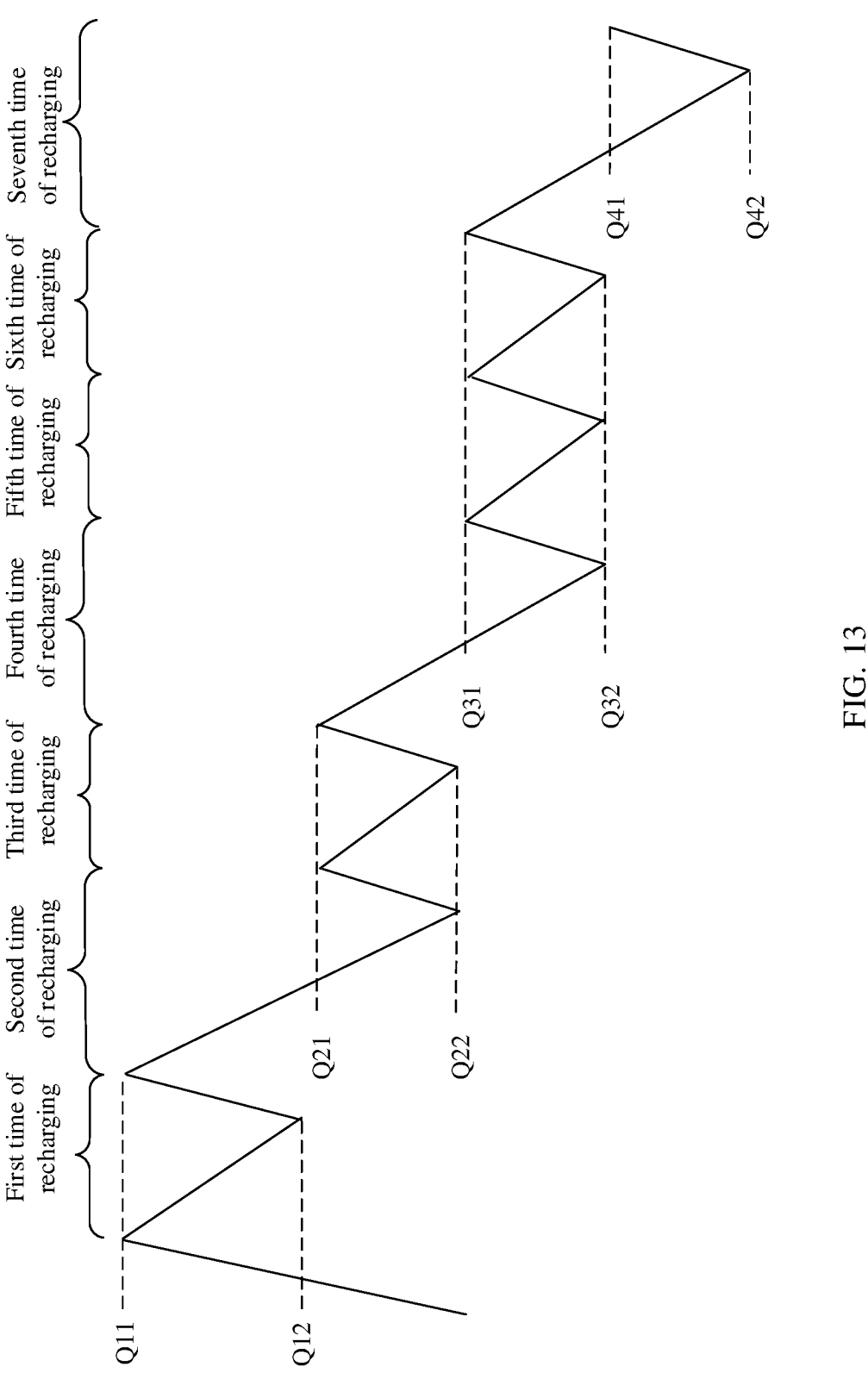
FIG. 13 is a schematic diagram of another process of reducing two charge thresholds at a variable cycle according to an embodiment of this application.

Example 2: As shown in FIG. 13, after the first time of recharging is completed, the full charge threshold is lowered to Q12 from initial Q11, and the recharge threshold is lowered to Q22 from initial Q21. In other words, in this phase, each time the quantity of recharging times increases by 1, the full charge threshold and the recharge threshold are lowered once, that is, cycle m=1.

Starting from the second time of recharging, after the second time of recharging and the third time of recharging are completed in sequence, the full charge threshold is lowered to Q31 from Q21, and the recharge threshold is lowered to Q32 from Q22. In other words, in this phase, each time the quantity of recharging times increases by 2, the full charge threshold and the recharge threshold are lowered once, that is, cycle m=2.

Starting from the fourth time of recharging, after the fourth time of recharging to the sixth time of recharging are completed in sequence, the full charge threshold is lowered to Q41 from Q31, and the recharge threshold is lowered to Q42 from Q32. In other words, in this phase, each time the quantity of recharging times increases by 3, the full charge threshold and the recharge threshold are lowered once, that is, cycle m=3.

Figure 14:
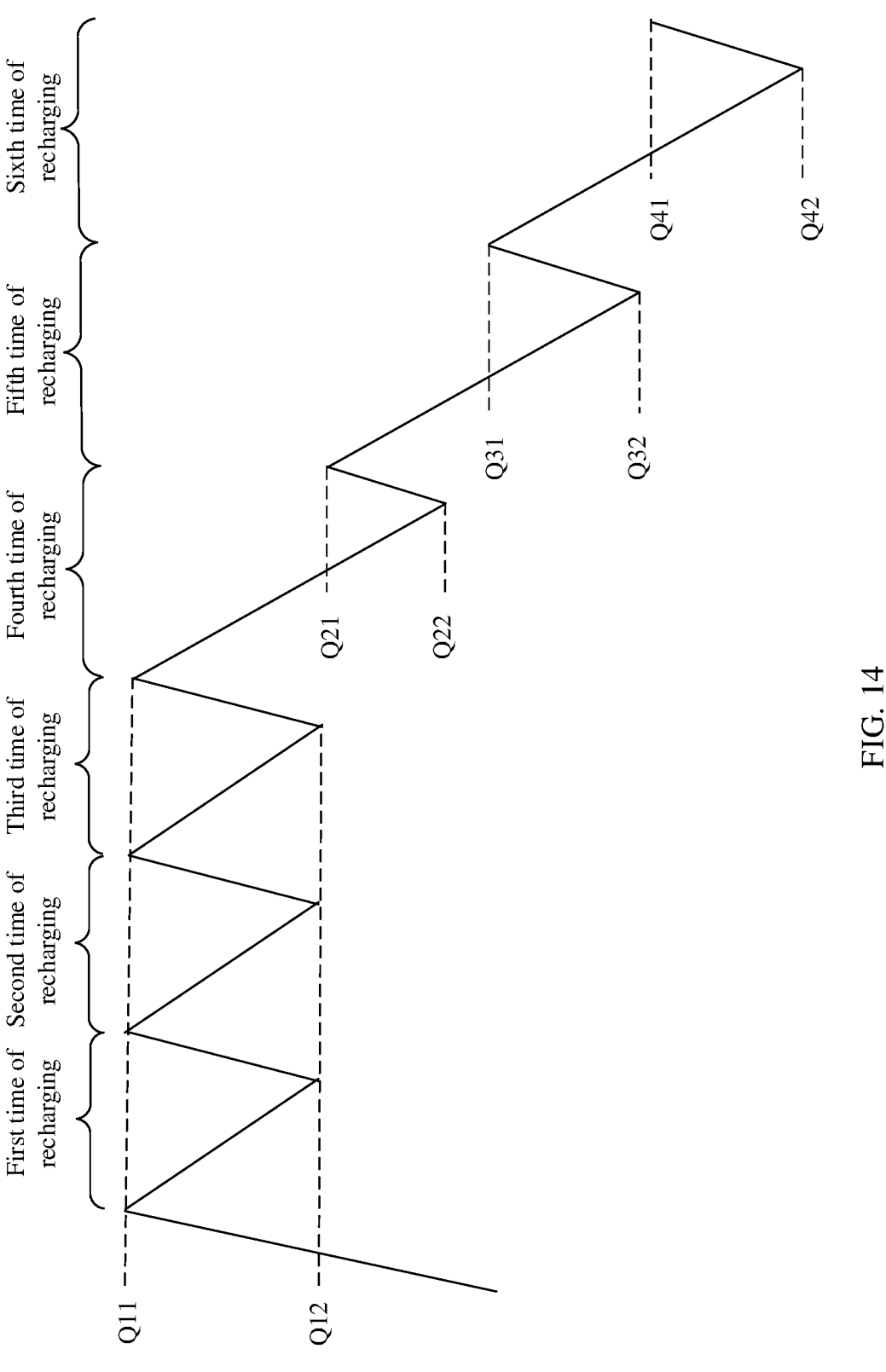
FIG. 14 is a schematic diagram of another process of reducing two charge thresholds at a variable cycle according to an embodiment of this application.

Example 3: As shown in FIG. 14, after the first time of recharging to the third time of recharging are completed, the full charge threshold is lowered to Q12 from initial Q11, and the recharge threshold is lowered to Q22 from initial Q21. In other words, in this phase, each time the quantity of recharging times increases by 3, the full charge threshold and the recharge threshold are lowered once, that is, cycle m=3.

After the fourth time of recharging is completed, the full charge threshold is lowered to Q31 from Q21, and the recharge threshold is lowered to Q32 from Q22. After the fifth time of recharging is completed, the full charge threshold is lowered to Q41 from Q31, and the recharge threshold is lowered to Q42 from Q32. In other words, in this phase, each time the quantity of recharging times increases by 1, the full charge threshold and the recharge threshold are lowered once, that is, cycle m=1.

In conclusion, according to the method in this embodiment of this application, a combination of a plurality of different cycles may be used to obtain a single charging process in which a smaller full charge threshold and a smaller recharge threshold are switched in any time of recharging, so that flexibility of recharging control is further improved.

In a process of lowering the full charge threshold and the recharge threshold in the foregoing two manners in the second scenario and controlling recharging by using the lowered full charge threshold and the lowered recharge threshold, if the lowered full charge threshold and/or recharge threshold are/is too small, endurance time of the mobile phone is greatly shortened, and use by the user is affected. For example, the full charge cut-off battery level decreases to 50% FCC. In this case, even if the battery is charged to the full charge cut-off battery level, endurance time of the battery is about only half of endurance time existing when the battery is charged to 100% FCC, and the endurance time is greatly shortened.

Further, in some other embodiments, to avoid the foregoing problem that the endurance time of the battery is greatly shortened due to a too small full charge threshold and/or recharge threshold, after the full charge threshold and the recharge threshold are lowered a plurality of times, the full charge threshold and the recharge threshold are kept unchanged. After a quantity-of-recharging-times threshold M is reached, the full charge threshold and the recharge threshold may be kept unchanged. Alternatively, when a full charge threshold is reduced to the first preset full charge threshold or less, and/or when a recharge threshold is reduced to the first preset recharge threshold or less, the full charge threshold and the recharge threshold may be kept unchanged. In this way, the full charge threshold and the recharge threshold can be finally stabilized in an appropriate range, to avoid that the full charge threshold and/or the recharge threshold are/is too small.

The quantity-of-recharging-times threshold, the first preset full charge threshold, and/or the first preset recharge threshold may be preset in the mobile phone.

The first preset full charge threshold and/or the first preset recharge threshold may be set based on an endurance condition of the battery. Specifically, the first preset full charge threshold is a minimum battery level or a minimum battery voltage that meets the endurance condition. The first preset recharge threshold is a minimum battery level or a minimum battery voltage that meets the endurance condition. For example, if the endurance condition is being longer than or equal to y hours, the first full charge threshold may be a minimum battery level required for 10-hour endurance. In addition, the minimum battery level or the minimum battery voltage may be a fixed constant or a variable that is set based on power consumption of the mobile phone in a single charging process.

In a specific implementation, after the quantity-of-recharging-times threshold M is reached, the full charge threshold and the recharge threshold are kept unchanged. Specifically, if $s+j-1)*m+i$ is equal to the quantity-of-recharging-times threshold M, in the $(M+k)^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging, where a value of k is successively set to $\{1, 2, \ldots \}$, M>s, and both k and M are integers.

For example, in FIG. 14, if M=6, in the seventh time (k=1) of recharging, the eighth time (k=2) of recharging, the ninth time (k=3) of recharging, and so on, the full charge threshold is kept unchanged as the full charge threshold Q41 in the sixth time of recharging, and the recharge threshold is kept unchanged as the recharge threshold Q42 in the sixth time of recharging. To be specific, in the seventh time of recharging and subsequent recharging, when the battery level of the battery is equal to Q41, the mobile phone controls the battery to stop charging; or when the battery level of the battery is equal to Q42, the mobile phone controls the battery to continue charging.

In another specific implementation, when a full charge threshold is reduced to the first preset full charge threshold or less, and/or when a recharge threshold is reduced to the first preset recharge threshold or less, the full charge threshold and the recharge threshold are kept unchanged. Specifically, if the full charge threshold j is less than or equal to the first preset full charge threshold, in the $[s+(j-1)*m+i+k]^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging. If the recharge threshold j is less than or equal to the first preset recharge threshold, in the $[s+(j-1)*m+i+k]^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging. A value of k is successively set to $\{1, 2, \ldots \}$, and k is an integer.

Still using FIG. 14 as an example, it is assumed that the first preset full charge threshold is the full charge cut-off battery level Q41. It is clear that, if the full charge threshold of the sixth time of recharging is the full charge cut-off battery level Q41, that is, is equal to the first preset full charge threshold, in the seventh time (k=1) of recharging, the eighth time (k=2) of recharging, the ninth time (k=3) of recharging, and so on, the full charge threshold is kept unchanged as the full charge cut-off battery level Q41 in the sixth time of recharging, and the recharge threshold is kept unchanged as the recharge battery level Q42 in the fifth time of recharging. To be specific, in the seventh time of recharging and subsequent recharging, when the battery level of the battery is equal to Q41, the mobile phone controls the battery to stop charging; or when the battery level of the battery is equal to Q42, the mobile phone controls the battery to continue charging.

A typical implementation of this embodiment is as follows: After the full charge threshold and the recharge threshold are gradually reduced at intervals of cycle m=1, if the quantity of recharging times reaches the quantity-of-recharging-times threshold, reduction of the full charge threshold and the recharge threshold at intervals of cycle m=1 is stopped, but a full charge threshold and a recharge threshold in recharging corresponding to the quantity-of-recharging-times threshold are kept unchanged.

Figure 15:
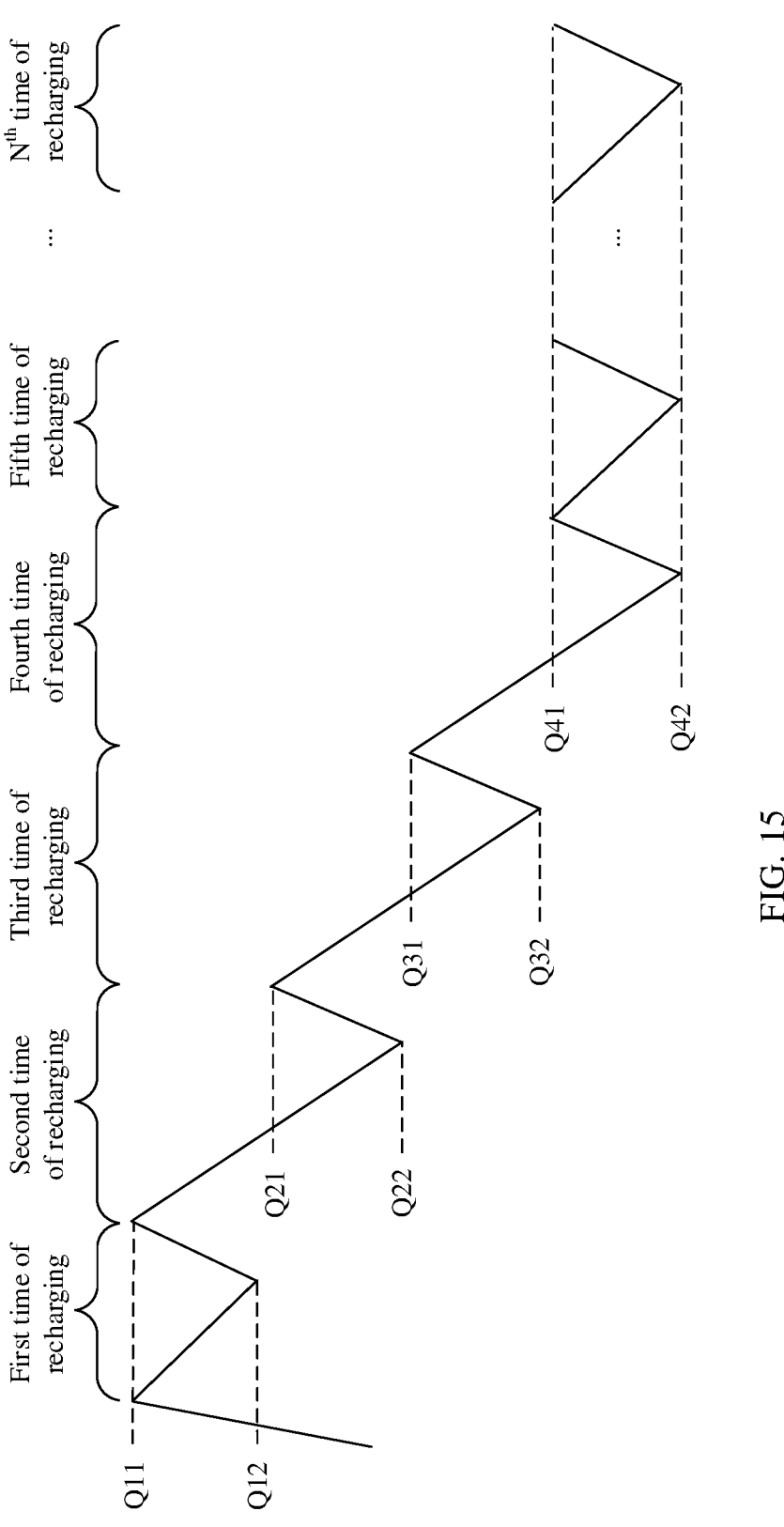
FIG. 15 is a schematic diagram of a process of reducing two charge thresholds according to an embodiment of this application.

For example, it is assumed that the quantity-of-recharging-times threshold is 4. As shown in FIG. 15, in the first to the fourth times of recharging, the full charge threshold successively decreases to Q21, Q31 and Q41 from initial Q11, and the recharge threshold successively decreases to Q22, Q32, and Q42 from initial Q12. When it is learned through statistics collection that the quantity of recharging times is 4, the full charge threshold and the recharge threshold are not further reduced, but the full charge threshold is kept unchanged as Q41, and the recharge threshold is kept unchanged as Q42. That is, the full charge threshold and the recharge threshold in the fourth to the $N^{th}$ times of recharging are respectively kept as Q41 and Q42.

In conclusion, according to the method in this embodiment of this application, an excessively small full charge threshold and recharge threshold can be avoided when the full charge threshold and the recharge threshold are periodically reduced, so that endurance time of the battery can be ensured.

In the foregoing embodiments, a full charge threshold and a recharge threshold that are used in each time of recharging may be obtained in a manner of table searching, real-time calculation, or preset AI model prediction. This is not specifically limited in this embodiment of this application.

In some embodiments, the full charge threshold and the recharge threshold are directly obtained in a table searching manner. In this way, a data operation amount in recharging control can be reduced.

In an implementation in which a full charge threshold and a recharge threshold are obtained based on only a quantity of recharging times, a plurality of groups of thresholds and quantities of recharging times corresponding to the plurality of groups of thresholds are stored in the mobile phone. Each group of thresholds includes a full charge threshold and a recharge threshold. Correspondingly, in a single charging process, after obtaining the quantity of recharging times through statistics collection, the mobile phone searches the plurality of groups of thresholds for a first group of thresholds corresponding to the quantity of recharging times. Then, a full charge threshold and a recharge threshold in the first group of thresholds are used to control subsequent recharging.

For example, the mobile phone stores a correspondence between a plurality of groups of thresholds and quantities of recharging times shown in the following Table 6.

TABLE 6

| Quantity of recharging times | Full charge threshold (mAh) | Recharge threshold (mAh) |
|---|---|---|
| 1 | 4000 | 3600 |
| 2 | 4000 | 3600 |
| 3 | 3400 | 3000 |
| . . . | . . . | . . . |
| N – 1 | 3400 | 3000 |

It should be emphasized again that the first time of recharging is usually controlled by using an initial full charge threshold and an initial recharge threshold. The initial full charge threshold and the initial recharge threshold are initial values of threshold parameters. After the first time of recharging is started, the initial full charge threshold and the initial recharge threshold may be directly used without being obtained in real time. Therefore, in the table of the correspondence between a plurality of groups of thresholds and quantities of recharging times, a full charge threshold and a recharge threshold corresponding to a quantity 0 of recharging times usually do not exist, that is, a full charge threshold and a recharge threshold for controlling the first time of recharging do not exist. The following is the same. If the initial full charge threshold is 4000 mAh and the initial recharge threshold is 3600 mAh, a single charging process shown in FIG. 5 can be obtained by controlling recharging based on the initial thresholds and Table 6.

In an implementation in which a full charge threshold and a recharge threshold are obtained with reference to a quantity of recharging times and a temperature, a plurality of groups of thresholds and temperature ranges and quantities of recharging times corresponding to the plurality of groups of thresholds are stored in the mobile phone. Each group of thresholds includes a full charge threshold and a recharge threshold. Correspondingly, in a single charging process, after obtaining the quantity of recharging times through statistics collection, the mobile phone searches the plurality of groups of thresholds for a second group of thresholds corresponding to a temperature value in the time of recharging and the quantity of recharging times. Then, a full charge threshold and a recharge threshold in the second group of thresholds are used to control subsequent recharging. For example, after obtaining the quantity s+(j−1)*m of recharging times through statistics collection, the mobile phone searches the plurality of groups of thresholds for a second group of thresholds corresponding to a temperature value in the $[s+(j-1)*m]^{th}$ time of recharging and the quantity s+(j−1)*m of recharging times. Then, the full charge threshold and the recharge threshold in the second group of thresholds are used to control recharging in the $j^{th}$ cycle, that is, control the $[s+(j-1)*m+i]^{th}$ time of recharging.

In some other embodiments, the full charge threshold and the recharge threshold are obtained in a real-time calculation manner. In this way, flexibility of obtaining the full charge threshold and the recharge threshold can be improved.

In an implementation in which a full charge threshold and a recharge threshold are obtained based on only a quantity of recharging times, a plurality of groups of threshold adjustment values and a quantity of recharging times corresponding to each group of threshold adjustment values are stored in the mobile phone. Each group of threshold adjustment values includes a full charge threshold adjustment value and a recharge threshold adjustment value, the full charge threshold adjustment value is used to adjust a full charge threshold of the battery, and the recharge threshold adjustment value is used to adjust a recharge threshold of the battery. In a single charging process, after obtaining the quantity of recharging times through statistics collection, the mobile phone searches the plurality of groups of threshold adjustment values for a first group of threshold adjustment values corresponding to the quantity of recharging times. The first group of threshold adjustment values includes a first full charge threshold adjustment value and a first recharge threshold adjustment value. The first full charge threshold adjustment value is a difference between full charge thresholds in two adjacent times of recharging, and the first recharge threshold adjustment value is a difference between recharge thresholds in two adjacent times of recharging. Alternatively, the first full charge threshold adjustment value is a difference between full charge thresholds in two adjacent cycles, and the first recharge threshold adjustment value is a difference between recharge thresholds in two adjacent cycles. Correspondingly, the first full charge threshold adjustment value is subtracted from a full charge threshold in a previous time of recharging or a previous cycle, to obtain a full charge threshold for controlling subsequent recharging, and the first recharge threshold adjustment value is subtracted from a recharge threshold in the previous time of recharging or the previous cycle, to obtain a recharge threshold for controlling subsequent recharging.

Alternatively, the first full charge threshold adjustment value is a difference between a to-be-obtained full charge threshold and the initial full charge threshold, and the first recharge threshold adjustment value is a difference between a to-be-obtained recharge threshold and the initial recharge threshold. Correspondingly, the first full charge threshold adjustment value is subtracted from the initial full charge threshold, to obtain a full charge threshold for controlling subsequent recharging, and the first recharge threshold adjustment value is subtracted from the initial recharge threshold, to obtain a recharge threshold for controlling subsequent recharging. The following uses an example to describe this case.

For example, the mobile phone stores a correspondence between a plurality of groups of threshold adjustment values and quantities of recharging times shown in the following Table 7.

TABLE 7

| Quantity of recharging times | Full charge threshold adjustment value (mAh) | Recharge threshold adjustment value (mAh) |
|---|---|---|
| 1 | 0 | 0 |
| 2 | 300 | 300 |
| 3 | 600 | 600 |
| . . . | . . . | . . . |
| N – 1 | (N – 2)*300 | (N – 2)*300 |

It is assumed that the initial full charge threshold is 4000 mAh, and the initial recharge threshold is 3600 mAh. When a collected quantity of recharging times is 3, a first full charge threshold adjustment value 600 mAh and a first recharge threshold adjustment value 600 mAh may be found. The first full charge threshold adjustment value 600 mAh is subtracted from the initial full charge threshold 4000 mAh to obtain a full charge threshold 3400 mAh for controlling the fourth time of recharging, and the first recharge threshold adjustment value 600 mAh is subtracted from the initial recharge threshold 3600 mAh to obtain a recharge threshold 3000 mAh for controlling the fourth time of recharging.

In an implementation in which a full charge threshold and a recharge threshold are obtained with reference to a quantity of recharging times and a temperature, a plurality of groups of threshold adjustment values and a temperature range and a quantity of recharging times corresponding to each group of threshold adjustment values are stored in the mobile phone. Similarly, each group of threshold adjustment values includes a full charge threshold adjustment value and a recharge threshold adjustment value. For definitions of the full charge threshold adjustment value and the recharge threshold adjustment value and use of the full charge threshold adjustment value and the recharge threshold adjustment value in final calculation for obtaining a full charge threshold and a recharge threshold, refer to the foregoing description in "an implementation in which a full charge threshold and a recharge threshold are obtained based on only a quantity of recharging times". Only "first" needs to be changed to "second". Details are not described herein again.

An only difference is as follows: In a single charging process, after obtaining the quantity of recharging times through statistics collection and obtaining the temperature, the mobile phone searches the plurality of groups of threshold adjustment values for a second group of threshold adjustment values corresponding to the quantity of recharging times and the temperature. For example, the mobile phone searches the plurality of groups of threshold adjustment values for a second group of adjustment values corresponding to a temperature value in the $[s+(j-1)*m]^{th}$ time of recharging and the quantity $s+(j-1)*m$ of recharging times.

It should be noted herein that, in the foregoing table searching or real-time calculation manner, thresholds or threshold adjustment values in a table are stored in groups. In some other embodiments, only a plurality of full charge thresholds or a plurality of recharge thresholds may be stored in a table. Alternatively, only a plurality of full charge threshold adjustment values or a plurality of recharge threshold adjustment values may be stored in a table.

For example, refer to the foregoing Table 1. In Table 1, only full charge thresholds are stored, and after a full charge threshold is obtained through query, a preset difference is further subtracted from the full charge threshold to obtain a recharge threshold. On the contrary, in a case in which only recharge thresholds are stored, after a recharge threshold is obtained through query, a preset difference is further added to the recharge threshold to obtain a full charge threshold.

For another example, the mobile phone stores a correspondence between a plurality of full charge threshold adjustment values and temperature ranges and quantities of recharging times shown in the following Table 8.

TABLE 8

| Quantity of recharging times | Less than or equal to 30 | Greater than 30 and less than or equal to 35 | Greater than 35 and less than or equal to 40 | Greater than 40 |
|---|---|---|---|---|
| 1 | 0 | 0 | 0 | 0 |
| 2 | 0 | 0 | 0 | 50 mV |
| 3 | 0 | 0 | 50 mV | 100 mV |
| 4 | 0 | 50 mV | 100 mV | 150 mV |
| 5 | 50 mV | 100 mV | 150 mV | 200 mV |

For the case in Table 8 in which only full charge threshold adjustment values are stored, after a full charge threshold adjustment value is obtained through query, a full charge threshold is first obtained through calculation, and then a preset difference is subtracted from the full charge threshold to obtain a recharge threshold. On the contrary, for a case in which only recharge threshold adjustment values are stored, after a recharge threshold adjustment value is obtained through query, a recharge threshold is first obtained through calculation, and then a preset difference is added to the recharge threshold to obtain a full charge threshold.

In this embodiment, only a plurality of full charge thresholds or a plurality of recharge thresholds are stored in a table, or only a plurality of full charge threshold adjustment values or a plurality of recharge threshold adjustment values are stored in a table. This can reduce data storage without increasing a large operation amount.

In some other embodiments, a full charge threshold and a recharge threshold are predicted by using a preset AI model. In this way, an intelligence degree of obtaining the full charge threshold and the recharge threshold can be improved.

In an implementation in which a full charge threshold and a recharge threshold are obtained based on only a quantity of recharging times, the mobile phone includes a first preset AI model, and the first preset AI model has a function of determining a full charge threshold and a recharge threshold of the battery based on a quantity of recharging times of the battery. The first preset AI model is obtained through training by using a plurality of groups of training samples. Each group of training samples may include an input sample and a corresponding output sample. The input sample is a quantity of recharging times, and the corresponding output sample is a full charge threshold and a recharge threshold. The foregoing plurality of groups of training samples may be obtained through big data analysis. The training samples are determined by analyzing a degree of impact of a quantity of recharging times on a performance parameter of a battery in a charging process of a mobile phone with a corresponding model. For example, a degree of impact of an increase in the quantity of recharging times on the performance parameter of the battery is analyzed, and a degree of impact of values of a full charge threshold and a recharge threshold on the performance parameter of the battery is analyzed, to determine the training samples. The performance parameter of the battery includes a service life of the battery, a temperature status of the battery, safety performance of the battery, and/or the like.

Then, in a single charging process, after obtaining the quantity of recharging times through statistics collection, the mobile phone runs the first preset AI model by using the quantity of recharging times as an input of the first preset AI model, to output a full charge threshold and a recharge threshold. Finally, the mobile phone controls recharging by using the full charge threshold and the recharge threshold.

For example, the mobile phone runs the first preset AI model by using the quantity $s+(j-1)*m+i$ of recharging times as an input, to output the full charge threshold j and the recharge threshold j. In the $[s+(j-1)*m+i]^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging.

For another example, the mobile phone runs the first preset AI model by using the quantity $s+(j-1)*m$ of recharging times as an input, to output the full charge threshold j and the recharge threshold j. In the $[s+(j-1)*m+i]^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging.

In an implementation in which a full charge threshold and a recharge threshold are obtained with reference to a quantity of recharging times and a temperature, the mobile phone includes a second preset AI model, and the second preset AI model has a function of determining a full charge threshold and a recharge threshold of the battery based on a quantity of recharging times and a temperature of the battery. The second preset AI model is obtained through training by using a plurality of groups of training samples. Each group of training samples may include an input sample and a corresponding output sample. The input sample is a quantity of recharging times and a temperature, and the corresponding output sample is a full charge threshold and a recharge threshold. The foregoing plurality of groups of training samples may be obtained through big data analysis. Specifically, the training samples are determined by analyzing a degree of impact of a quantity of recharging times and a temperature on a performance parameter of a battery in a charging process of a mobile phone with a corresponding model. For example, a degree of impact of an increase in the quantity of recharging times and a rise of the temperature on the performance parameter of the battery is analyzed, and a degree of impact of values of a full charge threshold and a recharge threshold on the performance parameter of the battery is analyzed, to determine the training samples. The performance parameter of the battery includes a service life of the battery, safety performance of the battery, and/or the like.

Then, in a single charging process, after obtaining the quantity of recharging times through statistics collection and obtaining the temperature, the mobile phone runs the second preset AI model by using the quantity of recharging times and the temperature as an input of the second preset AI model, to output a full charge threshold and a recharge threshold. Finally, the mobile phone controls recharging by using the full charge threshold and the recharge threshold.

For example, the mobile phone runs the second preset AI model by using the quantity s+(j−1)*m of recharging times and an average temperature in the $[s+(j-1)*m]^{th}$ time of recharging as an input, to output the full charge threshold j and the recharge threshold j. In the $[s+j-1)*m+i]^{th}$ time of recharging of the battery, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging.

Finally, it should be emphasized that, regardless of a manner of searching a table, performing real-time calculation, or performing prediction by using a preset AI model, it needs to be ensured that a full charge threshold and a recharge threshold generally tend to decrease as a quantity of recharging times increases and/or a temperature increases. In this way, when the quantity of recharging times is relatively large or a charging temperature is relatively high, recharging can be implemented in a low voltage or battery level state, thereby improving charging conversion efficiency in recharging and reducing battery heat. Therefore, a battery life can be effectively prolonged, and a safety risk such as battery swelling can be avoided.

Further, after the full charge threshold is continuously lowered, a case in which the battery cannot be fully charged may occur. For example, as shown in FIG. 5, in the fourth time of recharging and subsequent recharging, the full charge cut-off battery level is 3400 mAh, and is only 85% FCC. Further, based on a battery level displayed on the mobile phone or endurance time of the mobile phone after charging is stopped, the user can clearly perceive that the battery cannot be fully charged.

In addition, after the recharge threshold is continuously lowered, a case in which the battery level does not increase but decreases seriously may occur in a plug-in process. For example, as shown in FIG. 5, in the fourth time of recharging, the battery level drops from 4000 mAh to 3000 mAh, that is, drops 25% FCC. Further, the user can clearly perceive that the battery level does not increase but decreases seriously.

Generally, when the user clearly perceives that the battery cannot be fully charged, and/or clearly perceives that the battery level does not increase but decreases seriously in a plug-in process, the user has doubt about battery performance. Based on this, in some other embodiments, after a used full charge threshold and/or recharge threshold are/is less than a specific degree, a user prompt is given, so that the user knows a reason why the battery cannot be fully charged or the battery level does not increase but decreases. Specifically, as shown in FIG. 16, after a full charge threshold and a recharge threshold are lowered each time, S1601 is further included. In addition, S1602 is further included to control recharging by using a lowered full charge threshold and recharge threshold.

S1601: When a switched full charge threshold is less than or equal to a second preset full charge threshold, and/or a switched recharge threshold is less than or equal to a second preset recharge threshold, the mobile phone displays a prompt interface, where the prompt interface includes first prompt information, and the first prompt information is used to prompt a user with a reason for a full charge failure and/or prompt the user with a reason for a power failure in a single charging process.

The second preset full charge threshold and/or the second preset recharge threshold are/is used to trigger display of prompt information of intelligent charging protection for the user. Usually, the first preset full charge threshold is less than or equal to the second preset full charge threshold, and the first preset recharge threshold is less than or equal to the second preset recharge threshold.

For example, before S403, if the second full charge threshold is less than the second preset full charge threshold, it indicates that controlling the battery to end charging by using the second full charge threshold causes the user to find that the battery cannot be fully charged. In this case, display of the prompt information of intelligent charging protection for the user is triggered, to prompt the user with the reason for the full charge failure. If the second full charge threshold is greater than or equal to the second preset full charge threshold, it indicates that if the battery is controlled to end charging by using the second full charge threshold, the battery is charged to a voltage value close to a rated full charge voltage or a battery level value close to a full charge capacity, and it is difficult for the user to find that the battery cannot be fully charged. In this case, display of the prompt information of intelligent charging protection for the user does not need to be triggered, and the second full charge threshold may be directly used to control recharging, that is, S403 is performed. In addition, the second recharge threshold has a same principle, and only the full charge threshold in this example needs to be replaced with a recharge threshold.

For another example, before S801 (or S1004), if the full charge threshold j is less than the second preset full charge threshold, display of the prompt information of intelligent charging protection for the user is also triggered, to prompt the user with the reason for the full charge failure. If the full charge threshold j is greater than or equal to the second preset full charge threshold, display of the prompt information of intelligent charging protection for the user does not need to be triggered, and the second full charge threshold may be directly used to control recharging, that is, S801 (or S1004) is performed. In addition, the recharge threshold j has a same principle, and only the full charge threshold in this example needs to be replaced with a recharge threshold.

The reason for the full charge failure is as follows: A charging manner in which a full charge threshold and a recharge threshold are intelligently adjusted (referred to as an intelligent charging mode for short) is used, so that charging is stopped when the battery is charged to a full charge cut-off voltage (for example, 85% FCC) or a full charge cut-off battery level.

The reason for the power failure in the charging process is as follows: An intelligent charging mode is used, so that a difference between an unadjusted full charge threshold and an adjusted recharge threshold increases.

In some embodiments, the prompt interface and the first prompt information may be displayed by the mobile phone. The prompt interface may be any interface that may be used in a process of using the mobile phone, including but not limited to a home screen, a lock-screen interface, an application interface, a setting interface, or a message notification interface. In this specification, display on the home screen is mainly used for illustration. This is not limited in actual implementation.

Figure 17A:
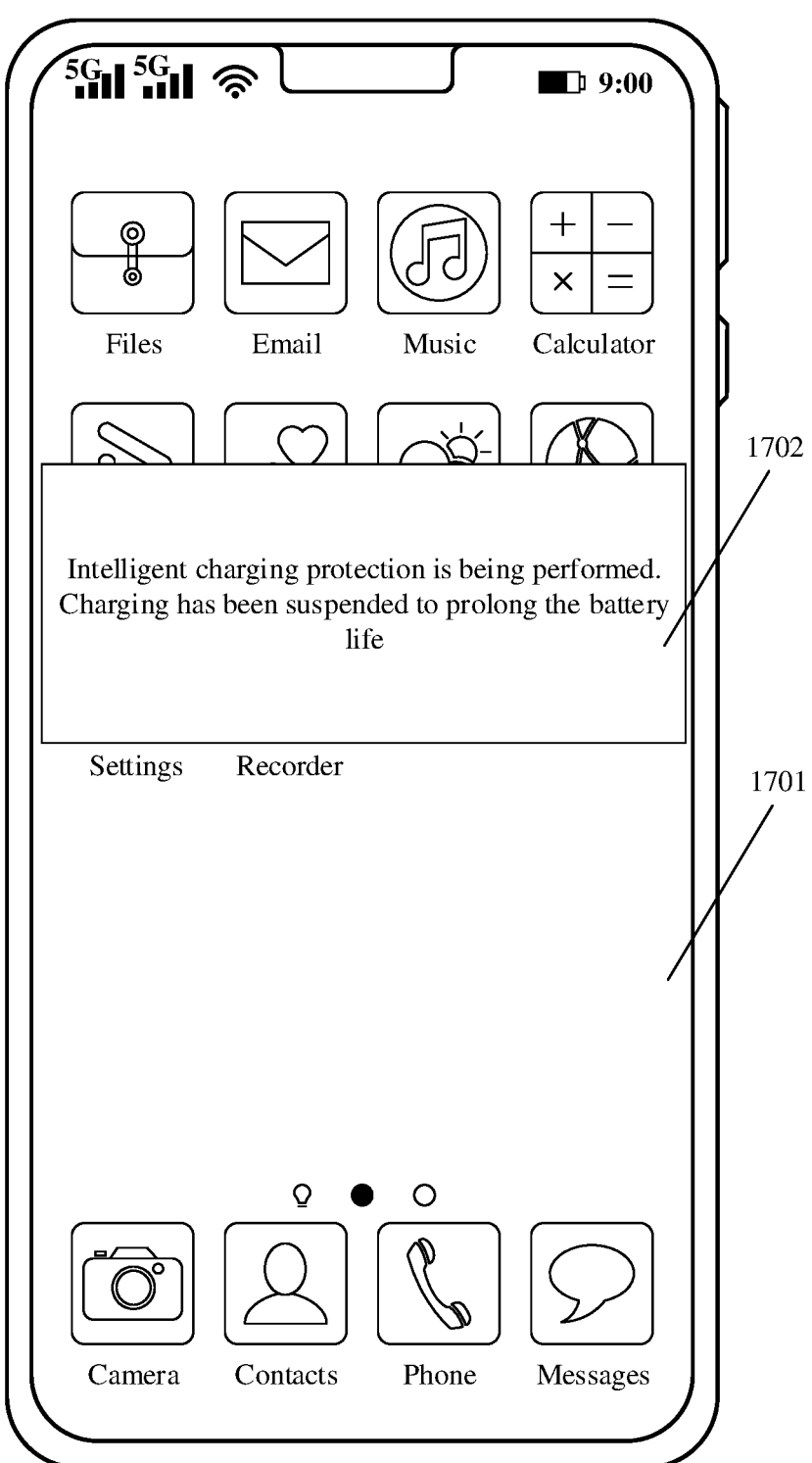
FIG. 17(*a*) to FIG. 17(*c*) are a schematic diagram of a prompt interface according to an embodiment of this application.

For example, a home screen 1701 of the mobile phone shown in FIG. 17(a) includes a prompt information window 1702, and the prompt information window 1702 displays first prompt information "Intelligent charging protection is being performed. Charging has been suspended to prolong the battery life". In this way, the user may be notified of the reason for the full charge failure.

In some other embodiments, the prompt interface and the first prompt information may be displayed by a device associated with the mobile phone. Usually, the prompt interface and the first prompt information may be displayed on a watch, a wristband, and/or a tablet associated with the mobile phone.

Figures 17B, 17C:
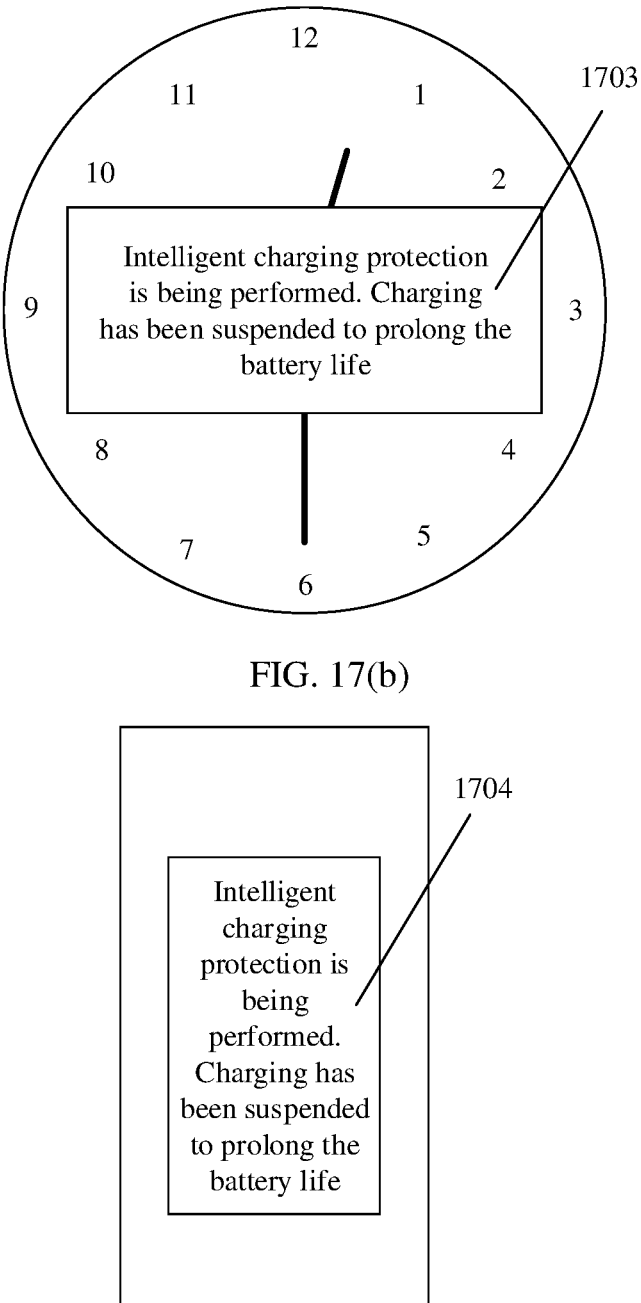

For example, a prompt information window 1703 is displayed on a watch shown in FIG. 17(b). For another example, a prompt information window 1704 is displayed on a wristband shown in FIG. 17(c).

In addition, to avoid affecting charging, when the switched full charge threshold is less than the second preset full charge threshold, and/or the switched recharge threshold is less than the second preset recharge threshold, if it is detected that a screen of the mobile phone is in an off state, the prompt interface and the first prompt information are displayed after the screen of the mobile phone is on.

It should be noted that, usually, in a single charging process, S1701 is performed only once, to avoid interference to the user caused by a plurality of prompts. Specifically, after the first prompt information is displayed once, neither of S1701 and a subsequent step is performed.

S1602: In response to a first operation of the user, the mobile phone recharges the battery based on the switched full charge threshold and recharge threshold. The first operation is used to indicate that use of an intelligent charging mode continues to be allowed.

The first operation may be an operation of tapping an area other than the first prompt information in the prompt interface, a return operation performed in the prompt interface, an operation of closing the first prompt information, an operation of tapping the first prompt information, or the like.

For example, S403 includes: In response to the first operation of the user, in the $(n+i)^{th}$ time of recharging of the battery, when a current battery level or a current voltage of the battery is equal to the second full charge threshold, the mobile phone controls the battery to stop charging; or when a current battery level or a current voltage of the battery is equal to the second recharge threshold, the mobile phone controls the battery to continue charging. In addition, the second full charge threshold is less than the first full charge threshold, and the second recharge threshold is less than the first recharge threshold.

For another example, S801 or S1004 includes: In response to the first operation of the user, in the $[s+(j-1)$ $*m+i]^{th}$ time of recharging, when a current battery level or a current voltage of the battery is equal to the full charge threshold j, the mobile phone controls the battery to stop charging; or when a current battery level or a current voltage of the battery is equal to the recharge threshold j, the mobile phone controls the battery to continue charging.

In conclusion, according to the method in this embodiment of this application, the first prompt information may be displayed on an appropriate occasion, to prompt the user with the reason for the full charge failure and/or prompt the user with the reason for the power failure in the charging process, and the intelligent charging mode continues to be used based on the first operation of the user. In this way, intelligent charging protection is implemented, a battery life is prolonged, and experience of human-computer interaction is improved.

Figure 18A:
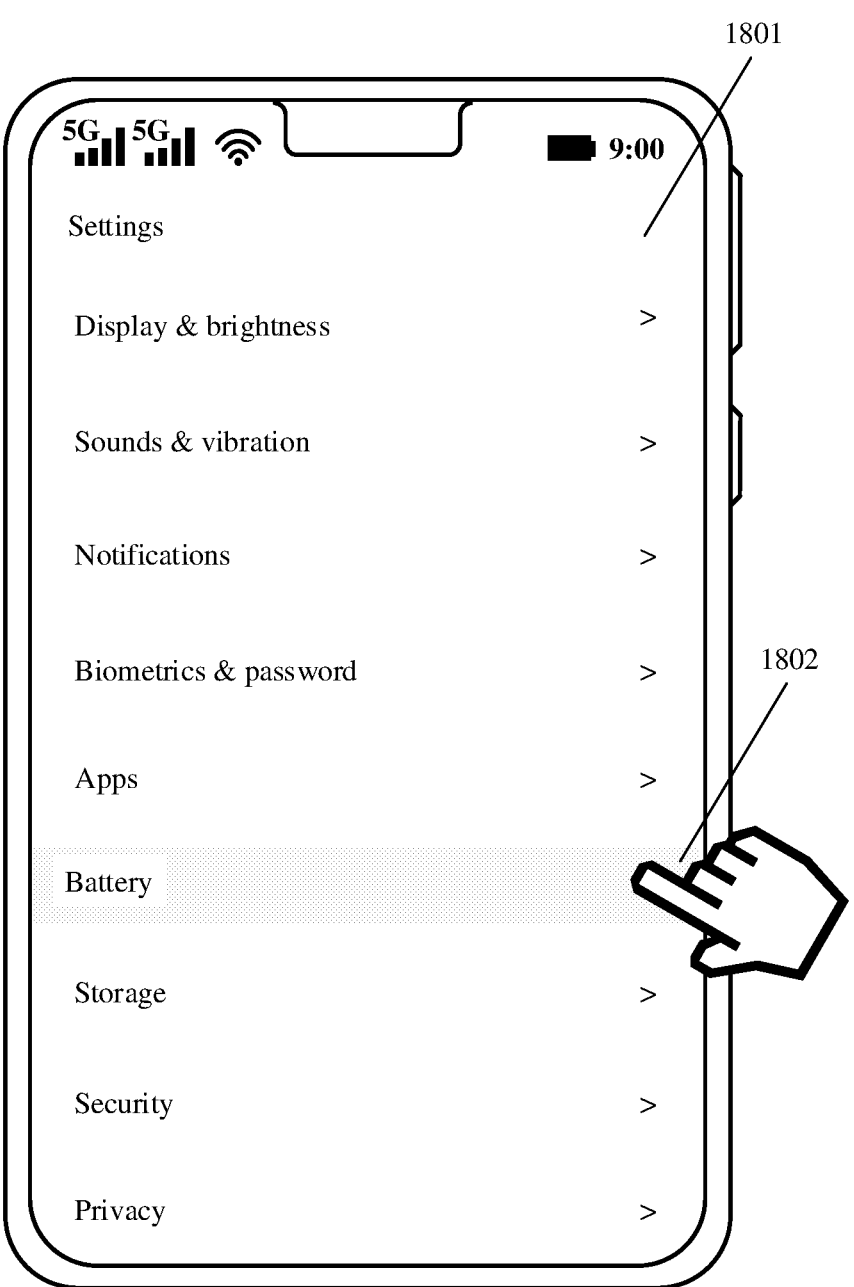
FIG. 18(*a*) and FIG. 18(*b*) are a schematic diagram of a mobile phone interface according to an embodiment of this application.

Further, the mobile phone may enable or disable the charging protection mode in response to an operation performed by the user for enabling or disabling the charging protection mode. Usually, the mobile phone provides an enabling and disabling entry of the charging protection function in a "Settings" application. For example, the mobile phone may receive a tap operation of the user on a battery option 1802 in an application interface 1801 of a "Settings" application shown in FIG. 18(a). In response to the tap operation of the user on the battery option 1802, the mobile phone may finally display a "More battery settings" interface 1803 shown in FIG. 18(b). The "More battery settings" interface 1803 includes an enabling and disabling entry 1804 of an intelligent charging mode. Prompt information "To prolong the battery life, the system intelligently adjusts the charging policy according to your charging habits" is displayed at the enabling and disabling entry 1804 of the intelligent charging mode, so that the user clearly knows a function of the intelligent charging mode.

Figure 18B:
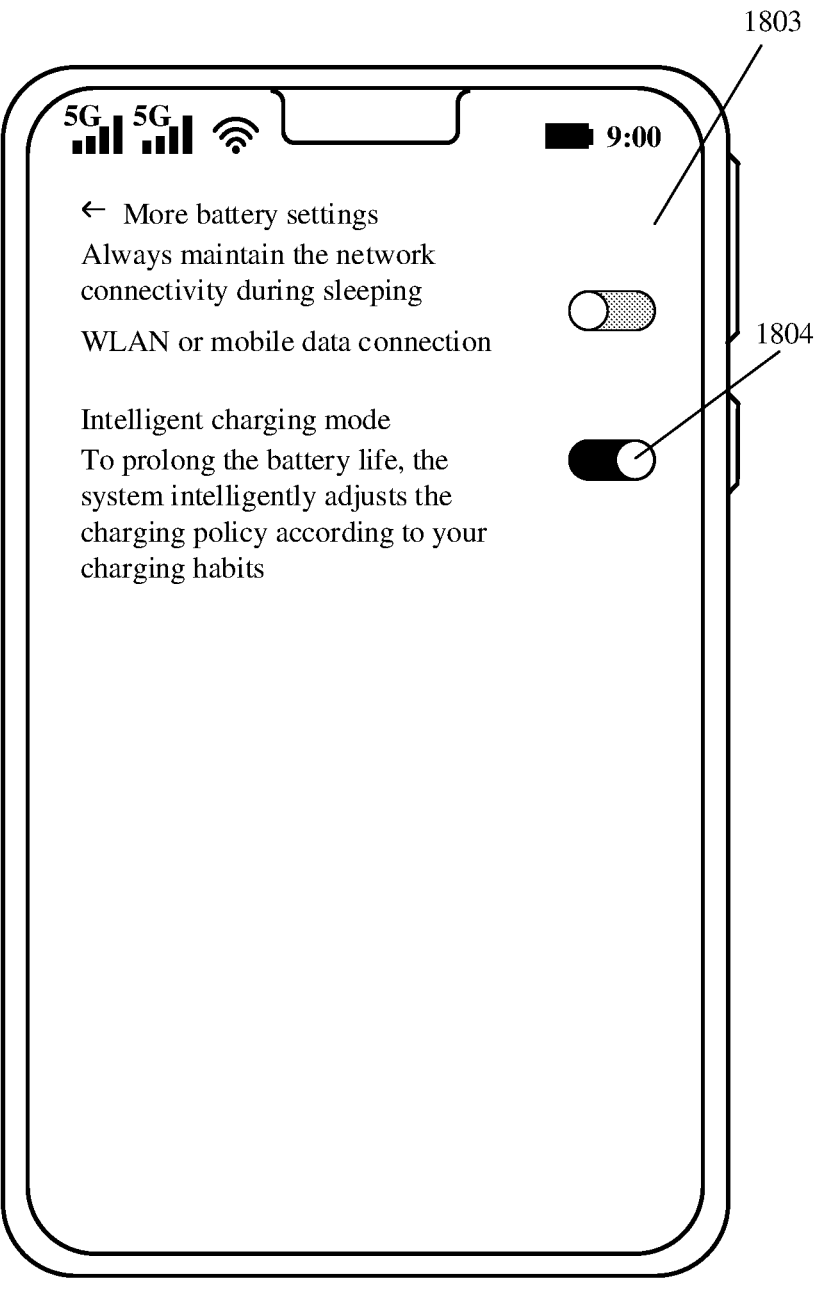

In a specific implementation, the charging protection function is enabled by default. In this way, intelligent charging protection may be implemented without a user operation. For example, the enabling and disabling entry 1804 of the charging protection function shown in FIG. 18(b) is on by default.

In another specific implementation, the charging protection function is disabled by default, and the mobile phone needs to respond to an enabling operation performed by the user on the charging protection function to enable the charging protection function. In this way, a use requirement of the user for the charging protection function can be accurately met.

In some embodiments, the prompt interface further includes second prompt information. The second prompt information is used to prompt the user to select a charging mode. Charging modes include an intelligent charging mode and a normal charging mode. The second prompt information includes a first charging mode selection control and a second charging mode selection control, the first charging mode selection control is used to trigger selection of the intelligent charging mode, and the second charging mode selection control is used to trigger selection of the normal charging mode. Correspondingly, S1602 includes: In response to a first operation performed by the user on the first charging mode selection control, the mobile phone recharges the battery based on the switched full charge threshold and recharge threshold. For example, the switched full charge threshold and recharge threshold may be respectively the second full charge threshold and the second recharge threshold. For another example, the switched full charge threshold and recharge threshold may be respectively the full charge threshold j and the recharge threshold j. In this way, a requirement of the user may be accurately determined based on charging mode selection of the user.

Figure 19A:
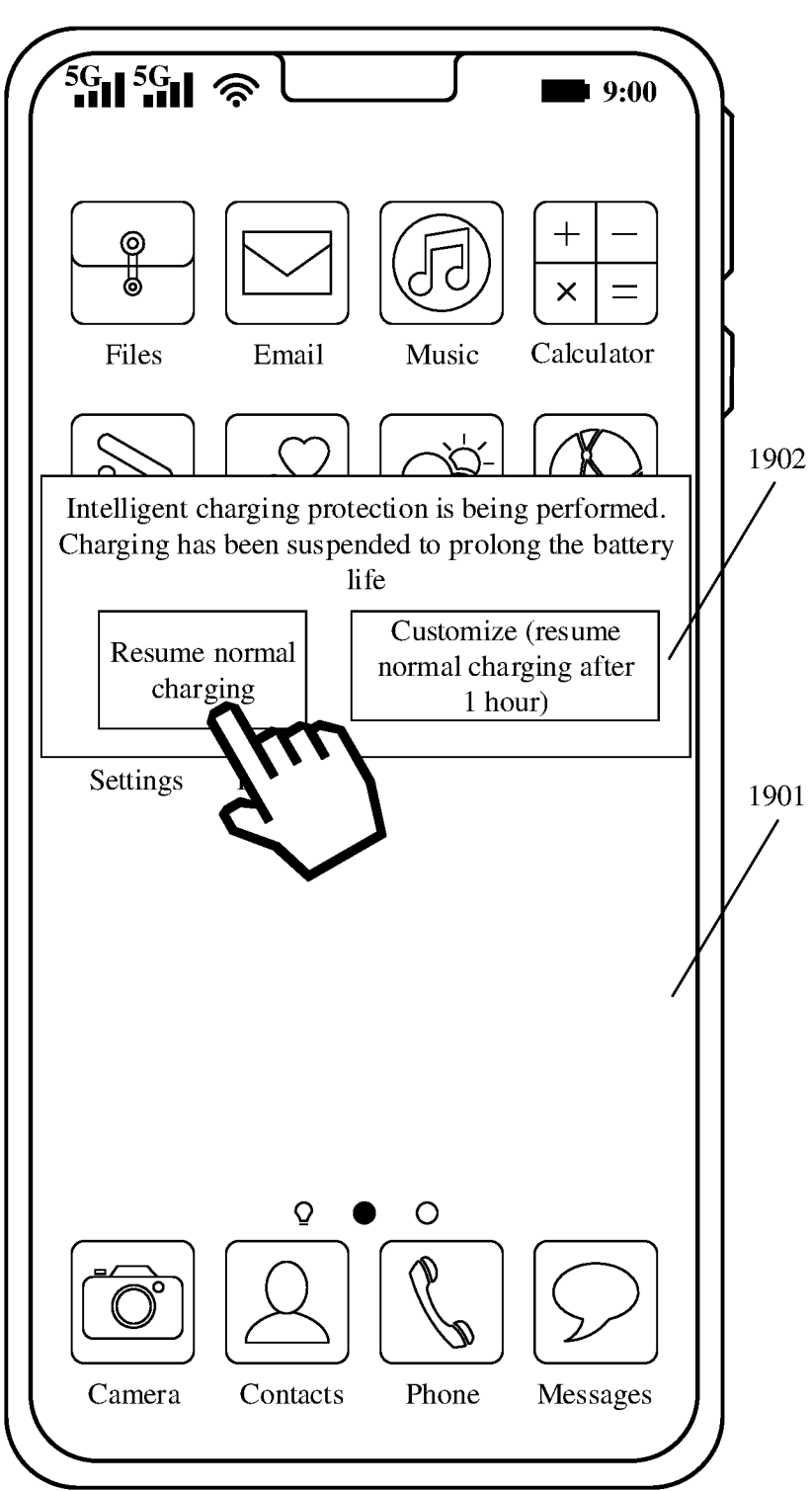
FIG. 19(*a*) and FIG. 19(*b*) are a schematic diagram of another prompt interface according to an embodiment of this application.

For example, as shown in FIG. 19(a), a home screen 1901 of the mobile phone includes a prompt information window 1902. The prompt information window 1902 displays the first prompt information "Intelligent charging protection is being performed. Charging has been suspended to prolong the battery life", and further displays the second prompt information: a "Resume normal charging" button and a "Customize (resume normal charging after 1 hour)" button. The "Customize (resume normal charging after 1 hour)" button is the first charging mode selection control. The "Resume normal charging" button is the first charging mode selection control. The mobile phone may receive a tap operation of the user on the "Resume normal charging" button shown in FIG. 19(a). The mobile phone exits the intelligent charging mode in response to the tap operation of the user on the "Resume normal charging" button. Alternatively, the mobile phone may receive a tap operation of the user on the "Customize (resume normal charging after 1 hour)" button shown in FIG. 19(a). In response to the tap operation of the user on the "Customize (resume normal charging after 1 hour)" button, the mobile phone displays a customized duration setting interface, so that the user customizes time for resuming normal charging. Before the time expires, it is considered that the user allows to continue to use the intelligent charging mode. In this case, S1602 is performed. That is, in this example, the first operation is the tap operation on the "Customize (resume normal charging after 1 hour)" button. When the time expires, the intelligent charging mode is exited.

In some other embodiments, in response to a second operation performed by the user on the second prompt information, the mobile phone displays third prompt information, where the third prompt information is used to prompt that the intelligent charging mode is exited, and further clearly indicate a response result of the mobile phone to the second operation.

Figure 19B:
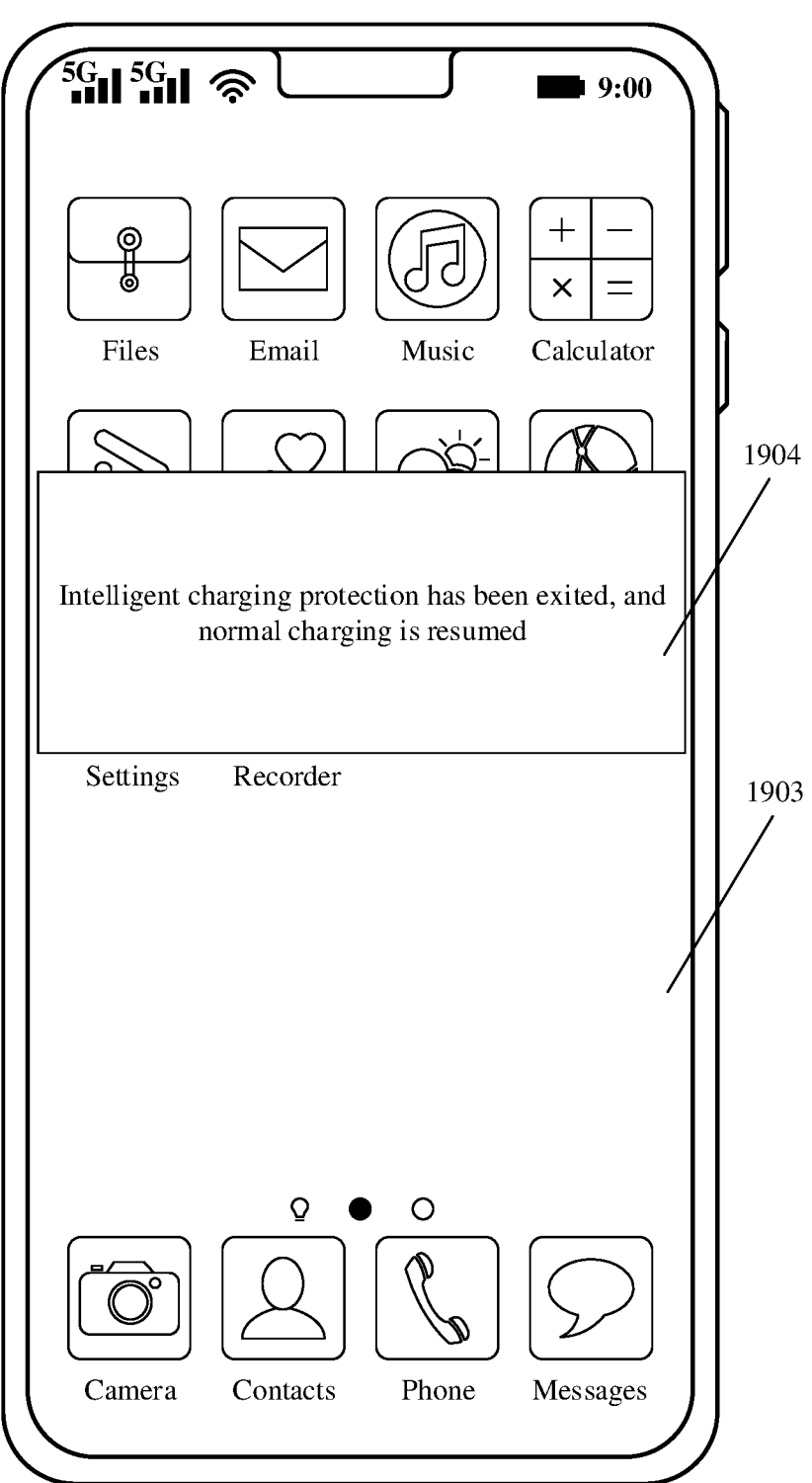

For example, the mobile phone receives a tap operation of the user on the "Resume normal charging" button in the prompt information window 1902 on the home screen 1901 of the mobile phone shown in FIG. 19(a). In response to the tap operation of the user on the "Resume normal charging" button, the mobile phone displays a home screen 1903 of the mobile phone shown in FIG. 19(b). The home screen 1903 displays the third prompt information 1904 "Intelligent charging protection has been exited, and normal charging is resumed".

Some other embodiments of this application provide an electronic device. The electronic device may include the foregoing display (such as a touchscreen), a memory, and one or more processors. The display, the memory, and a processor are coupled to each other. The memory is configured to store computer program code, and the computer program code includes computer instructions. When the processor executes the computer instructions, the electronic device may perform each function or step performed by the mobile phone in the foregoing method embodiments. For a structure of the electronic device, refer to the structure of the electronic device 300 shown in FIG. 3.

Figure 20:
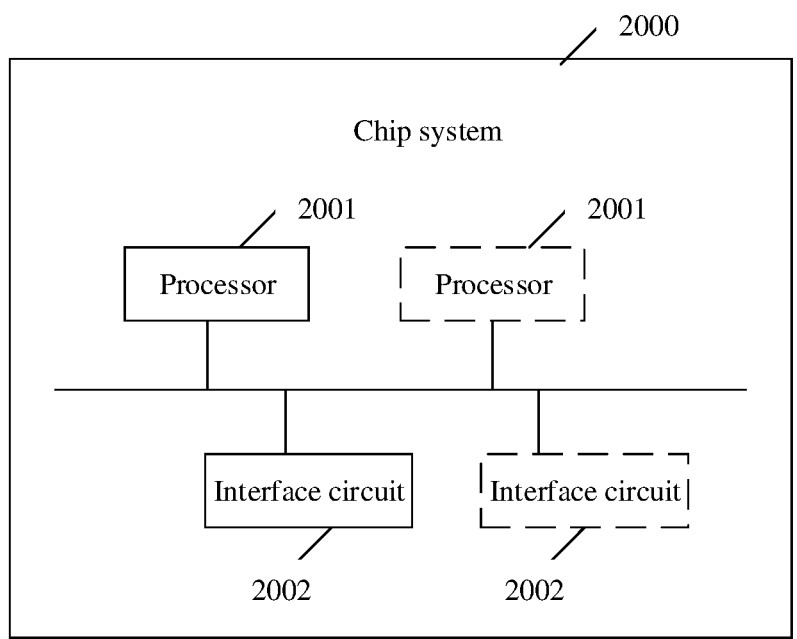
FIG. 20 is a schematic diagram of a structure of a chip system according to an embodiment of this application.

An embodiment of this application further provides a chip system. As shown in FIG. 20, the chip system 2000 includes at least one processor 2001 and at least one interface circuit 2002. The processor 2001 and the interface circuit 2002 may be interconnected by using a line. For example, the interface circuit 2002 may be configured to receive a signal from another apparatus (for example, the memory of the electronic device). For another example, the interface circuit 2002 may be configured to send a signal to another apparatus (for example, the processor 2001). For example, the interface circuit 2002 may read the instructions stored in the memory, and send the instructions to the processor 2001. When the instructions are executed by the processor 2001, the electronic device may perform steps in the foregoing embodiments. Certainly, the chip system may further include another discrete component. This is not specifically limited in this embodiment of this application.

An embodiment of this application further provides a computer storage medium. The computer storage medium includes computer instructions. When the computer instructions are run on the foregoing electronic device, the electronic device is enabled to perform functions or steps performed by the mobile phone in the foregoing method embodiments.

An embodiment of this application further provides a computer program product. When the computer program product runs on a computer, the computer is enabled to perform functions or steps performed by the mobile phone in the foregoing method embodiments.

It may be clearly learned by a person skilled in the art from the foregoing description of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may be one or more physical units, may be located in one place, or may be distributed in a plurality of different places. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application. However, the protection scope of this application is not limited thereto. Any change or replacement within the technical scope disclosed in this application shall fall within the protection scope of this application. Therefore, the protection scope of this application shall be subject to the protection scope of the claims.

What is claimed is:

1. A battery charging method, applied to an electronic device, wherein the method comprises:

collecting, by the electronic device, statistics on a quantity of recharging times of a battery in at least one single charging process, wherein the quantity of recharging times is a quantity of times that charging of the battery is continued after being stopped and is stopped again in the at least one single charging process;

in first n times of recharging of the battery, when a current battery level or a current voltage of the battery is equal to a first full charge threshold, controlling, by the electronic device, the battery to stop charging; or when a current battery level or a current voltage of the battery is equal to a first recharge threshold, controlling, by the electronic device, the battery to continue charging, wherein n≥2, n is an integer, and the first full charge threshold is greater than the first recharge threshold;

obtaining, by the electronic device, a temperature of the battery in the $n^{th}$ time of recharging; obtaining, by the electronic device, a second recharge threshold and a second full charge threshold in the $(n+i)^{th}$ time of recharging according to the temperature of the battery in the $n^{th}$ time of recharging and the quantity of recharging times of a battery n; wherein the second full charge threshold is greater than the second recharge threshold and the second recharge threshold is less than the first recharge threshold; wherein a value of i is successively set to {1, 2, . . . }, i is an integer;

and in the $(n+i)^{th}$ time of recharging of the battery, when a current battery level or a current voltage of the battery is equal to a second full charge threshold, controlling, by the electronic device, the battery to stop charging; or when a battery level or a current voltage of the battery is equal to the second recharge threshold, controlling, by the electronic device, the battery to continue charging.

2. The method according to claim 1, wherein when the second full charge threshold is less than or equal to a second preset full charge threshold, the electronic device displays a prompt interface, wherein the prompt interface comprises first prompt information, and the first prompt information is used to prompt a user with a reason for a full charge failure; and/or when the second recharge threshold is less than or equal to a second preset recharge threshold, the electronic device displays a prompt interface, wherein the prompt interface comprises first prompt information, and the first prompt information is used to prompt a user with a reason for a power failure in a single charging process.

3. The method according to claim 2, wherein the prompt interface further comprises second prompt information, the second prompt information is used to prompt the user to select a charging mode, and the second prompt information comprises a first charging mode selection control; and the controlling, by the electronic device, the battery to stop charging when a current battery level or a current voltage of the battery is equal to a second full charge threshold; or controlling, by the electronic device, the battery to continue charging when a current battery level or a current voltage of the battery is equal to a second recharge threshold in the $(n+i)^{th}$ time of recharging of the battery comprises:

in response to a first operation performed by the user on the first charging mode selection control, in the $(n+i)^{th}$ time of recharging of the battery, when the current battery level or the current voltage of the battery is equal to the second full charge threshold, controlling, by the electronic device, the battery to stop charging; or when the current battery level or the current voltage of the battery is equal to the second recharge threshold, controlling, by the electronic device, the battery to continue charging, wherein the first operation is used to indicate that use of a first charging mode is allowed to be continued.

4. The method according to claim 1, wherein the second full charge threshold is equal to a preset full charge threshold, and the preset full charge threshold is less than or equal to a product of 85% and a full charge capacity FCC of the electronic device.

5. The method according to claim 4, wherein the preset full charge threshold is a product of 80% and the full charge capacity FCC of the electronic device.

6. A battery charging method, applied to an electronic device, wherein the method comprises:

collecting, by the electronic device, statistics on a quantity of recharging times of a battery in at least one single charging process, wherein the quantity of recharging times is a quantity of times that charging of the battery is continued after being stopped and is stopped again in the at least one single charging process;

in first s times of recharging of the battery, when a current battery level or a current voltage of the battery is equal to an initial full charge threshold, controlling, by the electronic device, the battery to stop charging; or when a current battery level or a current voltage of the battery is equal to an initial recharge threshold, controlling, by the electronic device, the battery to continue charging, wherein s≥1, s is a positive integer, and the initial full charge threshold is greater than the initial recharge threshold; and in the $[s+(j-1)*m+i]^{th}$ time of recharging of the battery, when a current battery level or a current voltage of the battery is equal to a full charge threshold j, controlling, by the electronic device, the battery to stop charging; or when a current battery level or a current voltage of the battery is equal to a recharge threshold j, controlling, by the electronic device, the battery to continue charging, wherein m≥1, a value of i is successively set to {1, 2, . . . , m}, a value of j is successively set to {1, 2, . . . }, m, i, and j are all integers, the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the (j−1) cycle;

wherein if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }, and k is an integer; and/or if the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }.

7. The method according to claim 6, wherein if s+(j−1)*m+i is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }, M>s, and both k and M are integers.

8. The method according to claim 6, wherein in a single charging process, m changes according to a preset rule.

9. The method according to claim 6, wherein when the full charge threshold j is less than or equal to a second preset full charge threshold, the electronic device displays a prompt interface, wherein the prompt interface comprises first prompt information, and the first prompt information is used to prompt a user with a reason for a full charge failure; and/or when the recharge threshold j is less than or equal to a second preset recharge threshold, the electronic device displays a prompt interface, wherein the prompt interface comprises first prompt information, and the first prompt information is used to prompt a user with a reason for a power failure in a single charging process.

10. The method according to claim 9, wherein the prompt interface further comprises second prompt information, the second prompt information is used to prompt the user to select a charging mode, and the second prompt information comprises a first charging mode selection control; and the controlling, by the electronic device, the battery to stop charging when a current battery level or a current voltage of the battery is equal to a full charge threshold j; or controlling, by the electronic device, the battery to continue charging when a current battery level or a current voltage of the battery is equal to a recharge threshold j in the $[s+(j-1)*m+i]^{th}$ time of recharging of the battery comprises:

in response to a first operation performed by the user on the first charging mode selection control, in the $[s+(j-1)*m+i]^{th}$ time of recharging of the battery, when the current battery level or the current voltage of the battery is equal to the full charge threshold j, controlling, by the electronic device, the battery to stop charging; or when the current battery level or the current voltage of the battery is equal to the recharge threshold j, controlling, by the electronic device, the battery to continue charging, wherein the first operation is used to indicate that use of a first charging mode is allowed to be continued.

11. The method according to claim 6, wherein the electronic device comprises a first preset AI model, the first preset AI model has a function of determining a full charge threshold and a recharge threshold of the battery based on a quantity of recharging times of the battery, and the method further comprises:

running, by the electronic device, the first preset AI model by using the quantity s+(j−1)*m+i of recharging times as an input, to output the full charge threshold j and the recharge threshold j.

12. A battery charging method, applied to an electronic device, wherein the method comprises:

collecting, by the electronic device, statistics on a quantity of recharging times of a battery in at least one single charging process, wherein the quantity of recharging times is a quantity of times that charging of the battery is continued after being stopped and is stopped again in the at least one single charging process;

in a single charging process, in first s times of recharging of the battery, when a current battery level or a current voltage of the battery is equal to an initial full charge threshold, controlling, by the electronic device, the battery to stop charging; or when a current battery level or a current voltage of the battery is equal to an initial recharge threshold, controlling, by the electronic device, the battery to continue charging, wherein s≥1, s is an integer, and the initial full charge threshold is greater than the initial recharge threshold;

obtaining, by the electronic device, a temperature of the battery in the $[s+(j-1)*m]^{th}$ time of recharging, wherein j is a quantity of cycles, a value of j is successively set to {1, 2, . . . }, m≥1, and both j and m are integers;

obtaining, by the electronic device, a recharge threshold j and a full charge threshold j of the battery in the $[s+(j-1)*m+i]^{th}$ time of recharging based on the temperature in the $[s+(j-1)*m]^{th}$ time of recharging and the quantity s+(j−1)*m of recharging times, wherein the full charge threshold j is greater than the recharge threshold j, a full charge threshold j−1 is greater than the full charge threshold j, a recharge threshold j−1 is greater than the recharge threshold j, and the full charge threshold j−1 and the recharge threshold j−1 are respectively a full charge threshold and a recharge threshold in the $(j{-}_1)^{th}$ cycle; and in the $[s+(j-1)*m+i]^{th}$ time of recharging, when a current battery level or a current voltage of the battery is equal to the full charge threshold j, controlling, by the electronic device, the battery to stop charging; or when a current battery level or a current voltage of the battery is equal to the recharge threshold j, controlling, by the electronic device, the battery to continue charging; and i is an integer.

13. The method according to claim 12, wherein if s+(j−1)*m+i is equal to a quantity-of-recharging-times threshold M, in the $(M+k)^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }, M>s, and both k and M are integers.

14. The method according to claim 12, wherein if the full charge threshold j is less than or equal to a first preset full charge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }, and k is an integer; and/or if the recharge threshold j is less than or equal to a first preset recharge threshold, in the $[s+(j-1)*m+i+k]^{th}$ time of recharging of the battery, when a current battery level or a current voltage of the battery is equal to the full charge threshold j, the electronic device controls the battery to stop charging; or when a current battery level or a current voltage of the battery is equal to the recharge threshold j, the electronic device controls the battery to continue charging, wherein a value of k is successively set to {1, 2, . . . }.

15. The method according to claim 12, wherein in a single charging process, m changes according to a preset rule.

16. The method according to claim 12, wherein when the full charge threshold j is less than or equal to a second preset full charge threshold, the electronic device displays a prompt interface, wherein the prompt interface comprises first prompt information, and the first prompt information is used to prompt a user with a reason for a full charge failure; and/or when the recharge threshold j is less than or equal to a second preset recharge threshold, the electronic device displays a prompt interface, wherein the prompt interface comprises first prompt information, and the first prompt information is used to prompt a user with a reason for a power failure in a single charging process.

17. The method according to claim 16, wherein the prompt interface further comprises second prompt information, the second prompt information is used to prompt the user to select a charging mode, and the second prompt information comprises a first charging mode selection control; and the controlling, by the electronic device, the battery to stop charging when a current battery level or a current voltage of the battery is equal to the full charge threshold j; or controlling, by the electronic device, the battery to continue charging when a current battery level or a current voltage of the battery is equal to the recharge threshold j in the $[s+(j-1)*m+i]^{th}$ time of recharging of the battery comprises:

in response to a first operation performed by the user on the first charging mode selection control, in the $[s+(j-1)*m+i]^{th}$ time of recharging of the battery, when the current battery level or the current voltage of the battery is equal to the full charge threshold j, controlling, by the electronic device, the battery to stop charging; or when the current battery level or the current voltage of the battery is equal to the recharge threshold j, controlling, by the electronic device, the battery to continue charging, wherein the first operation is used to indicate that use of a first charging mode is allowed to be continued.

18. The method according to claim 12, wherein the electronic device comprises a second preset AI model, and the second preset AI model has a function of determining a full charge threshold and a recharge threshold of the battery based on a quantity of recharging times and a temperature of the battery; and the obtaining, by the electronic device, a recharge threshold j and a full charge threshold j of the battery in the $[s+(j-1)*m+i]^{th}$ time of recharging based on the temperature in the $[s+(j-1)*m]^{th}$ time of recharging and the quantity s+(j−1)*m of recharging times comprises:

running, by the electronic device, the second preset AI model by using the temperature in the $[s+(j-1)*m]^{th}$ time of recharging and the quantity s+(j−1)*m of recharging times as an input, to output the full charge threshold j and the recharge threshold j.

\* \* \* \* \*